US008248210B2

(12) United States Patent
Nikitin et al.

(10) Patent No.: US 8,248,210 B2
(45) Date of Patent: Aug. 21, 2012

(54) METHOD AND SYSTEM TO DETERMINE THE POSITION, ORIENTATION, SIZE, AND MOVEMENT OF RFID TAGGED OBJECTS

(75) Inventors: Pavel Nikitin, Seattle, WA (US); Rene Martinez, Seattle, WA (US); Shashi Ramamurthy, Seattle, WA (US); Kvs Rao, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 669 days.

(21) Appl. No.: 12/495,732

(22) Filed: Jun. 30, 2009

(65) Prior Publication Data

US 2010/0328073 A1    Dec. 30, 2010

(51) Int. Cl.
*H04Q 5/22* (2006.01)
*G08B 13/14* (2006.01)
*G01S 13/00* (2006.01)

(52) U.S. Cl. ............... 340/10.1; 340/10.32; 340/572.7; 340/10.4; 342/74; 342/81; 342/85; 342/89

(58) Field of Classification Search ............... 342/73–87
See application file for complete search history.

(56) References Cited

U.S. PATENT DOCUMENTS

| | | | |
|---|---|---|---|
| 6,204,765 | B1 | 3/2001 | Brady et al. |
| 6,476,756 | B2 | 11/2002 | Landt |
| 7,030,761 | B2 | 4/2006 | Bridgelall et al. |
| 7,119,738 | B2 | 10/2006 | Bridgelall et al. |
| 7,170,412 | B2 | 1/2007 | Knox et al. |
| 2007/0001814 | A1 | 1/2007 | Steinke et al. |
| 2007/0073513 | A1 | 3/2007 | Posamentier |
| 2007/0109128 | A1 | 5/2007 | Fujii et al. |
| 2007/0197229 | A1 | 8/2007 | Kalliola et al. |
| 2007/0241904 | A1 | 10/2007 | Ozaki et al. |
| 2007/0272530 | A1 | 11/2007 | Miyoshi et al. |

OTHER PUBLICATIONS

"Assessment of the Physical Interface of UHF Passive Tags for Localization", Yanakiev et al., Eurasip RFID 2007 workshop.
"Automated Robot Docking Using Direction Sensing RFID", Kim et al., 2007 IEEE International Conference on Robotics and Automation.
"Localization and Tracking of Passive RFID Tags Based on Direction Estimation", Zhang et al., International Journal of Antennas and Propagation. 2007.
"Omron Announces New Gen 2 Interrogator", http://www.rfidjournal.com/article/articleview/2541/1/1/, Feb. 8, 2006.
"Survey of Wireless Indoor Positioning Techniques and Systems", Liu et al., IEEE Trans. On Syst., Man, Cybernetics, Nov. 2007.
"Tracking Mobile Nodes Using RF Doppler Shifts", Kusy et al., ACM SenSys conference, 2007.
"UHF Gen2 Tag direction," Impinj video http://impinj.com/rfid/in-action-videos.aspx, Mar. 2008.

*Primary Examiner* — Brian Zimmerman
*Assistant Examiner* — Omeed Alizada
(74) *Attorney, Agent, or Firm* — Perkins Coie LLP

(57) ABSTRACT

A method and system of determining spatial identification of an object, such as orientation, size, location, range, and/or movement, using an RFID system is disclosed. An RFID system can comprise one or more RFID reader receiving antennas that query one or more RFID tags coupled to the object. The measurement of the phase of the tag responses at the reader antennas and phase differentials as a function of distance, frequency, and time are the basis of spatial identification. The system can work with conventional Gen 2 tags and readers without modification of the tags or protocol.

18 Claims, 52 Drawing Sheets

METHOD AND SYSTEM TO DETERMINE THE POSITION, ORIENTATION, SIZE, AND MOVEMENT OF RFID TAGGED OBJECTS

BACKGROUND

A conventional phased antenna array is made up of multiple antenna elements that are connected to a common source through an RF power divider/combiner network. The relative amplitude and phases of the different signals feeding the antennas are varied such that the effective radiation pattern of the array is reinforced in a particular direction. These phased arrays work both in transmit and receive modes to communicate the modulated active signals. In contrast, RFID readers that use multiple antennas use a passive backscatter modulation technique where a reader antenna radiates an RF signal that illuminates RFID tags, and the tags modulate the impinging RF energy and re-radiate a passive modulated signal back to the reader.

Conventional passive UHF RFID (ultra high frequency radio-frequency identification) systems use an RFID reader that generates RF signals to query RFID tags within an RF zone near the reader. The RF zone cannot be exactly defined within the practical limits of business environments. For example, tags near the edge or outside of an RF reader zone may inadvertently be read and associated with tags located inside the zone. Consequently, human intervention is needed to distinguish between tags inside and outside of the RF zone. Unintended association of tags could occur with tags in adjacent portals, with tags on a forklift and adjacent to a forklift, and with tags adjacent to racks of apparel.

Automatic techniques implemented in "middle-ware" business logic, such as measuring the time or number of occurrences that a tag was read, help to distinguish between tags and mitigate the number of exceptions. Statistical techniques that use the time, number, or strength of the tags' signals help to reduce the number of unintended associations, but statistics inherently have exceptions that will require exception processing with human intervention. Such statistical techniques are not based on the location of a tag.

There is a need for a system that overcomes the above problems, as well as providing additional benefits. Overall, the above examples of some related systems and associated limitations are intended to be illustrative and not exclusive. Other limitations of existing or prior systems will become apparent to those of skill in the art upon reading the following Detailed Description.

DETAILED DESCRIPTION

Figure 1A:
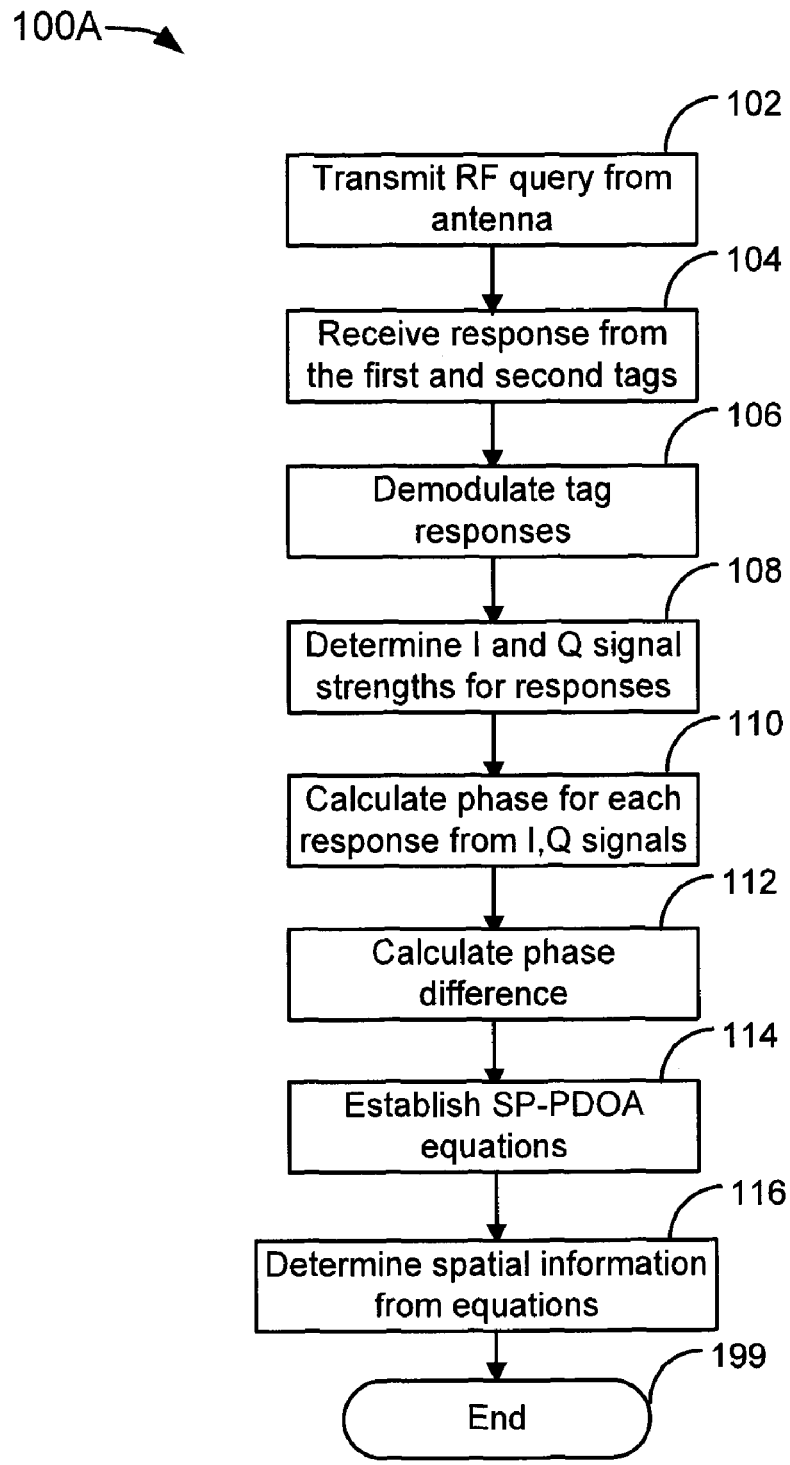
FIG. 1A is a flow chart illustrating an example of a method for applying spatial division-phase difference of arrival (SD-PDOA) for the case of one RFID reader receiving antenna and two RFID tags on an object of interest.

Traditional RFID systems perform conventional "data identification" of RFID tags where a tag is queried by an RFID reader, and the tag responds with the appropriate identification information. Spatial identification of RFID tags additionally provides location information using the difference in arrival time of tag signals collected by reader antennas at different reception points. By providing location information, spatial identification minimizes the need for human assistance to distinguish tags, thus enhancing the productivity of an RFD system.

RFID tags can use the radio frequency energy from an RFID reader's query as a source of energy. RFID systems are rare among RF systems whereby the RF energy between the RF reader (interrogator) and the RFID tags (subscribers) are synchronized. With synchronization, a phase delay of a sinusoidal RF signal corresponds to a time delay, and both a phase and time delay mainly depend on the distance between the tag and the reader antenna. Spatial identification determines the direction of an RFID tag by measuring time delay between tag signals received by two or more reader antennas.

Described below is a system and method of determining the position, orientation, size, and/or movement of an object based upon phase differential angle data of RFID tag responses determinable through spatial division-phase difference of arrival (SD-PDOA) techniques, frequency division-phase difference of arrival (FD-PDOA), and time division-phase difference of arrival (TD-PDOA), or a combination of these techniques. The phase information can be used to determine the relative spatial coordinates of the RFID tags which define the orientation of an object coupled to the tags with respect to the line of sight of the RFID reader. The object may be tagged with a single tag and read using multiple RFID reader antennas (multiple antenna single tag (MAST) system), the object may be tagged with multiple tags and read using a single RFID reader antenna (single antenna multiple tag (SAMT) system), or the object may be tagged with multiple tags and read using multiple RFID reader antennas (multiple antenna multiple tag (MAMT) system).

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Section headers and/or sub-headers are provided merely to guide the reader and are not intended to limit the scope of the invention in any way. Aspects, features, and elements of the invention and of embodiments of the invention are described throughout the written description and the drawings and claims.

General Framework for RFID Spatial Sensing Systems

Spatial sensing using an RFID system can be performed by using a combination of one or more reader antennas and one or more tags (MAMT). Depending upon the number of tags placed on an object and the number of reader antennas used in the RFID system, the MAMT system could be reduced to one or several sub-systems: a single antenna, multiple tag (SAMT) system, a multiple antenna, single tag (MAST) system, or a single antenna, single tag (SAST) system. Also dependent upon the number of tags and reader antennas, one or more of the following pieces of information can be obtained about the object: the distance from an antenna, range, direction, exact location, orientation, size, linear velocity, and rotational velocity. The general equations for the MAMT system will be described first, and subset system results can be obtained from the general MAMT system.

Measurement of the phase of an RFID tag's response to an RFID reader's query provides the basic information that can be used to determine spatial information about a tagged object. It should be noted that a tagged object can include, but is not limited to, any type of package, a person, and an animal. Thus, the tagged object may be ambulatory or capable of self-movement (e.g. a vehicle). The phase φ of the response and distance d between a tag and an antenna is related through the traveling wave equation by $$\phi = 2\pi \frac{f}{c} d \quad (1)$$

In a backscatter propagation model where the RF signal travels from the reader to the tag and back, equation (1) becomes $$\phi = 4\pi \frac{f}{c} d \quad (2)$$

Solutions to spatial identification of a tagged object involve calculating a phase differential from equation (2). There are three ways in which the phase differential can be determined, SD-PDOA (spatial division-phase difference of arrival), FD-PDOA (frequency division-phase difference of arrival), and TD-PDOA (time division-phase difference of arrival). These methods are applicable in different situations.

For calculating the phase differential using the spatial division—phase difference of arrival (SD-PDOA) technique, we differentiate the phase with respect to distance in equation (2) to obtain $$\frac{\partial \phi}{\partial d} = 4\pi \frac{f}{c} \quad (3)$$

$$\partial d = \left(\frac{c}{4\pi f}\right) \partial \phi$$

The SD-PDOA method can be implemented by measuring the phase difference from two spatially separated locations of two tags at a reader antenna or vice versa (measuring the phase difference from two spatially separated locations of two reader antennas from a tag) at the same instant of time or at different times if the position of the tags and antenna (or antennas and tags) have not changed. Thus, to apply SD-PDOA, at least two tags should be attached to the object of interest and/or at least two reader antennas should be used at the reader to measure the responses of at least one RFID tag.

FIG. 1A is a flow chart illustrating an example of a method 100A for applying SD-PDOA for the case of one RFID reader receiving antenna and two RFID tags on an object of interest. The RFID reader transmits an RF query from its transmitting antenna at block 102. The transmitting antenna can be separate from the receiving antenna. Alternatively, the same physical antenna can be coupled alternately to a transmitter and receiver in the RFID reader to alternately transmit and receive RF signals. At block 104, the receiving antenna at the RFID reader receives a response from the two tags coupled to the object.

Then at block 106, a demodulator in the RFID receiver demodulates the response into an I (in-phase) component and Q (quadrature) component. Because the values for I and Q may be noisy, the system can use multiple adjacent I,Q values in the tag response, for example by taking the root mean square (RMS) value of several adjacent I samples as the I value and the RMS value of several adjacent Q samples as the Q value. At block 108, a processor in the RFID reader determines the signal strength averages for the I and Q signals of each tag response.

At block 110, the processor calculates the phase of each tag response by taking the arctangent of (Q/I, possibly aided by a lookup table). After the system determines a phase for each of the two tags, a phase difference is calculated at block 112 by subtracting the phase of one of the tags from the phase of the other tag.

Then at block 114 the system establishes an equation for determining information about the tagged object such that the difference between a first distance from the antenna to the first tag and a second distance from the antenna to the second tag is equal to the phase difference calculated at block 112 times the constant (c/4πf), where c is the speed of light and f is the transmitting carrier frequency. This type of SD-PDOA-based equation can be established for all unique pairs of one antenna and two tags or one tag and two antennas. At block 116 the system uses the resulting independent equations to determine spatial information about the tagged object. The process ends at block 199.

The second method of calculating the phase differential uses the frequency division-phase difference of arrival (FD-PDOA) technique. Differentiating the phase with respect to frequency in equation (2), we obtain $$\frac{\partial \phi}{\partial f} = 4\pi \frac{d}{c} \quad (4)$$

$$d = \frac{\partial \phi}{\partial f} \left(\frac{c}{4\pi}\right)$$

The FD-PDOA method can be implemented by measuring the phase difference at two different frequencies for a particular antenna and tag pair. Thus, using FD-PDOA with a SAST system will yield the distance that the tag (and object) is from the reader antenna.

Figure 1B:
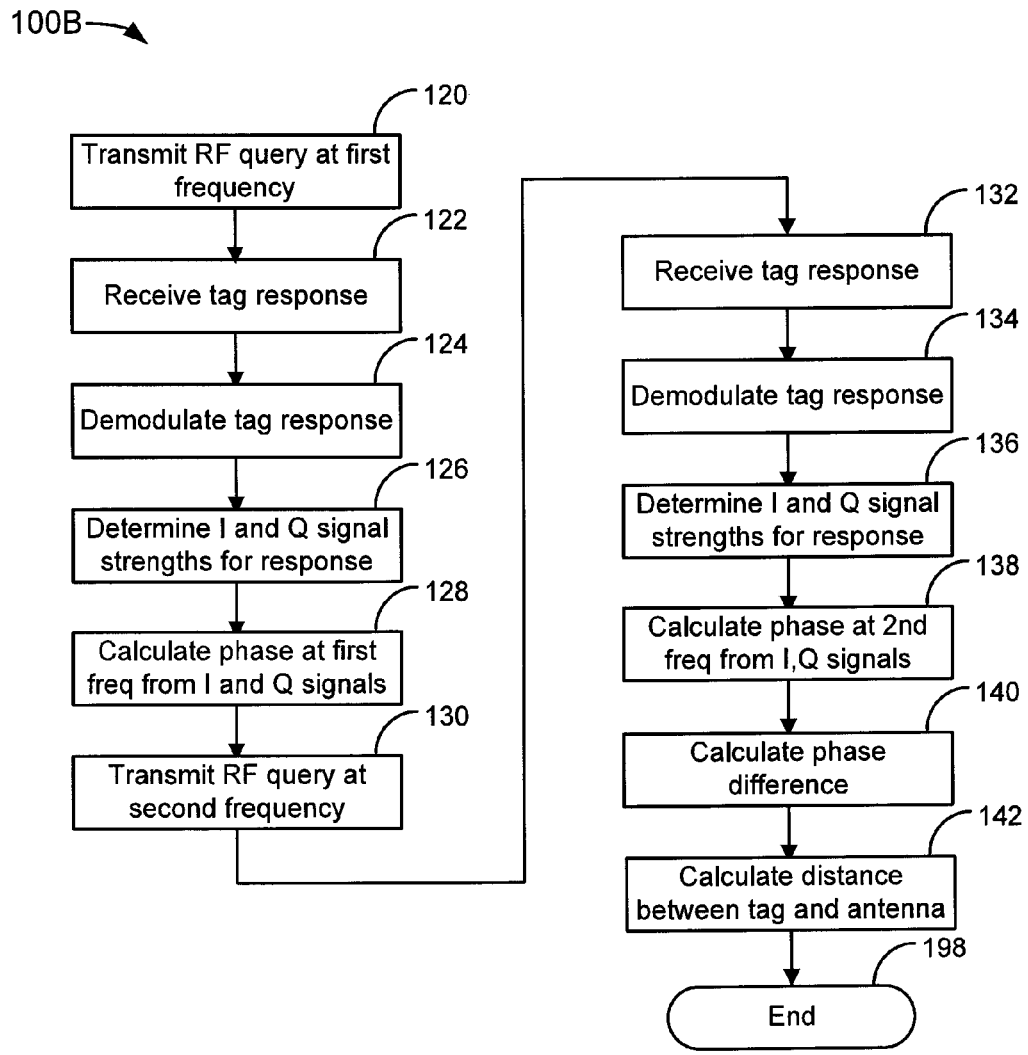
FIG. 1B is a flow chart illustrating an example of a method for applying frequency division-phase difference of arrival (FD-PDOA) for the case of one RFID reader receiving antenna and one RFID tag on an object of interest.

FIG. 1B is a flow chart illustrating an example of a method 100B for applying FD-PDOA for the case of one RFID reader receiving antenna and one RFID tag on an object of interest.

At block 120, the RFID reader transmits an RF query at a first known frequency. At blocks 122, 124, 126, and 128, the receiving antenna of the reader receives the response, the receiver demodulates the response into I and Q signals, and a processor in the reader calculates the phase from the I and Q signals, similar to blocks 104, 106, 108, and 110.

Then at block 130 the RFID reader transmits a second RFID query at a second known frequency, different from the first frequency. At blocks 132, 134, 136, and 138 the receiving antennas again receive the response, the receiver demodulates the response, and the processor calculates the phase of the response. The processor then calculates the distance between the tag and the antenna using equation (4) at block 142, and the process ends at block 198.

The third method of calculating the phase differential uses the time division-phase difference of arrival (TD-PDOA) technique. The mathematical definition for phase difference is the same as in equations (3) and (4), however the two phase measurements are performed between the same tag and antenna pair at two different points in time.

Figure 1C:
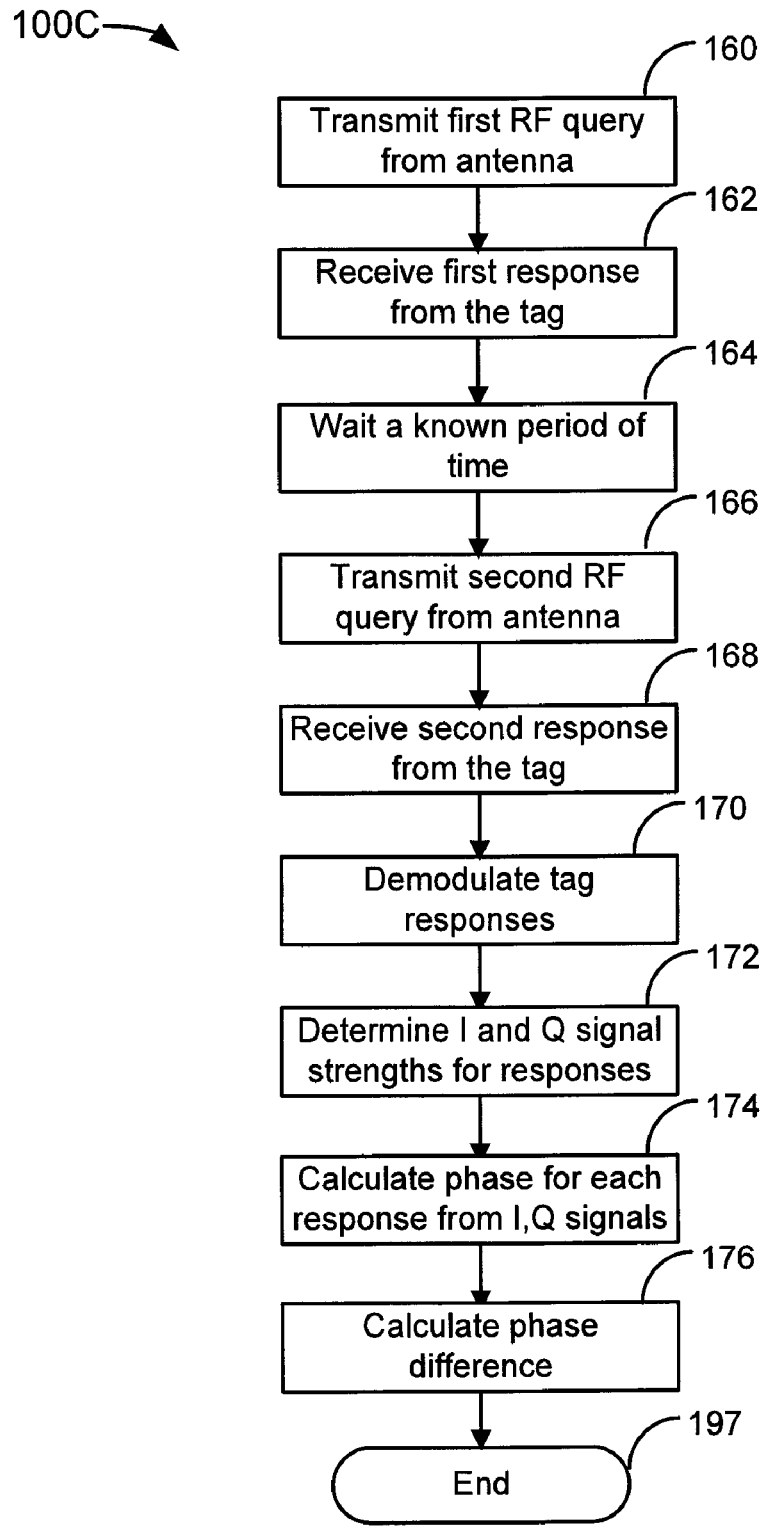
FIG. 1C is a flow chart illustrating an example of a method for applying time division-phase difference of arrival (TD-PDOA) for the case of one RFID reader receiving antenna and one RFID tag on an object of interest.

FIG. 1C is a flow chart illustrating an example of a method 100C for applying TD-PDOA for the case of one RFID reader receiving one antenna and one RFID tag on an object of interest.

At block 160, the RFID reader transmits a first RF query and receives a first response from the tag at block 162. At block 164, the reader waits for a pre-selected period of time. Then at block 166 the RFID reader transmits a second RF query. The RFID reader should transmit first and second queries at the same frequency, otherwise the phase will also change. At block 168, the reader receives the second response from the tag.

Next, at blocks 170 and 172, the tag responses are demodulated, and the I and Q signal strengths are determined. At block 174 the system calculates the phase for each tag response using the arctangent of (Q/I). The system calculates the phase difference at block 176 by subtracting the phase of the second response from the phase of the first response. The process ends at block 197.

Because the linear or rotational velocity of a tag's movement can be described as $$v = \frac{d}{t} = \frac{\partial d}{\partial t} \quad (5)$$

the TD-PDOA technique is useful for determining the linear and/or angular velocity of an object.

A set of general equations that describe a MAMT system or any subset of a MAMT system, such as a SAST, SAMT, and MAST system, can be established. Let M and N denote the number of reader antennas and the number of tags on an object of interest, respectively. Further, let $$R_{rm} = \begin{bmatrix} x_{rm} \\ y_{rm} \\ z_{rm} \end{bmatrix}$$

and $$T_{tn} = \begin{bmatrix} x_{tn} \\ y_{tn} \\ z_{tn} \end{bmatrix}$$

represent the locations of the reader antennas and tags, respectively. Then from equation (2), we find that the measured phase between a tag and antenna pair is related to the distance between the tag and antenna by $$\|R_{rm} - T_{tn}\| = k\Delta\phi \quad (6)$$

where $1 \leq rm \leq M$, $1 \leq tn \leq N$, $\phi$ is the phase measured at the reader, and $k = \lambda/4\pi$, where $\lambda$ is the wavelength at which the RF query is transmitted. Using the well-known distance formula from analytical geometry, the distance between two points in three-dimensional space having coordinates (x1, y1, z1) and (x2, y2, and z2) is given by $\sqrt{((x2-x1)^2 + (y2-y1)^2) + z2-z1)_2)}$. This distance formula is applicable to the left side of equation (6). Using algebraic manipulations, equation (6) can be shown to represent a sphere.

Thus, measuring the distance between a single antenna and tag pair by using FD-PDOA narrows down the possible range of locations of the tag to a sphere centered at the antenna. This could be useful for eliminating false reads in a warehouse that has multiple portals. For example, an RFID reader at one portal might sometimes read tags from a neighboring portal. By applying the FD-PDOA technique with the RFID reader to determine the distance of a tag from the reader, responses from tags beyond a certain radius of the portal can be ignored.

If an object has two RFID tags, the distance from each tag to an antenna on the RFID reader can be determined using FD-PDOA, and the intersection of the resulting two spheres narrows down the location of the object to a circle. If the RFID system has more than one antenna, and/or there are more than three tags, the system would be overdetermined. In this case, information about the object can still be determined.

A system with any number of antennas and any number of tags on the object can be solved mathematically with one or more of the equations herein. The SD-PDOA technique is applied by using the distance formula between the antenna and tag vectors and measuring the differential phase at the reader to get:

$$\|R_{rm} - T_{tn}\| - \|R_{rn} - T_{tn}\| = K\Delta\phi \quad (7)$$

where $1 \leq rm, rn \leq M$; $1 \leq tm, tn \leq N$; and $<rm \neq rn, tm=tn><rm=rn, tm \neq tn>$; and $\Delta\phi$ is the differential phase measured at the reader. The angle brackets denote alternative conditions under which equation (7) should be applied, i.e.: either the condition within the first pair of angle brackets is satisfied or the condition within the second pair of angle brackets is satisfied, but not both conditions simultaneously.

Because rm cannot equal rn if tm equals tn, and vice versa, equation (7) cannot be applied if there is only one antenna and one tag. Equation (7) can be shown to represent a hyperboloid of two sheets after some algebraic manipulation. By using three antennas to receive responses from a single tag, the intersection of three hyperboloid surfaces is a single point, thus the exact location of the object can be determined.

Further, in order to specify the exact location of a tag, three coordinates are needed, independent of the coordinate system used. So at least three equations are needed to solve for the three coordinates of a single tag. If there are three tags and three antennas, equation (7) provides nine equations, a sufficient number of equations to solve for the exact location of the object. Any fewer than three antennas may not provide a solution to the exact location of the object with three tags without additional information, such as the mutual spacings of the tags, the mutual spacings of the reader antennas, or orthogonal positional vectors of the antennas or tags, as discussed below. Alternatively or additionally, if the number of tags and antennas does not provide enough equations, more antennas can be added until enough equations are obtained from equation (7). Because adding too many antennas may result in an overdetermined system, and the processing time involved in solving a system of equations increases with the number of equations, it is preferable to minimize the number of elements and equations. Yet further alternatively or additionally, varying the frequency of the RFID query transmitted by the reader to apply FD-PDOA will yield more independent equations.

If the mutual spacings of the tags on the object or of the reader antennas are known, then the following additional equations can be used:

$$\|R_{rm} - R_{rn}\| d_{rmn}$$

$$\|T_{tm} - T_{tn}\| = d_{tmn} \quad (8)$$

Where
$1 \leq rm, rn \leq M$
$1 \leq tm, tn \leq N$
$<rm \neq rn><tm \neq tn>$ $d_{rmn}, t_{tmn}$ are the spacings between the antennas or the tags, respectively.

Additional independent equations can be used based upon the dot product of antenna or tag vectors. If the antennas or the tags are orthogonal to each other, then the inner product of the positional vectors of the antennas or tags are given by $$R_{rm} \cdot R_{rn} = 0$$

$$T_{tm} \cdot T_{tn} = 0 \qquad (9)$$

Where
$1 \leq tm, tn \leq M$
$1 \leq tm, tn \leq N$
$<rm \neq rn><tm \neq tn>$

Consider an example where there are three antennas at the RFID reader and three tags on the object, and their positional vectors are given by $R_1, R_2, R_3$ and $T_1, T_2, T_3$, respectively. Let $$R_1 = \begin{bmatrix} x_{r1} \\ y_{r1} \\ z_{r1} \end{bmatrix}, R_2 = \begin{bmatrix} x_{r2} \\ y_{r2} \\ z_{r2} \end{bmatrix}, R_3 = \begin{bmatrix} x_{r3} \\ y_{r3} \\ z_{r3} \end{bmatrix}$$

and $$T_1 = \begin{bmatrix} x_{t1} \\ y_{t1} \\ z_{t1} \end{bmatrix}, T_2 = \begin{bmatrix} x_{t2} \\ y_{t2} \\ z_{t2} \end{bmatrix}, T_3 = \begin{bmatrix} x_{t3} \\ y_{t3} \\ z_{t3} \end{bmatrix}.$$

By applying equations (7) and (8) to this example MAMT system, the system can be represented mathematically as, $$\|R_1 - T_1\| - \|R_2 - T_1\| = K \Delta \phi_1$$

$$\|R_3 - T_1\| - \|R_2 - T_1\| = K \Delta \phi_2$$

$$\|R_1 - T_1\| - \|R_3 - T_1\| = K \Delta \phi_3$$

$$\|R_1 - T_2\| - \|R_2 - T_2\| = K \Delta \phi_4$$

$$\|R_3 - T_2\| - \|R_2 - T_2\| = K \Delta \phi_5$$

$$\|R_1 - T_2\| - \|R_3 - T_2\| = K \Delta \phi_6$$

$$\|R_1 - T_3\| - \|R_2 - T_3\| = K \Delta \phi_7$$

$$\|R_3 - T_3\| - \|R_2 - T_3\| = K \Delta \phi_8$$

$$\|R_1 - T_3\| - \|R_3 - T_3\| = K \Delta \phi_9$$

$$\|T_2 - T_1\| = d_{t12}$$

$$\|T_3 - T_1\| = d_{t31}$$

$$\|T_2 - T_3\| = d_{t23} \qquad (10)$$

Each equation in (10) can be represented as, $$f_i(v_1, v_2, v_3 \ldots v_j) = p_i \qquad (11)$$

Where
$1 \leq i \leq m, 1 \leq j \leq n, m \geq n,$
$v_j, f_i$ being the unknown variables and the corresponding non-linear equations.

There are nine unknown variables corresponding to the position vectors of the three tags, while there are twelve equations. Another nine equations could be added to the above by using FD-PDOA to determine a distance between each antenna and each tag, resulting in twenty-one equations that lead to an overdetermined system when the equations are made linear by using a numerical solution.

Applying a multidimensional Taylor's series expansion to the above non-linear equations and ignoring the higher order contributions, these linear equations are obtained:

$$f_i(v_j^r) + J_r \Delta v_i^r = p_i \qquad (12)$$

Where
$\Delta v_j^r$ is the increment that is solved at iteration r
$J_r$ is the Jacobian matrix and is, $$J_r = \frac{\partial f_i(v_j^r)}{\partial v_j} \quad 1 \leq i \leq m, 1 \leq j \leq n, m \geq n$$

Starting with an initial approximation of the unknown tag locations, the system solves for $\Delta v_j^r$ which represents the incremental change at each iteration to the approximation to obtain a new approximation. The iterations are stopped when convergence is reached, and convergence depends upon starting with a good initial approximation.

With the locations T1, T2, T3 of the tags known, the orientation of the tags (the spatial angles theta and phi) with respect to the reader antennas system can be determined. The size (volume) of the object can be determined if the three tags are placed not only orthogonally but at three neighboring corners of the box. Also, by taking the time derivative with respect to the positional vector or the spatial angles, the linear or rotational velocity, respectively, of the tags can be determined as well.

Table 1 below gives an overview of what can be determined with one, two, or three or more tags in conjunction with one antenna, two antennas, or three or more antennas at the RFID reader.

TABLE 1

|  | One antenna | Two antennas | Three or more antennas |
|---|---|---|---|
| One Tag | FD-PDOA with the antenna and tag pair can be used to determine the distance of the tag. Taking a time derivative of the distance determined, velocity of the tag movement can be determined. Exact location cannot be determined. The orientation or size of the tagged object cannot be determined | SD-PDOA gives one hyperboloid equation involving the unknown 3D tag location vector resulting in getting the direction of the tag. The distance can be determined using FD-PDOA with one of the two antennas and the tag. Taking a time derivative of the distance determined, velocity of the tag movement can be determined. Exact location cannot be determined. The orientation or the size of the tagged object cannot be determined. | SD-PDOA gives three hyperboloid equations involving the 3D tag location vector and the antenna location vectors and this enables the solving of the 3D location vector of the tag. With the exact location, the orientation of the tagged object can be determined with respect to the antennas co-ordinates. The linear and rotational velocity can be determined by taking the time derivative of |

TABLE 1-continued

| | One antenna | Two antennas | Three or more antennas |
|---|---|---|---|
| | | | the location vector or the spatial angles. Size of the tagged object cannot be determined with one tag. |
| Two Tags | The distance to each tag can be determined using FD-PDOA with the antenna and the tag. A time derivative of the distance determined, linear velocity of the tag movement can be determined Exact location cannot be determined. The orientation or size of the tagged object cannot be determined | Using SD-PDOA results in four hyperboloid equations with phase measurements from the antenna and tag pairs. FD-PDOA gives four more sphere equations with the different antenna and tag pairs. Solving these equations, the exact locations of the tags can be solved. With the exact location, the orientation of the tagged object can be determined with respect to the antennas co-ordinates. The linear and rotational velocity can be determined by taking the time derivative of the locations or the spatial angles. With two tags, dimensions of one of the sides can be determined if the tags are placed at the corners (This has to be known apriori) | The location, distance linear and rotational velocity can be determined as in the single tag case above. With two tags, dimensions of one of the sides can be determined if the tags are placed at the corners (This has to be known apriori). |
| Three or more tags | The distance and linear velocity can be determined as in the two tag case above. Exact location cannot be determined. The size and orientation can be determined by calculating the relative locations of the tags with respect to each other using SP-PDOA. | The location, distance linear and rotational velocity can be determined as in the two tag case above The size can be determined if the tags are placed orthogonally at the corners of the boxes. | The location, distance linear and rotational velocity can be determined as in the single tag case above. The size can be determined if the tags are placed orthogonally at the corners of the boxes. |

One-Dimensional Orientation Estimation

Figure 2:
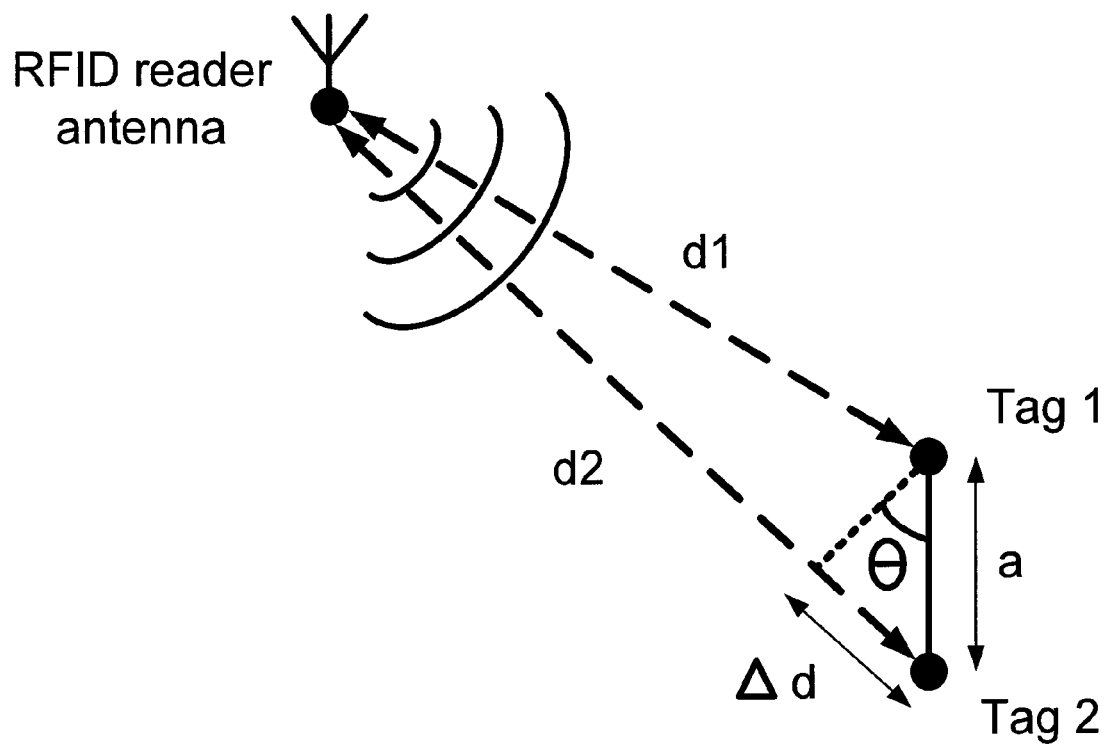
FIG. 2 shows an example system used to determine the orientation of an object with two RFID tags using one receiving antenna.

An example of a one-dimensional orientation estimation for a tagged object is described below using two RFID tags and a single reader antenna, as shown in FIG. 2.

The angular orientation of the tagged object with respect to the reader antenna can be calculated in free space as:

$$\theta = \arcsin\left(\frac{\Delta d}{a}\right) = \arcsin\left(\frac{d_2 - d_1}{a}\right),$$

where $\theta$ is the angular orientation of the line connecting the two tags with respect to the reader line of sight, a is the distance between the two tags, and $d_2 - d_1$ is the difference between the distances from the tags to the reader. The distance difference ($d_2 - d_1$) causes a phase angle difference between the two tag signals at the reader because it takes the signal longer to travel from tag 2 to the antenna than from tag 1 to the antenna. The distance between the tags should not exceed one wavelength in order to avoid ambiguity in phase difference. The calibration of the RFID reader can be done for the case when the tagged object is oriented in a known way (e.g. line a is tangential to the line of sight).

If the measured angle $\theta$ changes in time between queries while the reader position is fixed, then the tagged object is moving or rotating. The details of the object's motion can be related to the change in $\theta$ for a given particular geometry. For example, if the object rotates, the oscillation frequency of the phase angle gives the speed of rotation, and the amplitude of the phase change is proportional to the length of the arm of rotation. If either the orientation of the tagged object or the exact location of one tag (it can be a reference tag placed near the object) is known, then the direction to the object can be calculated from the measured angle $\theta$.

By attaching several RFID tags to an object in a three-dimensional pattern and comparing the relative phase differences of the signals received from the different tags, it is possible to estimate 1) the three-dimensional object orientation from measuring three angles, 2) the three-dimensional components of object motion (three components of motion vector and three axes of rotation), and 3) the three-dimensional location of the object (by measuring multiple directions for different tags, equivalent to solving equations used by global positioning systems (GPS) for determining the intersection of three planes to find the location of an object).

Example

Determining the Orientation of a Tagged Object with a SAMT System

Figure 3A:
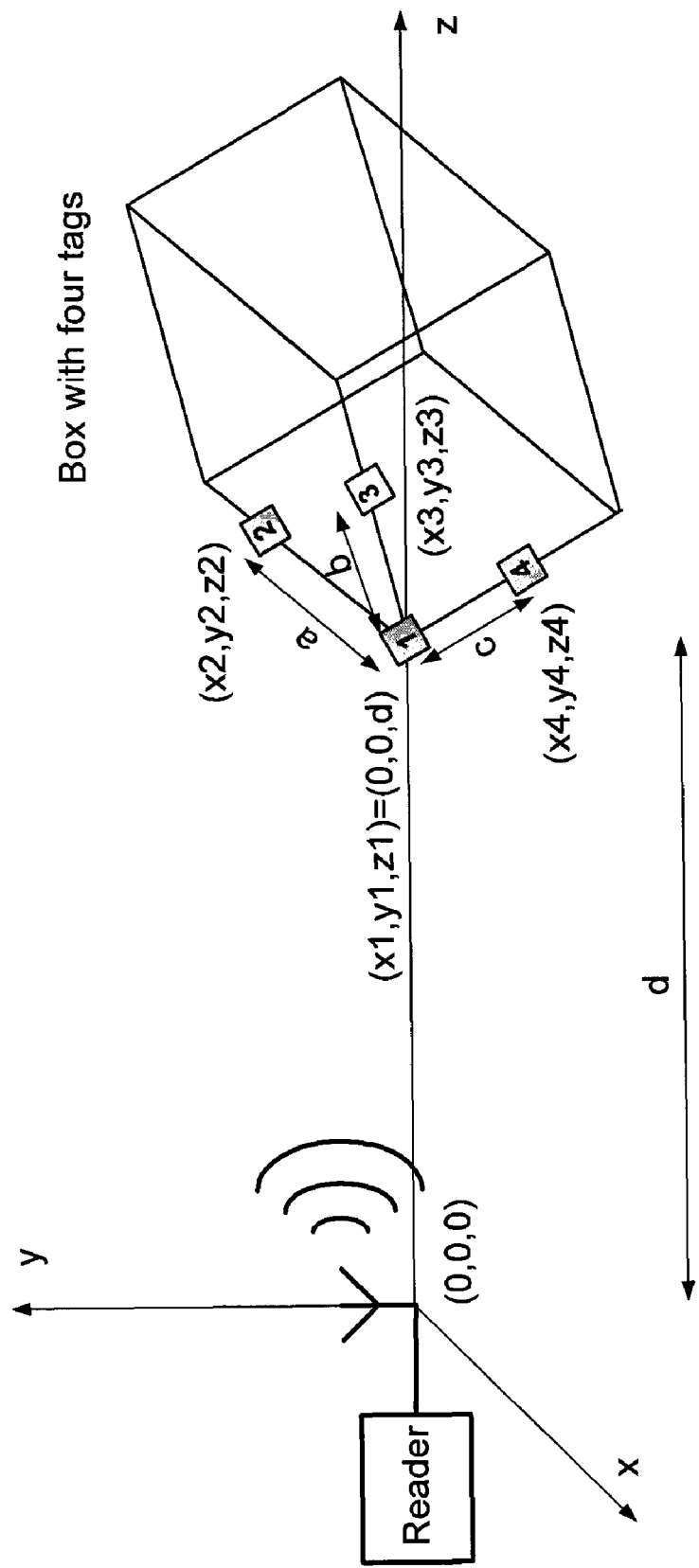
FIG. 3A is a system diagram showing an example of variables used to determine the position of an object with RFID tags by using four RFID reader antennas.

FIG. 3 illustrates how to determine the orientation and size of a box-shaped object with right angles tagged with multiple RFID tags by using a single RFID reader antenna.

An RFID reader has a single transmit/receive antenna located at the coordinates (0,0,0). A box object is tagged with four RFID tags labeled 1, 2, 3, and 4. Tag 1 is located on one of the corners of the object, and tags 2, 3, and 4 are each placed on one of the edges of the object that intersect at the corner at which tag 1 is located. The spacings of tags 2, 3, and 4 from tag 1 are known in advance to be a, b, and c, respectively. Spacings a, b, c are less than half a wavelength (6 inches at 900 MHz) in order to exclude phase ambiguity. The coordinates of tag 1 are (0,0,d) where the distance d is not known, although it is known that d is much greater than the wavelength because the object is in the far field.

The system is to find the three-dimensional Cartesian coordinates of tag 2 ($x_2$, $y_2$, $z_2$), tag 3 ($x_3$, $y_3$, $z_3$), and tag 4 ($x_4$, $y_4$, $z_4$) with respect to tag 1. The nine unknown coordinates will completely define the orientation of the tagged object:

$$x_m - x_1 = ?$$
$$y_m - y_1 = ?, \quad m = 2,3,4$$
$$z_m - z_1 = ? \tag{13}$$

Figure 3B:
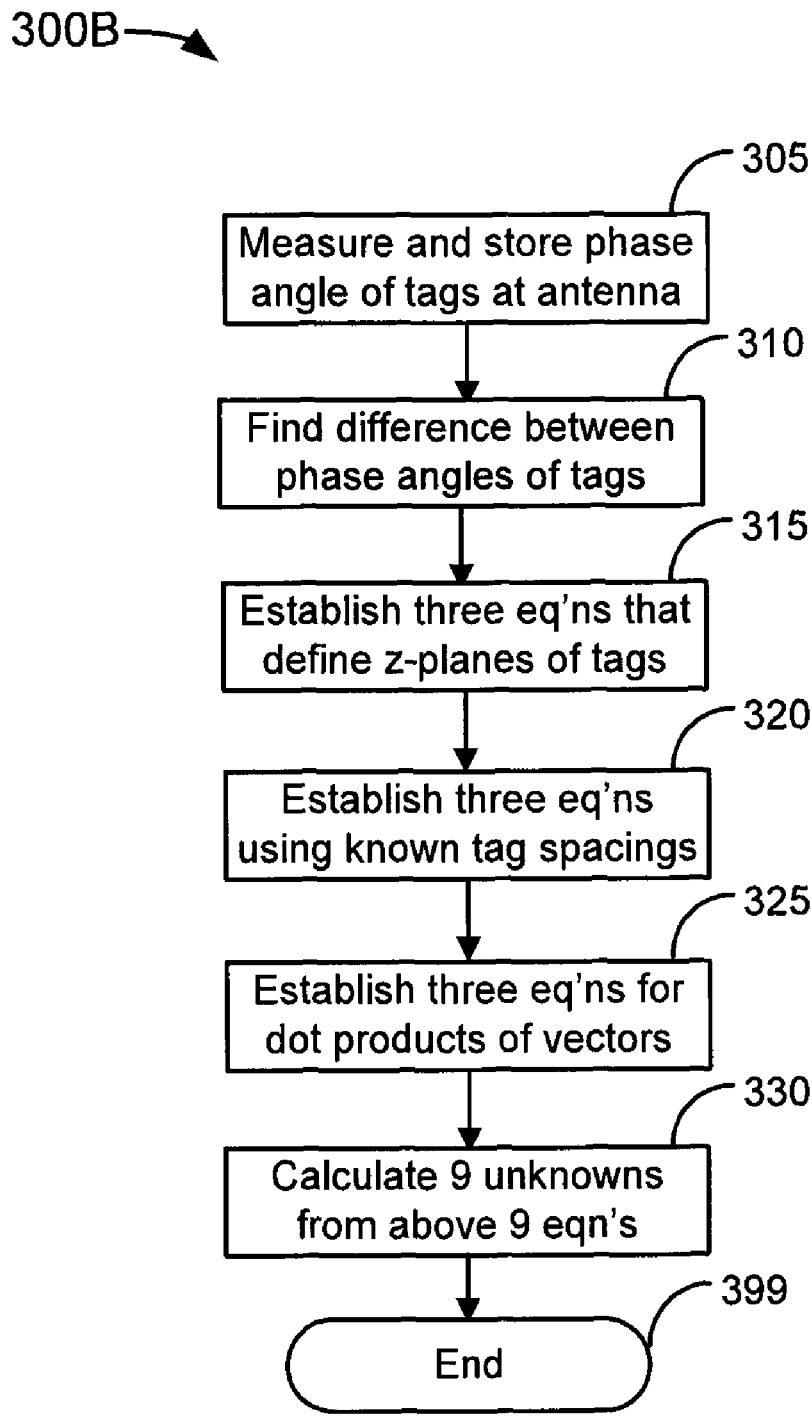
FIG. 3B depicts a flow diagram illustrating a suitable process for finding the coordinates for tags.

FIG. 3B depicts a flow diagram illustrating a suitable process 300B for finding the coordinates for tags 2, 3, and 4.

At block 305, the system measures the phase angle $\phi_m$ of each tag at the reader antenna, where $\phi_m = \arctan(Q_m/I_m)$, and m=1, 2, 3, 4. The difference between the three pairs of phase angle values are calculated at block 310, where the difference in the phase angles are given by: $\Delta \phi_{mn} = \phi_m - \phi_n$.

Then at block 315, the system establishes three equations that use the measured phase differences:

$$\Delta \varphi_{21} = \frac{2\pi}{\lambda}(z_2 - z_1) \tag{14}$$

$$\Delta \varphi_{31} = \frac{2\pi}{\lambda}(z_3 - z_1)$$

$$\Delta \varphi_{41} = \frac{2\pi}{\lambda}(z_4 - z_1)$$

where $\lambda$ is the wavelength at which the reader antenna transmits the RF queries, and $z_m$ are the z-planes where the tags are located. Because only the orientation of the tags is of interest, rather than the actual location of the tags, the phase differences define the z-planes where the tags are located.

At block 320, the system establishes three more equations based on the distance formula:

$$a = \sqrt{(x_2-x_1)^2+(y_2-y_1)^2+(z_2-z_1)^2}$$

$$b = \sqrt{(x_3-x_1)^2+(y_3-y_1)^2+(z_3-z_1)^2}$$

$$c = \sqrt{(x_4-x_1)^2+(y_4-y_1)^2+(z_4-z_1)^2} \tag{15}$$

where a, b, and c are known tag spacings on the object of interest.

Next, at block 325, the system establishes three more equations based upon the rule that dot products of mutually orthogonal vectors are zero. Here, because the object is box-shaped, the box corner angles are right angles. Thus resulting in these three equations:

$$(x_2-x_1)(x_3-x_1)+(y_2-y_1)(y_3-y_1)+(z_2-z_1)(z_3-z_1)=0$$

$$(x_2-x_1)(x_4-x_1)+(y_2-y_1)(y_4-y_1)+(z_2-z_1)(z_4-z_1)=0$$

$$(x_3-x_1)(x_4-x_1)+(y_3-y_1)(y_4-y_1)+(z_3-z_1)(z_4-z_1)=0 \tag{16}$$

At block 330, using the nine equations given above, the system can determine the nine unknown relative xyz-coordinates of tags 2, 3, and 4 (with respect to the corner tag). These coordinates completely define the orientation of the tagged object with respect to the line of sight of RFID reader. The process ends at block 399.

Process 300B can be implemented on top of any existing UHF RFID system or protocol, for example ISO and Gen2, without any modification to the RFID tags, RFID reader hardware, or RFD reader antennas.

Application: Tilt Sensing with Smart Spatial Identification (SID) Label

Figure 3C:
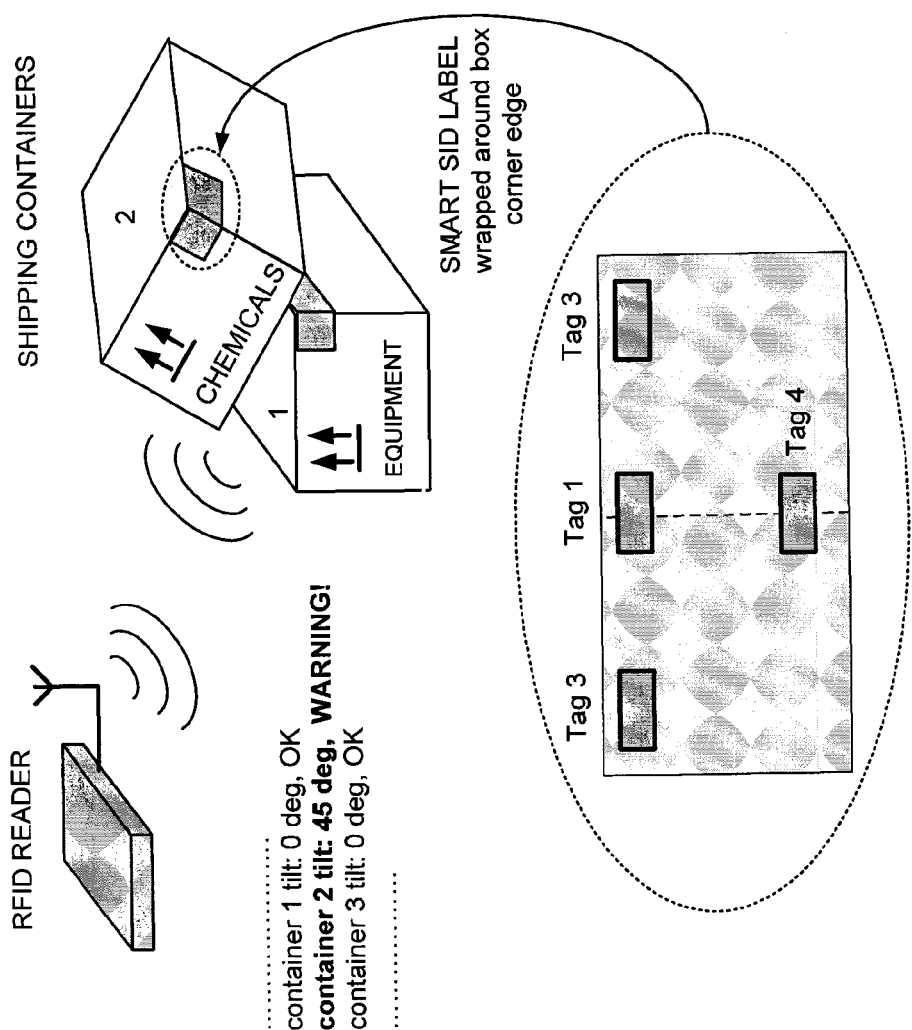
FIG. 3C depicts the structure of an example smart spatial identification label used to detect changes in orientation of a tagged item.

FIG. 3C depicts the structure of an example smart spatial identification label used to detect changes in orientation of a tagged item using a single RFID reader antenna. As shown in the bottom of FIG. 3C, four RFID tags (inlays) can be placed inside a sticky label to form one smart spatial identification (SID) label. A first tag is positioned a known first distance above a second tag along a first line, a third tag is positioned a known second distance to the left of the first tag, and a fourth tag is positioned a known third distance to the right of the first tag. The first, third, and fourth tags are substantially aligned along a second line that is substantially perpendicular to the first line, i.e.) in a T-shaped configuration. Further, the first, second, and third distances are less than half a wavelength of an RF signal transmitted by an RFID reader to trigger tag responses that will allow the reader to sense the tilt of the tagged item. In one example, the first, second, and third distances are the same. Alternatively, the tags in the label can be rotated 180 degrees such that the second tag is above the first tag.

If multiple antennas are used with an RFID reader to detect responses from multiple tags on an object, the locations of the tags, and thus the orientation and size of the object, can be determined by the reader. In this scenario, a SID label can comprise any RFID tag configuration using three more tags.

The right side of FIG. 3C shows how the label can be appropriately wrapped around a box corner. The label can have markings indicating how it should be wrapped around the box corner. Alternatively, the label can be wrapped around any edge of the box, not necessarily positioned at a corner. An RFID reader, as shown on the left side of FIG. 3C, decodes the signals from the tags inside the label, and extracts information about the orientation of the box as described above. Such a label can be used for sensing the tilt level of the tagged object, such as a shipping cargo container.

In the above example with four RFID tags, the tilt of the tagged object can be determined along two different directions. In one example, only two RFID tags need to be used on a smart spatial identification label to detect changes in orientation of a tagged item along one direction. Then the distance between the two RFID tags and the relative location of a first tag with respect to a second tag may be known in order to detect an orientation change of the tagged object.

Non-limiting applications where it would be useful to sense the tilt of an object include delicate equipment and explosive chemicals that should be stored or transported in a proper (e.g., upright) position to prevent damage, spill, or explosive chemical reaction. If the orientation of a tagged item changes, immediate corrective action can take place on the tagged item to prevent damage, spill and disaster as soon as the signal received from multiple tags on the tagged object is decoded by an RFID reader to extract orientation information. The RFID reader can issue a warning if one of the shipping containers is tilted.

One-Dimensional Spatial Identification of RFID Tags

Figure 4:
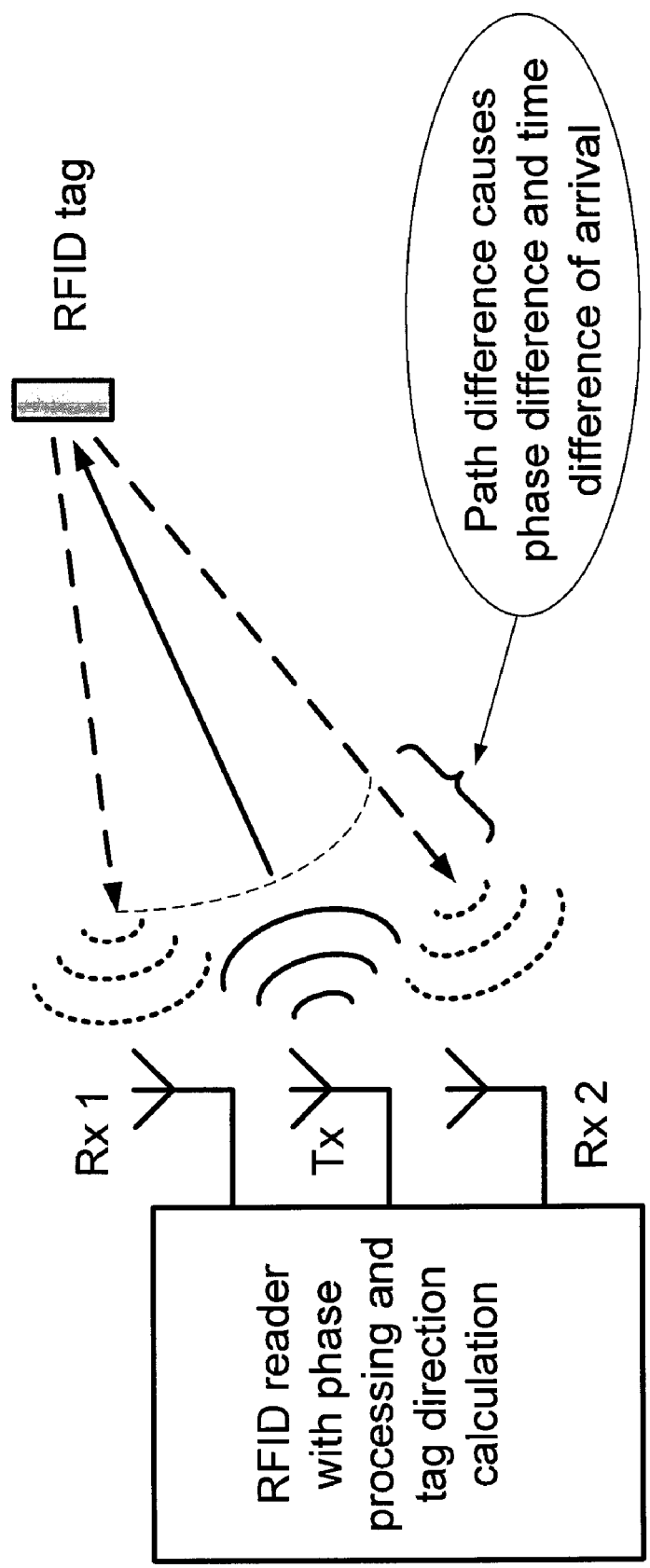
FIG. 4 illustrates a system for estimating one direction or one angle where a tag is located.

FIG. 4 illustrates a system for estimating one direction or one angle to where the tag is located. The RFID reader uses three antennas, two receiving antennas and a transmitting antenna located between the receiving antennas. The estimation of the direction is based on measuring a phase angle difference between two receiving antennas which is correlated to the time-difference-of-arrival (TDOA) of the tag signal between the receiving antennas. The distance and angle of the tag relative to the two antennas can be calculated using the general framework described above.

The system described herein can also estimate the direction (the plane in which the tag lies) with only two antennas, where one of the two antennas combines transmit/receive functionality using a circulator.

Three-Dimensional (3D) Spatial Identification

With three receiving antennas, two angle measurements can resolve the position of a tag to a line in space, and four receiving antennas yield three angle measurements that can resolve the position of a tag to a point in space. Various antenna arrangements are possible. The number of antennas can be further reduced by combining transmit and receive functionality of some antennas and by re-using antennas to form different reference pairs.

Figure 5:
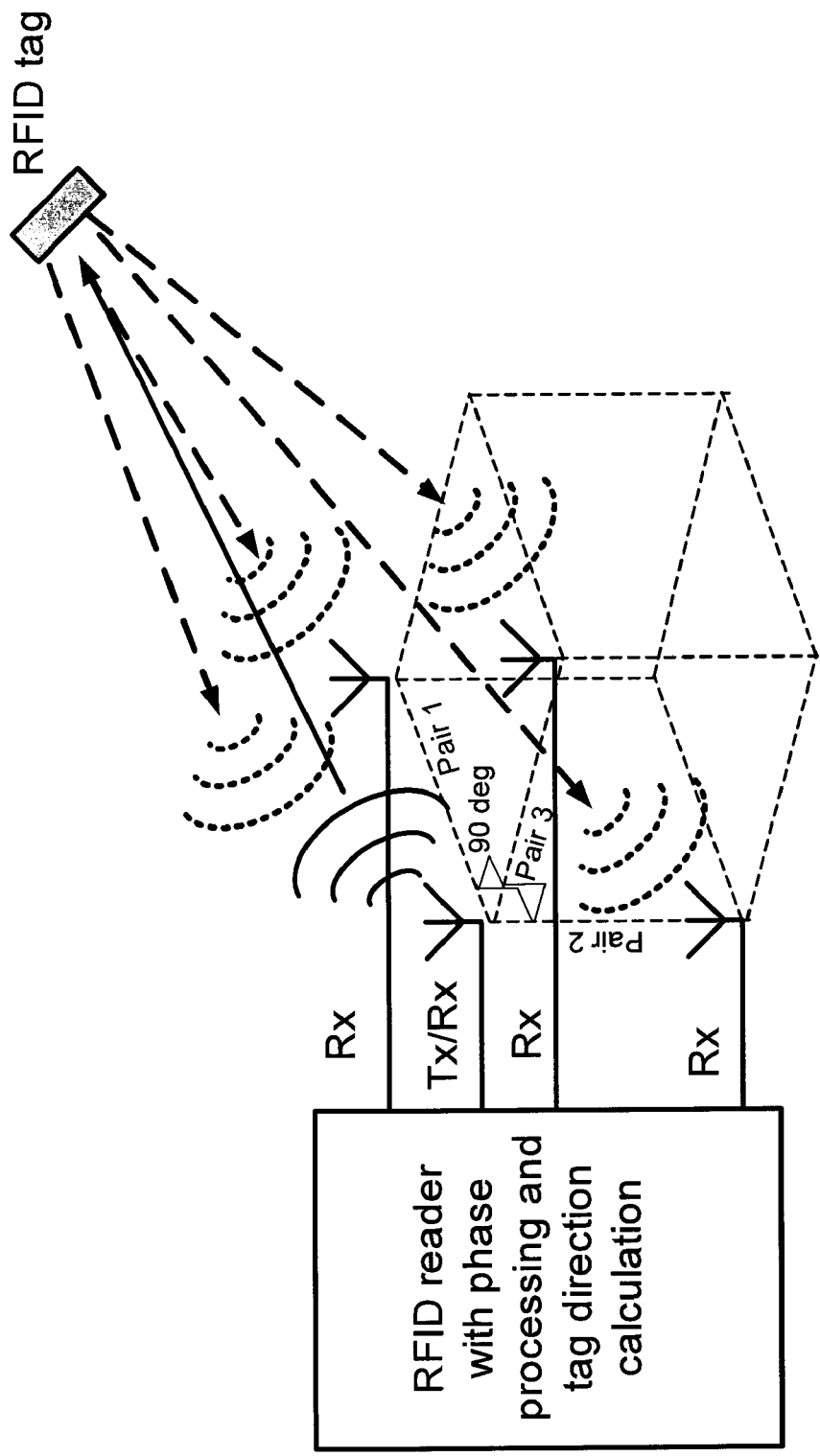
FIG. 5 shows a cube-like arrangement of four antennas used for three-dimensional spatial identification of RFID tags (one antenna transmits and receives, three other antennas receive).

FIG. 5 shows one possible arrangement where a reader employs four total antennas, and one antenna combines transmit and receive functionality. Antennas are arranged in a cube-like fashion (located on the corners of an imaginary cube). The antenna that combines transmit and receive functionality is located on a first corner, and the other three receiving antennas are each located on a corner that is a neighbor to the first corner. Thus, each of the other three receiving antennas is an equal distance from the first corner. An analysis of this system is described below.

Figure 6:
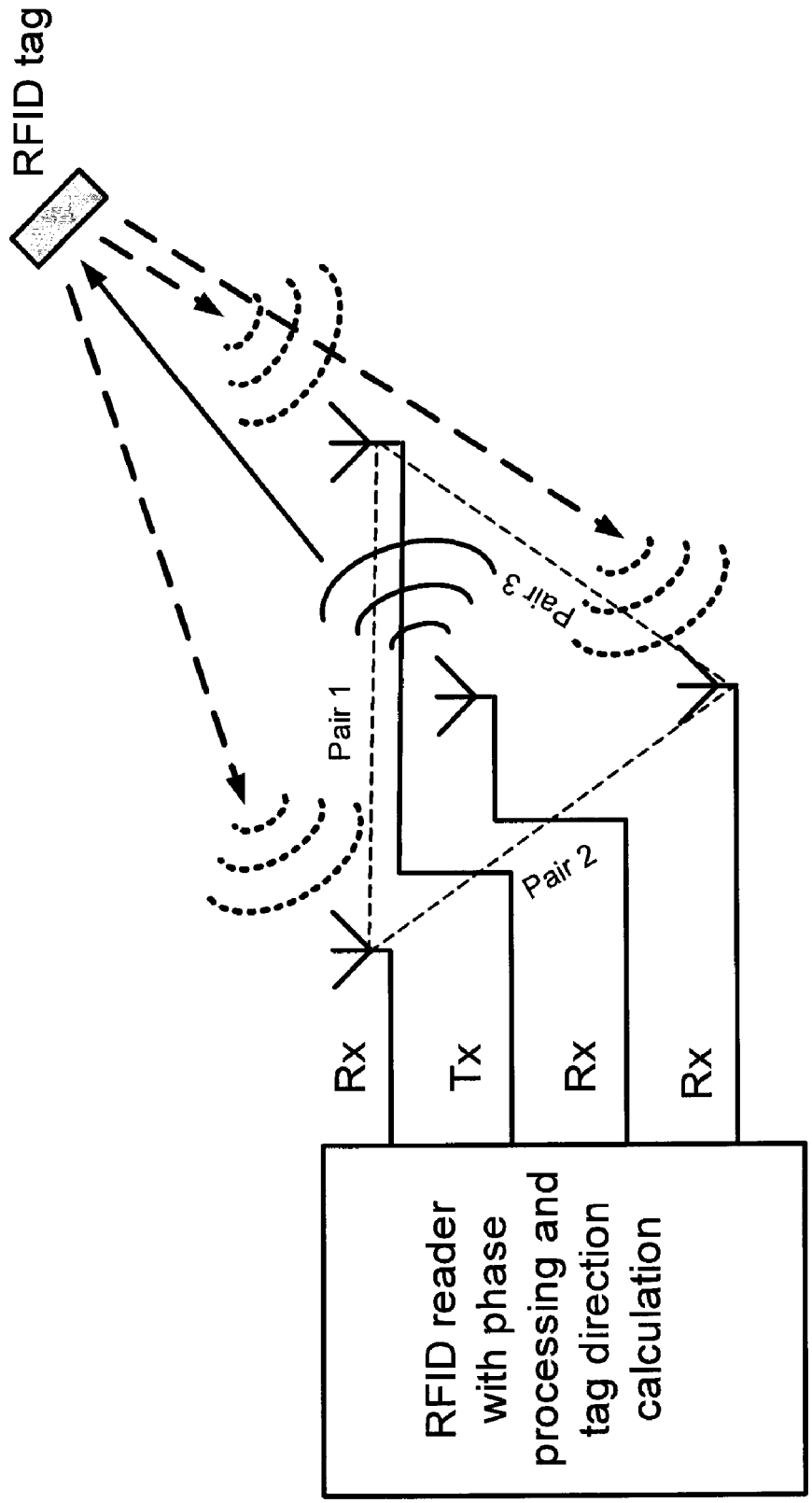
FIG. 6 shows a flat arrangement of four antennas used for three-dimensional spatial identification of RFID tags (one antenna transmits, three other antennas receive).

Another possible antenna arrangement can be used where a reader employs four total antennas, and one antenna transmits while three other antennas receive. Antennas are arranged on the vertices of an imaginary triangle with the transmitting antenna within the triangle. Alternatively, as shown in FIG. 6, the transmitting antenna is placed at one of the vertices of the triangle, and a receiving antenna is placed somewhere within the triangle. This arrangement has an advantage in terms of accuracy and sensitivity because it uses separate transmitting and receiving antennas.

Figure 7A:
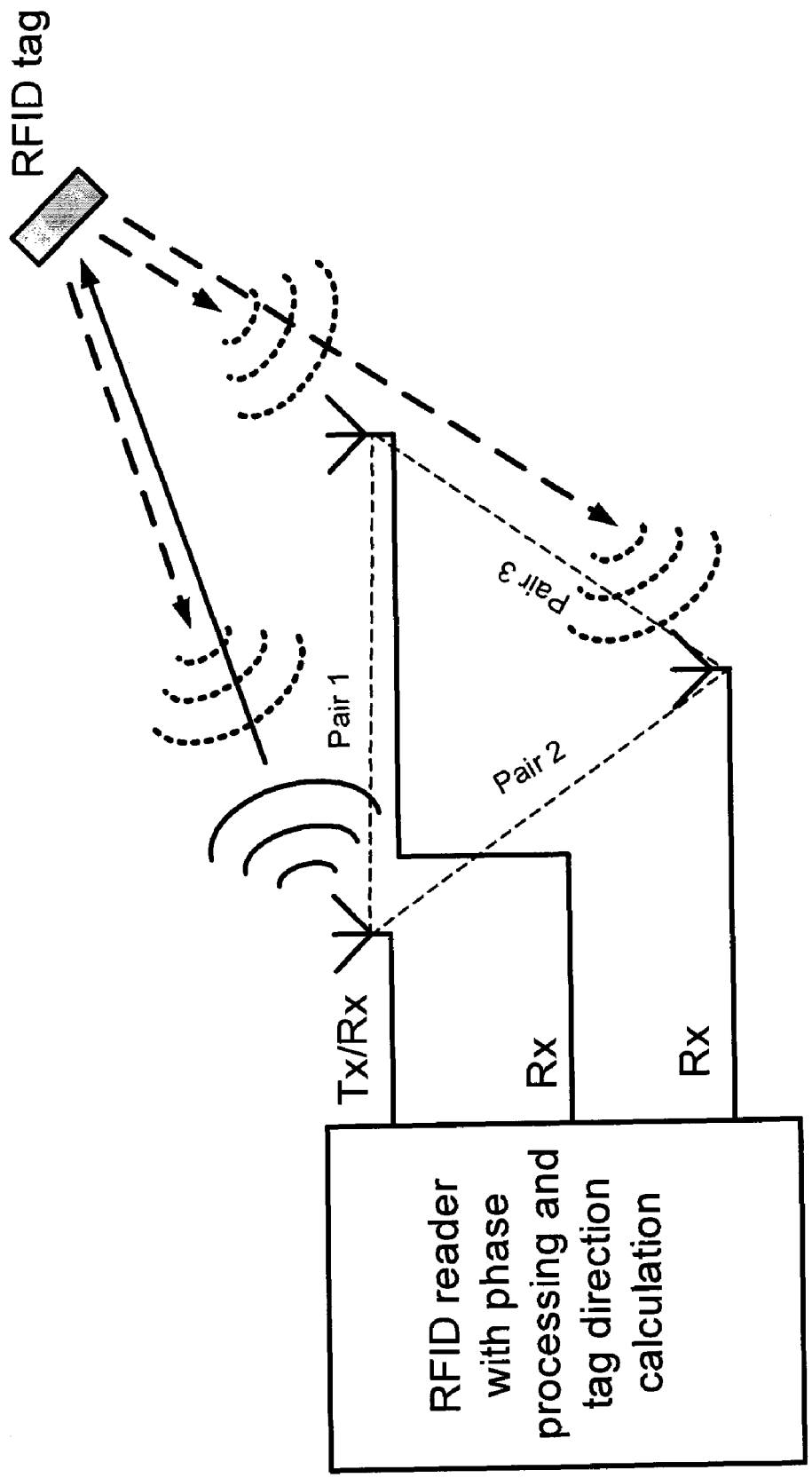
FIG. 7A shows a triangular arrangement of three antennas used for three-dimensional spatial identification of RFID tags (one antenna transmits and receives, two other antennas receive).

Three antennas are the minimum number of antennas that can be used for three-dimensional spatial identification, and one of the antennas must combine transmit and receive functionality. The example of FIG. 7A shows such an arrangement where one antenna transmits and receives, and all the antennas are arranged on the vertices of an imaginary triangle.

An error in angle estimation will create an ambiguity in the plane, line, or point to a wedge, cone, or ball, respectively, in space. Estimation of the angles becomes more accurate when the tag is far from the receiving angles such that the radius of the tag distance is much larger than the separation of the receiving antennas, while estimation becomes more inaccurate when the tag is close. However, given a constant error in angle estimation, the ambiguous shapes (wedge, cone, or ball) become larger as the tag moves farther away from the receiving antennas. At some distance between these extremes of angle error and shape ambiguities, the reader will optimally provide spatial identification of the RFID tag.

In one example, each antenna in the RFID reader can have both transmit and receive functionality. This type of antenna configuration can advantageously be used with most off-the-shelf commercial RFID readers that are monostatic and have four antenna ports that can be internally switched to the monostatic port.

Figure 7B:
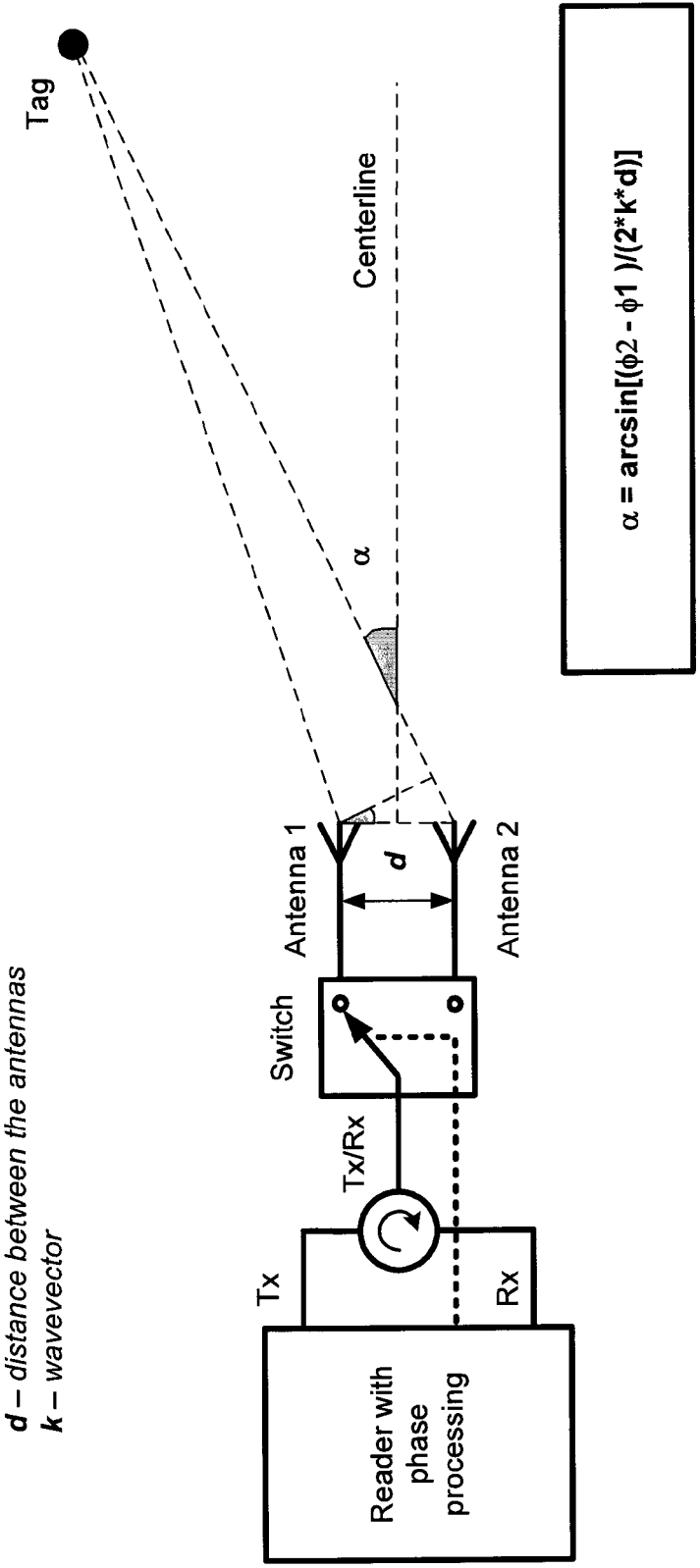
FIG. 7B shows an RFID reader with two antennas that each have transmit and receive functionality.

Further, when each antenna in the RFID reader has both transmit and receive functionality, the number of antennas required to identify a tag's direction is reduced to two. FIG. 7B shows an RFID reader with two antennas that each have transmit and receive functionality. The two antennas, antenna 1 and antenna 2, are parallel and separated by a distance d and both receive tag signals from the tag. The phases of the tag signal received at antenna 1 and antenna 2 are φ1 and φ2, respectively. The angle between the tag direction and the centerline between the two antennas is α, where the centerline is parallel to the two antennas and located midway between the antennas. The wavevector is k. Then the angle α is given by: arcsin [(φ2−φ1)/(2·k·d)] and can be calculated by the RFID reader.

Figure 8A:
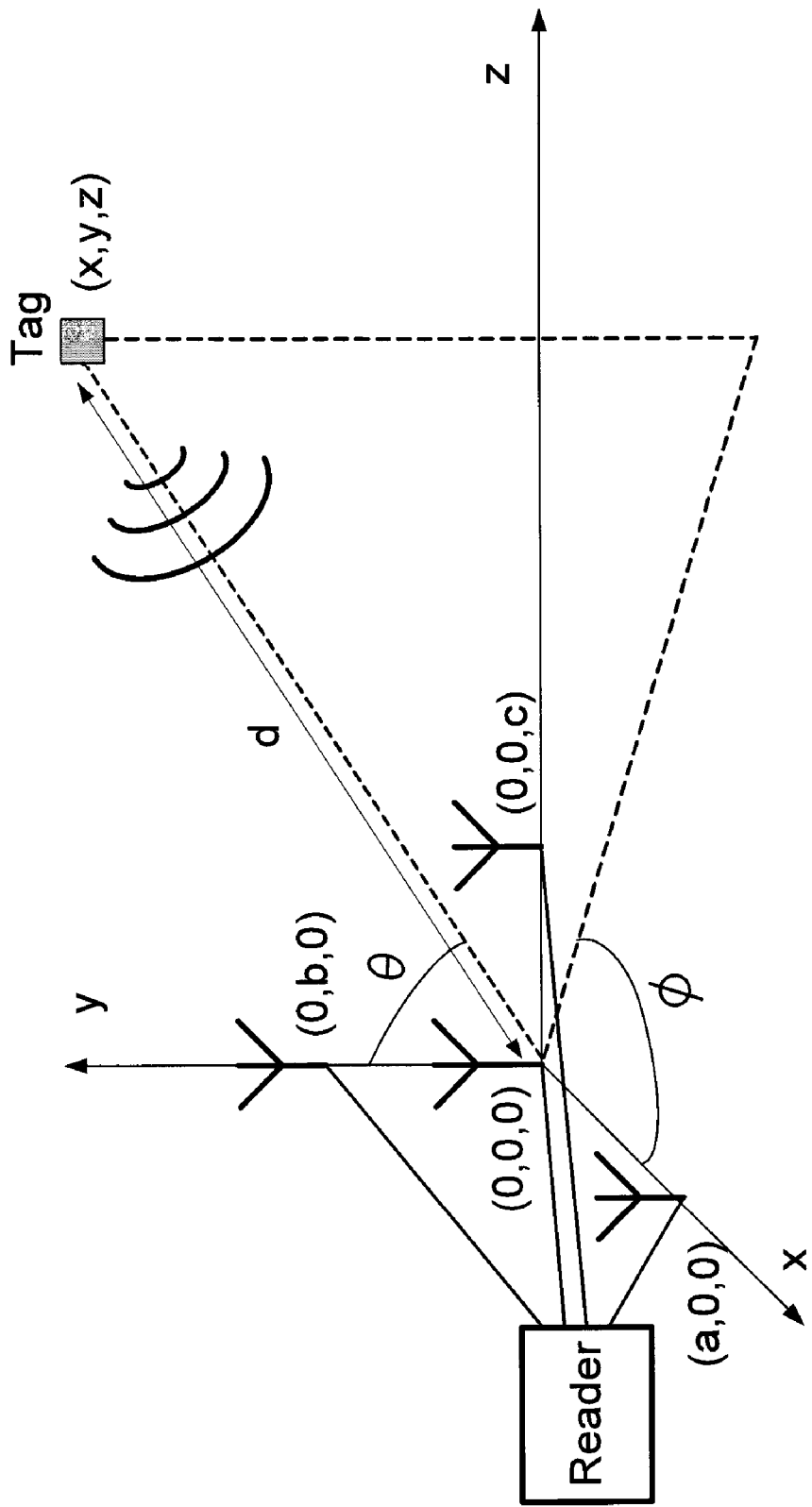
FIG. 8A is a system diagram showing an example of the variables used with a multiple antenna single tag (MAST) system.

FIG. 8A is a system diagram showing an example of the variables used with the MAST system shown in FIG. 5 to determine the position of an object tagged with one RFID tag by using four RFID reader antennas. Determining the position of the RFID tag on the object is analogous to the above SAMT process 300B because the equations for a SAMT system are interchangeable with the equations with a MAST system. In the system shown in FIG. 8A, instead of one reader antenna, the reader employs four antennas; instead of four tags there is now one tag.

Then the spatial angles theta and phi that define the orientation of the tag with respect to the central reader antenna (0,0,0) can be determined. If distance d to the tag is also known (for example, from signal strength measurement), the absolute coordinates of the tag (x,y,z) can also be determined as:

$$x = d \sin \theta \cos \phi$$

$$y = d \cos \theta$$

$$z = d \sin \theta \sin \phi \quad (17)$$

Alternatively, the intersection of three hyperboloidal surfaces can be determined using SD-PDOA. This method will be as described below. In particular, the reader can use equation (45) to determine the tag's location.

Determining the Size of a Tagged Object with a MAMT System (Multiple Antennas Multiple Tags)

Figure 8B:
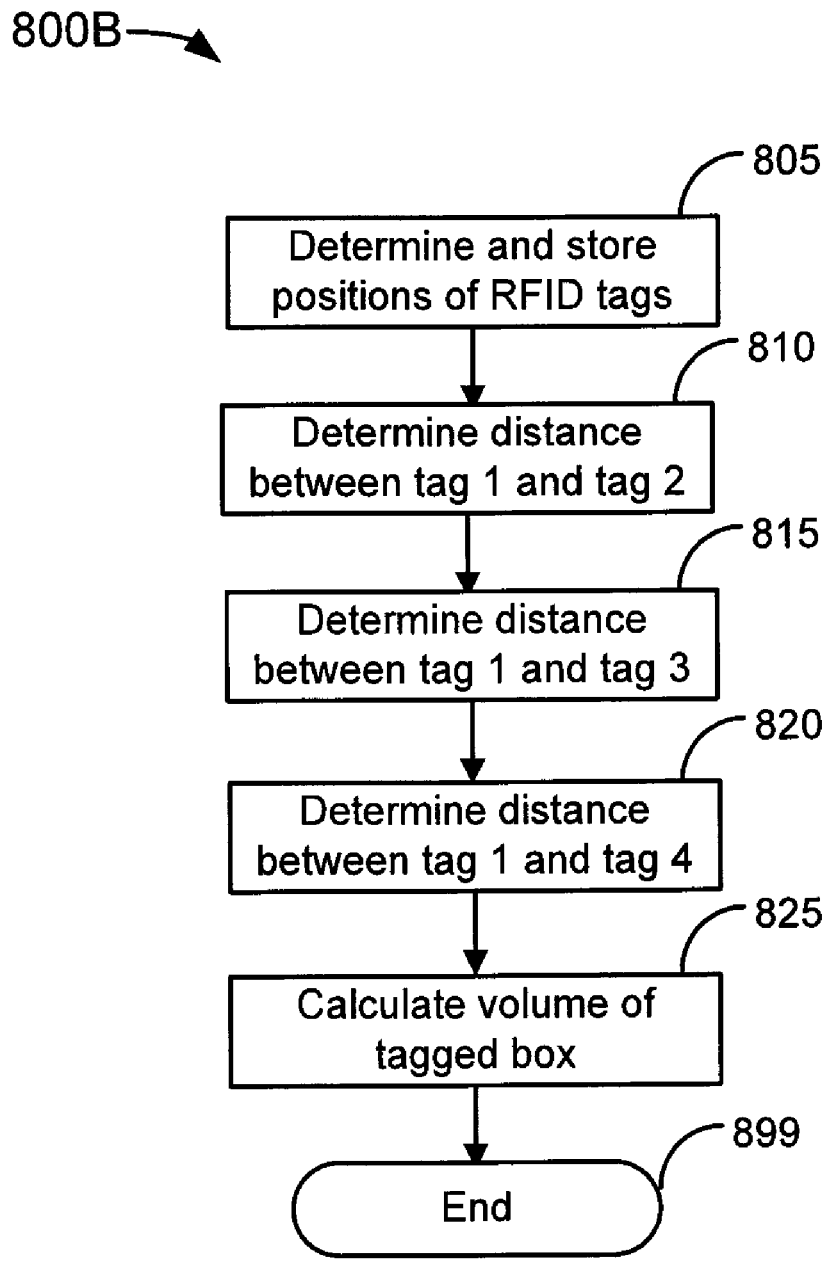
FIG. 8B depicts a flow diagram illustrating a suitable process for finding the volume of a tagged box-shaped object using four RFID reader antennas.

FIG. 8B depicts a flow diagram illustrating a suitable process 800B for finding the volume of a tagged box-shaped object using four RFID reader antennas.

A box-shaped object is tagged with four RFID tags. The first tag is placed on one of the corners of the box. The other three tags are each placed at a different corner of the box that is connected to the first tag by an edge of the box. Then the spacing from tag 1 to tag 2 is denoted by distance a, the spacing from tag 1 to tag 3 is denoted by distance b, and the spacing from tag 1 to tag 4 is denoted by distance c. Each of the distances a, b, and c correspond to the length of an edge of the box.

At block 805, the system uses the four RFID reader antennas to determine the Cartesian coordinates for the locations of each of the four tags using a process similar to process 300B or the SD-PDOA technique. The system stores the coordinates for the four tags in memory for further calculations.

Then at block 810, the system calculates the distance a between tag 1 (x1, y1, z1) and tag 2 (x2, y2, z2) using the distance formula:

$$a = \sqrt{(x2-x1)^2 + (y2-y1)^2 + (z2-z1)^2} \quad (18)$$

At block 815, the system calculates the distance b between tag 1 (x1, y1, z1) and tag 3 (x3, y3, z3) using the distance formula:

$$b = \sqrt{(x3-x1)^2 + (y3-y1)^2 + (z3-z1)^2} \quad (19)$$

Next at block 820, the system calculates the distance c between tag 1 (x1, y1, z1) and tag 4 (x4, y4, z4) using the distance formula:

$$c = \sqrt{(x4-x1)^2 + (y4-y1)^2 + (z4-z1)^2} \quad (20)$$

At block 825, the system calculates the volume of the tagged box by using the formula: V=abc, where the lengths of the sides of the box are multiplied together. The process ends at block 899.

Determining the Linear Velocity Vector of a Tagged Object with a MAMT System (Multiple Antennas Multiple Tags)

Figure 8C:
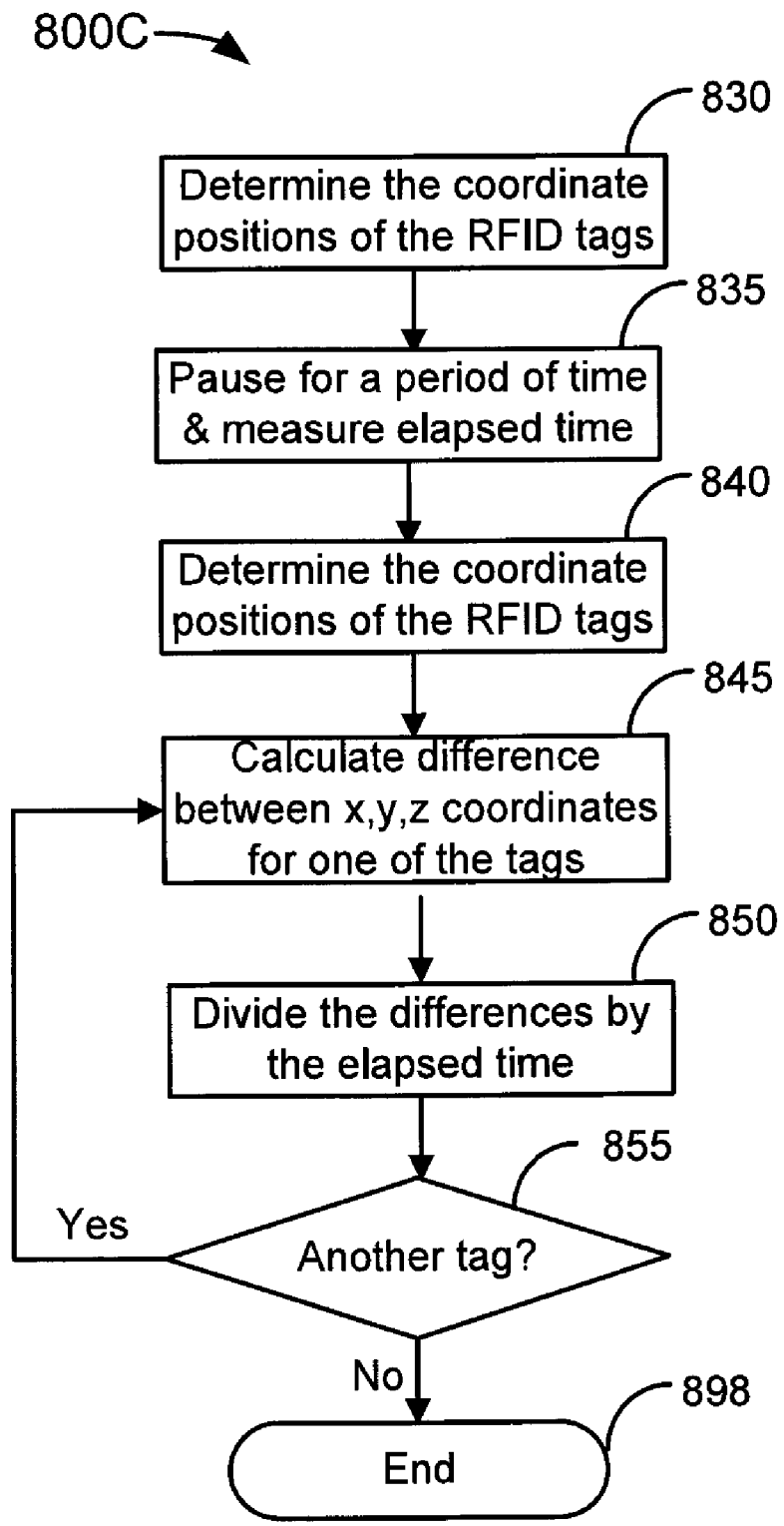
FIG. 8C depicts a flow diagram illustrating a suitable process for determining movement of a box-shaped object having four tags on four corners of the box.

FIG. 8C depicts a flow diagram illustrating a suitable process 800C for determining movement of a box-shaped object having four tags on four corners of the box.

At block 830, the system uses the four RFID reader antennas to determine the Cartesian coordinates of each tag using a process similar to 300B or the SD-PDOA technique. The RFID reader stores the coordinates for the four tags in memory for further calculations.

Then at block 835, the system pauses for a period of time and measures the elapsed time period. The duration of the pause can be pre-specified.

At block 840, the four RFID reader antennas again determine the Cartesian coordinates of each tag using the process 200B and then stored.

The system can determine the linear velocity vector of an RFID tag by taking the time derivative of the tag's three-dimensional position:

$$\vec{v} = \left(\frac{dx}{dt}, \frac{dy}{dt}, \frac{dz}{dt}\right).$$

Thus, at block 845, the system calculates the differences between the x-coordinates, the y-coordinates, and the z-coordinates for one of the tags.

At block 850, the system divides each of x-, y-, and z-coordinate differences by the duration of the pause taken between measurements of the tag's positions. The three results are the components of the linear velocity vector.

At decision block 855, the system determines if the linear velocity vector of another tag needs to be calculated. If there is another tag (block 855—Yes), the process returns to block 845 where the system calculates differences between the x-coordinates, the y-coordinates, and the z-coordinates for another tag. If the system has calculated the linear velocity vector of all the tags (block 855—No), the process ends at block 898.

Determining the Rotational Velocity Vector of a Tagged Object with a MAMT System (Multiple Antennas Multiple Tags)

Figure 8D:
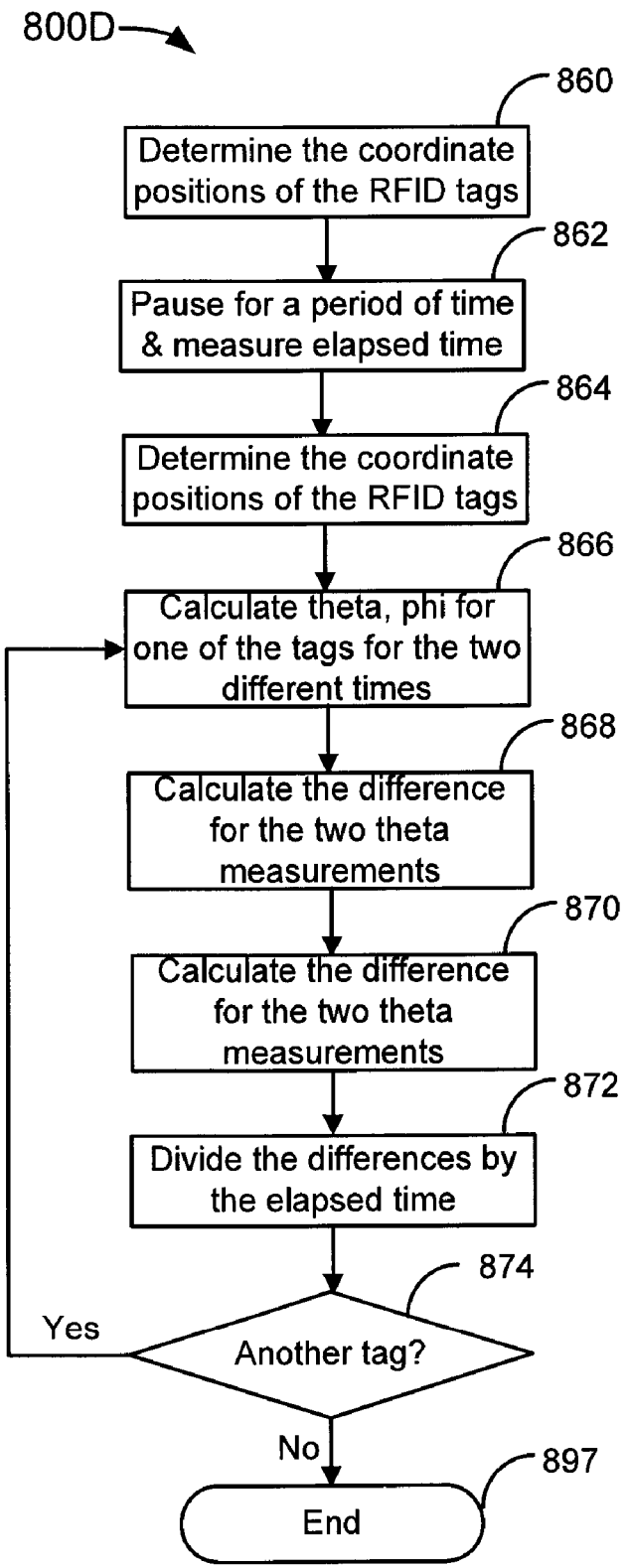
FIG. 8D depicts a flow diagram illustrating a suitable process for determining movement of a box-shaped object having four tags.

Once the three-dimensional coordinates of an RFID tag have been determined, the spherical coordinate angles theta and phi, as shown in FIG. 8A, can be straightforwardly calculated. FIG. 8D depicts a flow diagram illustrating a suitable process 800D performed by the system for determining movement of a box-shaped object having four tags.

Similar to calculating the linear velocity vector, the rotational velocity vector can also be calculated by taking the time derivatives of orientation angles of the object tagged with multiple tags:

$$\vec{v}_{rot} = \left(\frac{d\theta}{dt}, \frac{d\varphi}{dt}\right).$$

In this case, a single antenna can be used.

At block 860, the system determines the coordinate positions of the four RFID tags using by the four RFID reader antennas using a process similar to process 300B. The system stores the coordinates for the four tags for further calculations.

Then at block 862, the system pauses for a period of time and measures the elapsed time period. The duration of the pause can be pre-specified. At block 864, the system again determines coordinates of each tag as above and stores them.

At block 866, the system calculates the theta and phi angles for a first tag for the two different times, before and after the pause. Then at block 868, the system calculates the difference between the two theta measurements to obtain the change in theta, and at block 870, the system calculates the difference between the two phi measurements to obtain the change in phi. At block 872, the system divides the change in theta and the change in phi by the elapsed time to obtain the components of the rotational velocity vector for that tag.

At decision block 874, the system determines if the rotational velocity vector of another tag needs to be calculated. If there is another tag (block 874—Yes), the process returns to block 866 to calculate the theta and phi values for another tag. If the rotational velocity vector of all the tags have been calculated (block 874—No), the process ends at block 897.

Application: Tag Bearing Sensing

Figure 9:
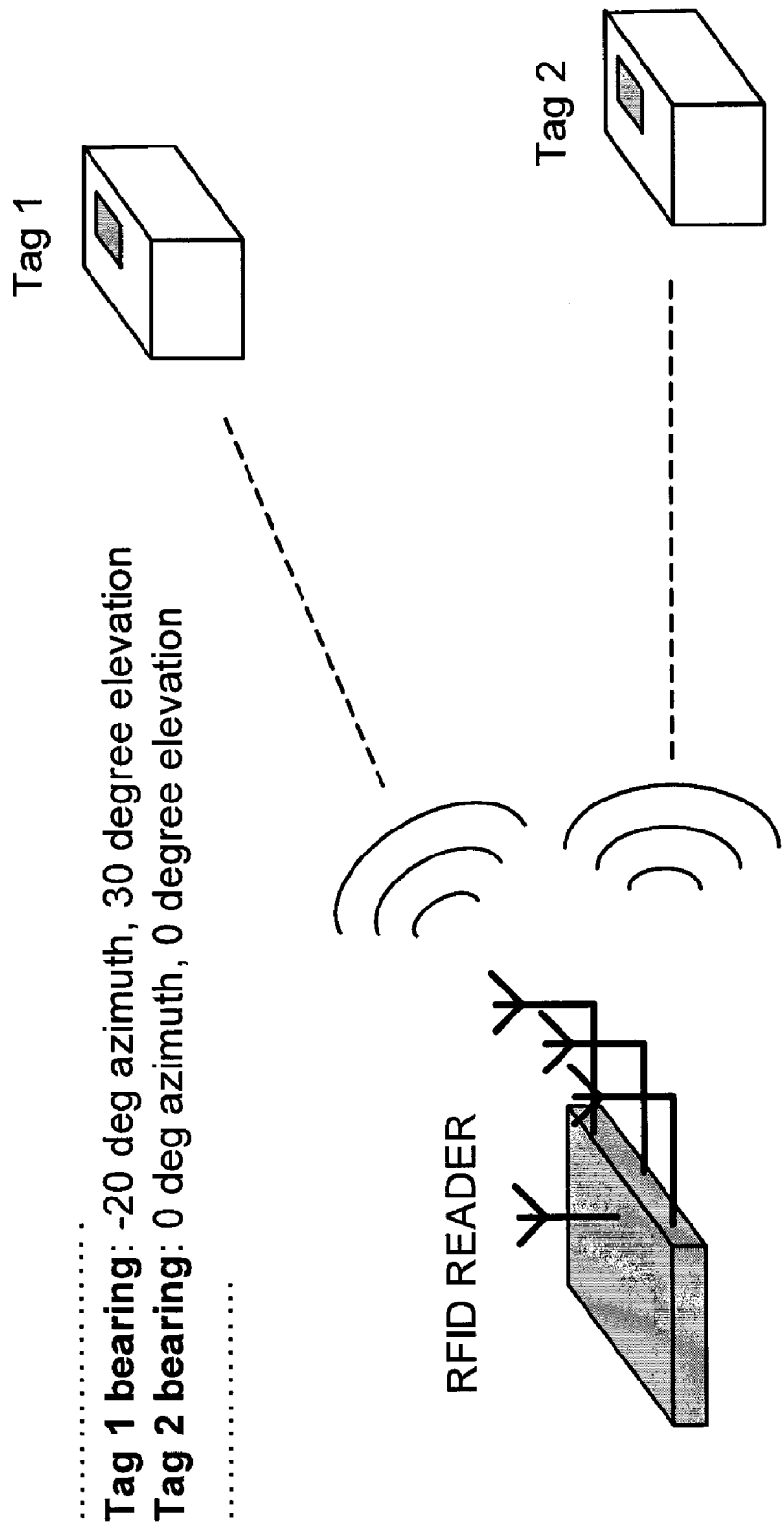
FIG. 9 shows an example system where four RFID reader antennas are used to determine the bearing of objects that each have one RFID tag.

FIG. 9 shows an example system where four RFID reader antennas are used to determine the bearing of objects that each have one RFID tag. This can be useful in a warehouse environment and many other scenarios.

Time Division PDOA (TD-PDOA)

A more detailed analysis of the TD-PDOA technique will be discussed in this section. A traveling wave is given by, $$y = A\cos\left(\frac{2\pi}{\lambda}d - \omega t\right). \tag{21}$$

where A, t, $\omega$, $\lambda$ and d are the amplitude, time, angular frequency, wavelength, and distance, respectively.

In equation (21), the first argument of the cosine function is defined as the phase $\phi$. Thus, $\phi$ is related to the distance as $$\phi = \frac{2\pi}{\lambda}d \tag{22}$$

The second argument is related to the carrier and can be ignored for the purposes of location detection. Using the velocity of light c results in $$\phi = 2\pi\frac{f}{c}d \tag{23}$$

In RFID systems that use backscatter propagation, so the total distance becomes twice the distance between the tag and the reader. Thus, the phase $\phi$ from equation (23) becomes, $$\phi = 4\pi\frac{f}{c}d \tag{24}$$

Any phase measurement has an $n\pi$ modulo problem because the phase keeps repeating every $2\pi$ radians, however the change of phase is more relevant than the absolute phase.

Differentiating the phase with respect to distance in equation (24), results in $$\frac{\partial\phi}{\partial d} = 4\pi\frac{f}{c} \tag{25}$$

As shown from equation 25, the ratio of phase difference to distance differential is a constant. In other words, the change in phase is proportional to distance, and this means that that the tag movement with respect to the reader can be determined depending on whether the phase differential is positive or negative as long as the change does not exceed 360 degrees. A positive differential would indicate the tag is moving away as opposed to a negative differential which would mean that the tag is moving closer. The tag velocity can be determined as well by using equation (24) when the velocity equation is considered, $$v = \frac{d}{t} = \frac{\partial d}{\partial t} = \frac{\partial \phi}{\partial t}\left(\frac{c}{4\pi f}\right) \quad (26)$$

Numerically, equation (26) is $$v = \frac{\phi_1 - \phi_2}{t_1 - t_2}\left(\frac{c}{4\pi f}\right) \quad (27)$$

By taking two phase measurements at two time instants $t_1$ and $t_2$, the tag velocity can be determined with the caveat that the phase difference should not exceed 360 degrees, otherwise, the time instance $t_2$ is too late.

Frequency Division PDOA (FD-PDOA)

A detailed discussion of the FD-PDOA technique will be presented in this section. Any phase measurement has a $n\pi$ modulo problem because the phase keeps repeating every $2\pi$ radians, however the change of phase is more relevant rather than the absolute phase.

Differentiating the phase with respect to frequency in equation (24), results in $$\frac{\partial \phi}{\partial f} = 4\pi \frac{1}{c} d \quad (28)$$

$$d = \frac{\partial \phi}{\partial f}\left(\frac{c}{4\pi}\right)$$

Numerically, $$d = \frac{\Delta \phi}{\Delta f}\left(\frac{c}{4\pi}\right) \quad (29)$$

As shown in equation (29), the distance d can be calculated by varying phase with respect to frequency. Even though the phase differential can have the $n\pi$ modulo effect, it can be avoided by choosing the variables appropriately. For instance, by considering some numbers in equation (29), with the distance ranging from 1 to 15 feet at two different frequency separations i.e., for $\lambda \leq d \leq 15\lambda, \Delta f = 29$ Mhz then $22 \leq \Delta \phi \leq 342$-(in degrees), and for $\lambda \leq d \leq 15\lambda, \Delta f = 2$ Mhz then $1.5 \leq \Delta \phi \leq 23.6$-(in degrees), (30)

As shown in equation (30), the distance that can be calculated without triggering the $n\pi$ modulo problem can be extended by using a smaller frequency separation.

However for the smaller frequency separation to work, the phase measurement should be very precise with a small margin for tolerance. European regulations restrict the maximum frequency separation to be 2 MHz whereas 29 MHz separation is possible in the US.

Figure 10:
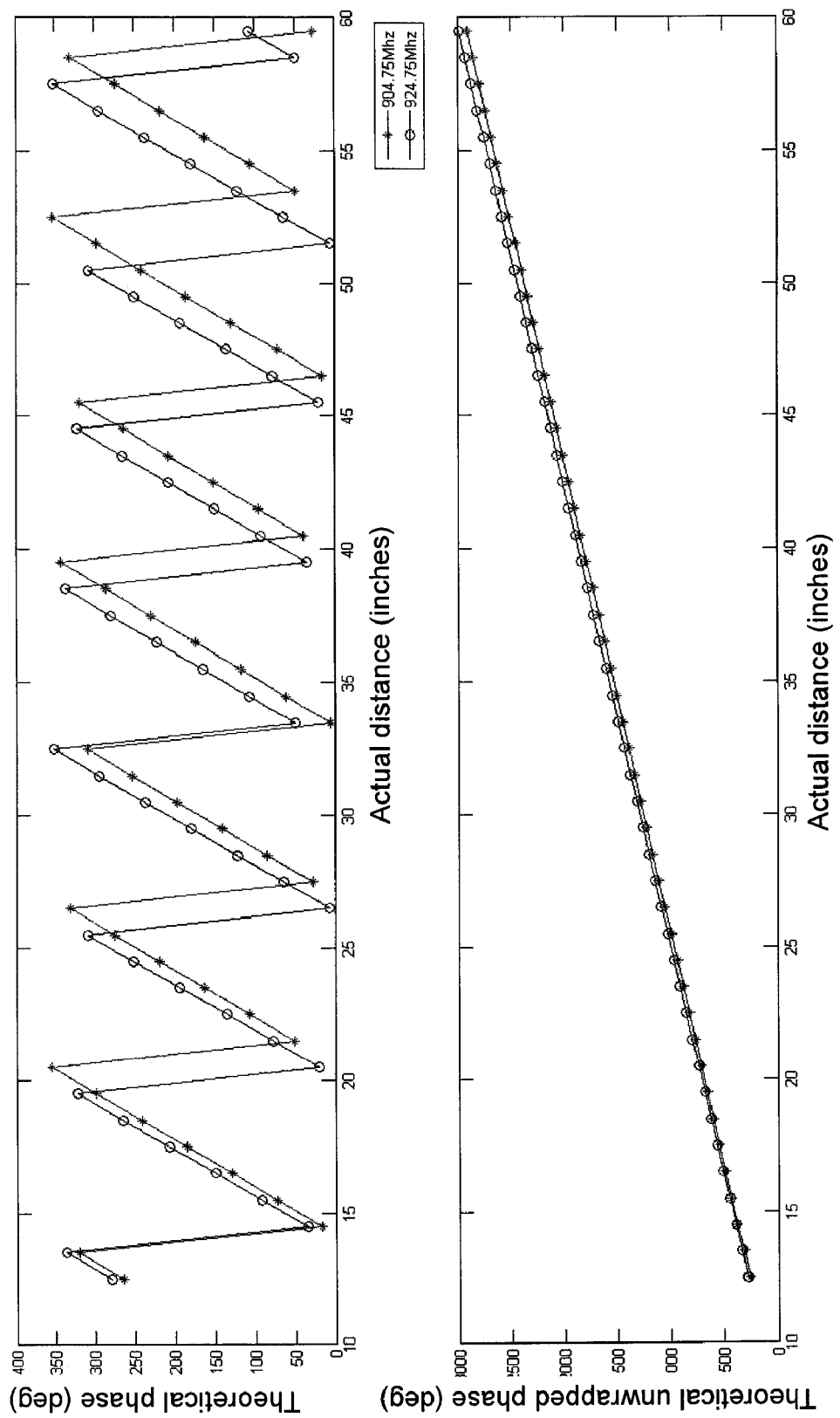
FIG. 10 shows the plot of the phase of two frequencies and distance.

FIG. 10 shows the plot of the phase of two frequencies and distance. There are two plots in the figure, the upper plot shows the phase changes at the two frequencies with distance but it repeats every 360 degrees. Unwrapping the phase exposes the linearity of the phase with respect to distance, and this can be seen in the lower plot.

Figure 11:
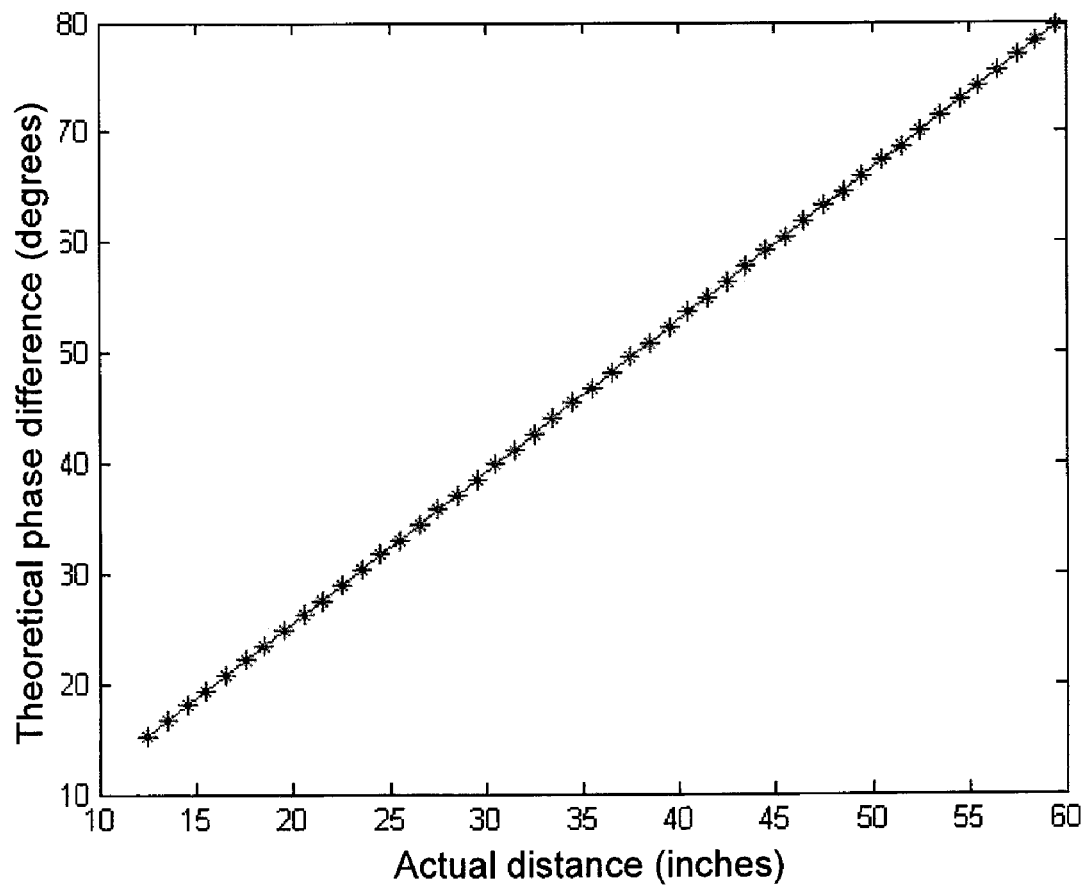
FIG. 11 shows a plot of the phase difference as a function of distance at two frequencies.
Figure 12:
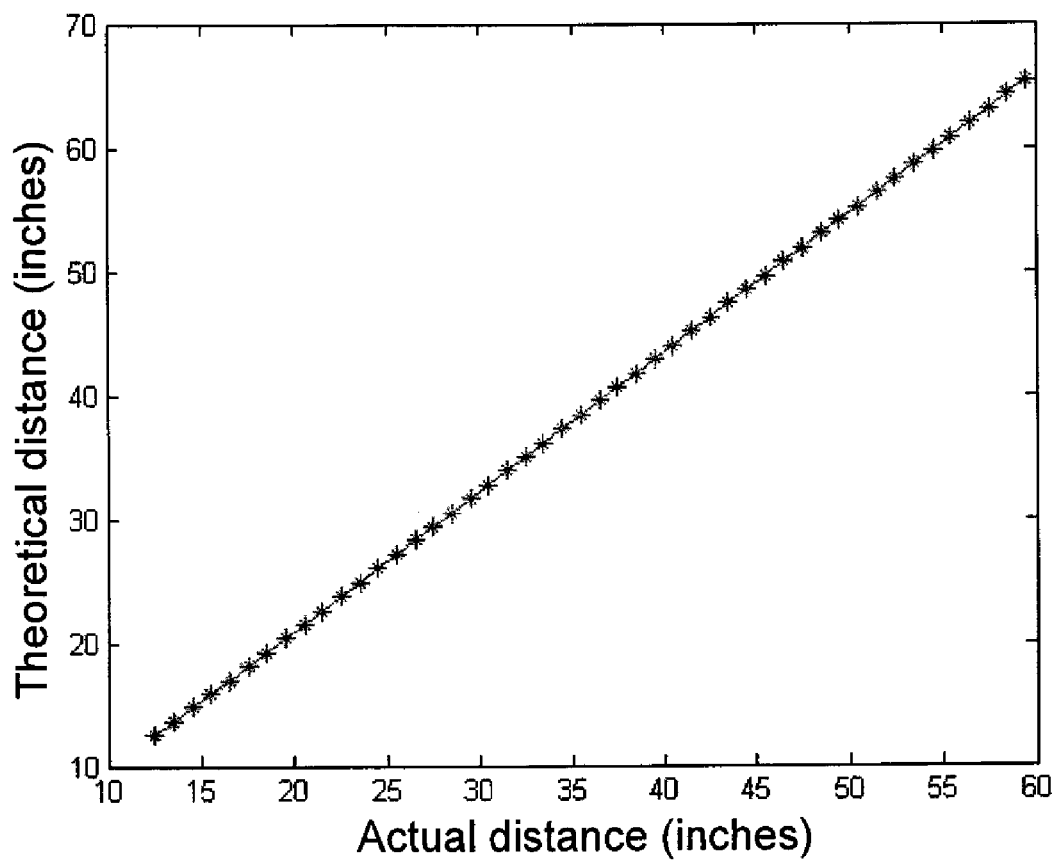
FIG. 12 shows a plot of the calculated distance compared to the actual distance.

FIG. 11 shows the plot of the phase difference at two frequencies as a function of distance. At the two frequencies considered, the phase difference is within 360 degrees, and the distance or range of the tag can be calculated as shown in FIG. 12 which shows a plot of the calculated distanced to the actual distance.

Mathematically the range calculated can be formulated in the familiar distance equation as, $$\sqrt{(x-x_1)^2+(y-y_1)^2+(z-z_1)^2} = r_1 \quad (31)$$

where (x,y,z), $(x_1,y_1,z_1)$, and $r_1$ are the locations of the tag, reader antenna and the distance between them respectively. The only unknown is the location of tag since the reader's antenna position is known a priori, and the distance can be calculated based on the measurements explained above.

Equation (31) represents a sphere of radius $r_1$. Plotting equation (31) results in a three dimensional figure of a sphere and the tag location can be anywhere on the surface of the sphere. Extending the same type of measurements to two more antennas that are spatially distinct will result in two more spheres with radii $r_2$ and $r_3$. The intersection of any two of these spheres is a two dimensional circle that is parallel to two of the axes. The intersection of three spheres is a point, and this would be the location of the tag.

Spatial Division PDOA (SD-PDOA)

The SD-PDOA technique will be described in detail in this section.

Distance, time, frequency, and phase are related by the equations, $$\phi = \omega t = 2\pi f t \quad (32)$$

$$c = \lambda f$$

$$t = \frac{d}{c}$$

where $\phi$, f, t, c, $\lambda$ and d are the phase, frequency, time, speed of light, wavelength, and distance respectively. Using the above equations, results in $$\phi = \frac{2\pi f d}{c} = \frac{2\pi d}{\lambda} \quad (33)$$

The phase measurement has a $n\pi$ modulo problem because the phase keeps circulating every $2\pi$ radians, however this problem can be minimized by considering the phase difference rather than the absolute phase.

The phase differential is obtained by using separate transmit and receive antennas. Using the same transmit antenna but receiving the tag responses on multiple antennas, the phase differential can be calculated as follows, Let $\phi_1$, $d_1$, $\phi_2$, $d_2$, be the phases and distances of the tag response measured and calculated from antennas 1 and 2, using equation (33).

$$\phi_1 - \phi_2 = \frac{2\pi}{\lambda}(d_1 - d_2) \tag{34}$$

or $$(\phi_1 - \phi_2)\frac{\lambda}{2\pi} = (d_1 - d_2) \tag{35}$$

Equation (34) shows another relation, $$|(\phi_1 - \phi_2)| \leq 180 \Rightarrow |(d_1 - d_2)| \leq \frac{\lambda}{2} \tag{36}$$

Thus, the difference in distances between the tag and each of the antennas should be less than half the wavelength such that the phase difference is less than 180 degrees to avoid phase ambiguity. An easy way to achieve this is by keeping the two antennas separated by a distance that is less than half the wavelength.

In particular, the receive antenna system should be designed to avoid coupling effects which would otherwise lead to erroneous measurements.

Figure 13:
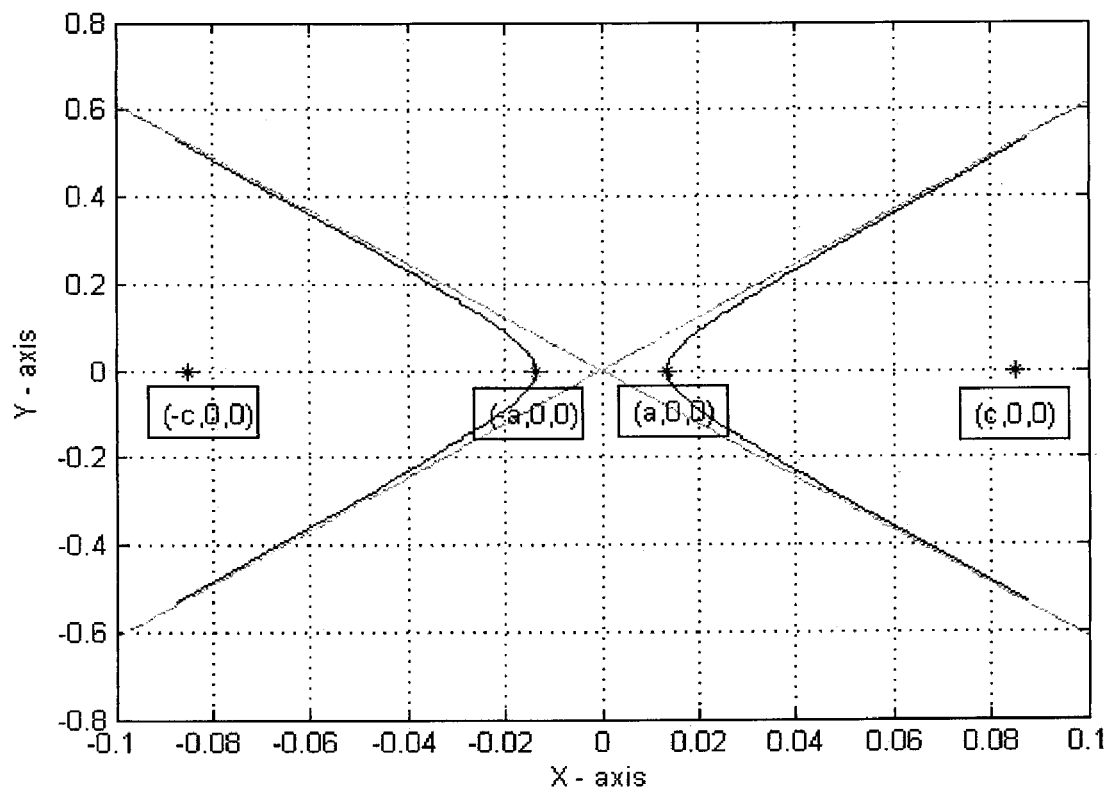
FIG. 13 shows a plot of a two-sheeted hyperbola with asymptotes. Two receiving antennas are located at the points (c,0,0) and (−c,0,0), and the two-sheeted hyperbola defines the positions where a tag can be located when applying the appropriate phase equations to the phases of the responses received from the tag at the antennas.

In analytical geometry, a hyperbola is defined as the locus of all points in a plane whose difference of distances from two fixed points is a constant. Mathematically, the hyperbola is defined by the equation, $$\frac{x^2}{a^2} - \frac{y^2}{b^2} = 1 \tag{37}$$

where (−a,0,0), (a,0,0) are the vertices of the hyperbola and $b=\sqrt{c^2-a^2}$. FIG. 13 shows a plot of a two sheeted hyperbola with asymptotes.

If the two fixed points (−c,0,0), (c,0,0) in FIG. 13 were the two receiving antennas, then calculating the distances of the tag at a particular position from these two antennas using the phase equations of (35), the tag location could be anywhere on the right or left hyperbola. Since the sign of the phase difference is known, the tag location could be only on the left or the right hyperbola, thus indicating the direction of the tag.

Solving equation (37) for y, $$y = \pm \frac{b}{a}\sqrt{x^2 - a^2} \tag{38}$$

From equation (37), if x≧a such that the tag is farther away from the antenna, the angle of direction can be approximated by the asymptotes as shown in FIG. 13. For the above plot, the vertices 'a' of the hyperbola are at a distance of 1.3 cm from the origin, and the antenna points have a separation distance of half of a wavelength which would be about 16.4 cm for a 915 MHz receiver. So if the x-intercepts of the tag locations are more than a wavelength away, the angle of direction can be approximated by the asymptotes.

Figure 14:
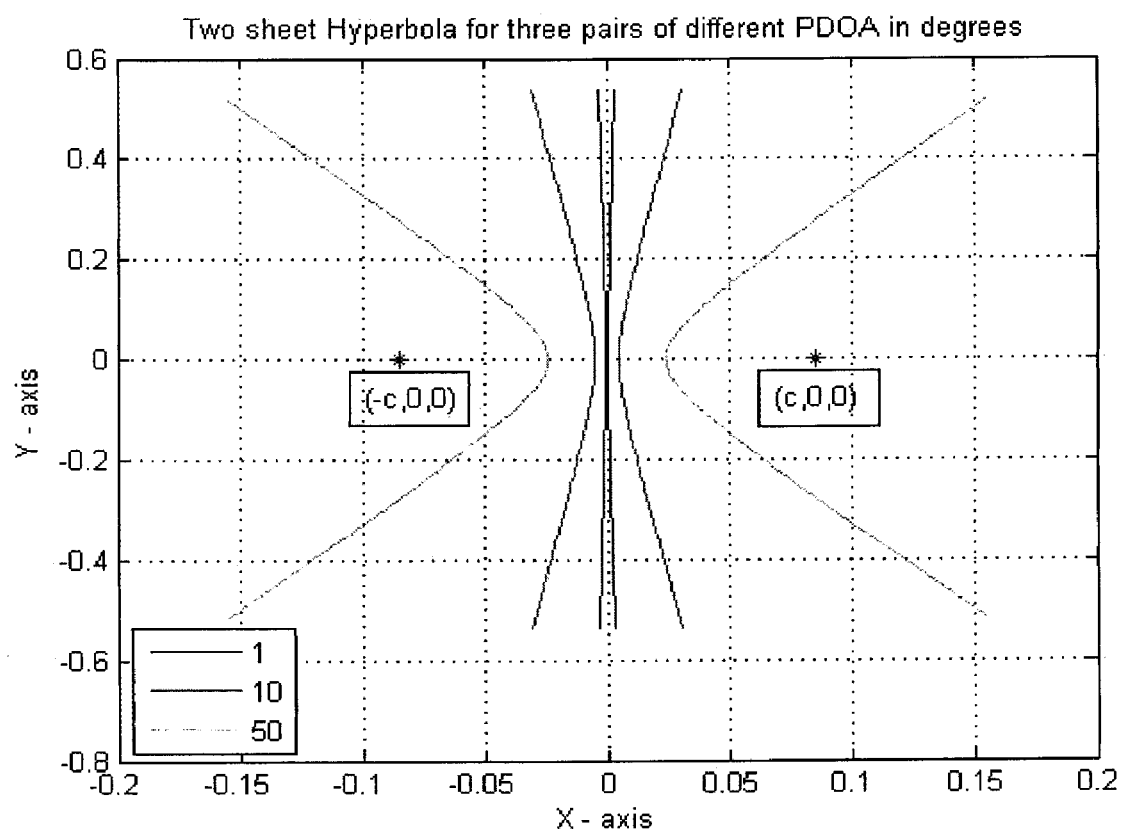
FIG. 14 shows three pairs of hyperbolas obtained from calculating phase difference of arrival of tag signals.

As the tag moves in front of the antennas, it traces different hyperbolae since the tag distances from the antenna, and hence, the difference in distance changes. This can be seen from the plot in FIG. 14 where three pairs of hyperbolas are shown in terms of the phase difference of arrivals, and this is the same as the distance difference as shown in equation (34). The six curves represent six different positions of a tag as it moves in front of the receive antennas, and the PDOA's range from −50 to +50 degrees.

Figure 15:
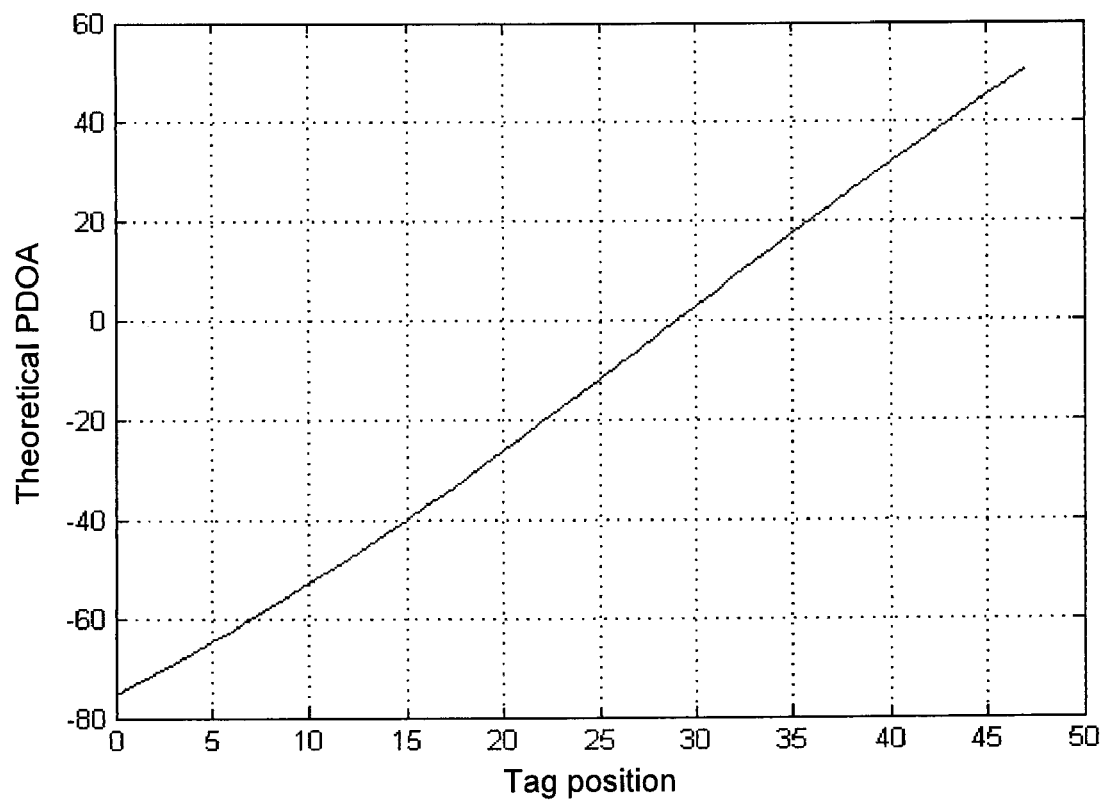
FIG. 15 shows a plot of the phase difference of a tag response as a function of distance as the tag travels in a line parallel to and in front of two receiving antennas.

A plot of the phase difference as a function of distance is shown FIG. 15 as the tag, which is on the same plane as the receive antennas, moves in parallel to the front of the two receiving antennas for a distance of 48 inches.

As the tag moves from the left to the right, the difference in distances from the tag to the antennas goes from negative to zero and then positive and the PDOA reflects that as shown in FIG. 15.

The angle or direction of the tag can be approximated by using the PDOA if the tag is further away from the reader as shown in equation (38) by using the slope of the asymptote. The vertex of the hyperbola 'a' is given by, $$2a = (d_1 - d_2) \tag{39}$$

Using equation (34) in the above equation, the vertex 'a' is given by $$a = (\phi_1 - \phi_2)\frac{\lambda}{4\pi} \tag{40}$$

The angle is then calculated using the slope of the asymptote given in equation (38) as $$\theta = \tan^{-1}\left(\frac{\sqrt{c^2 - a^2}}{a}\right) \tag{41}$$

The angle can also be determined by using the small angle approximation if the distances of the tag to the antennas are far enough as, $$\theta = \sin^{-1}\left(\frac{\phi_2 - \phi_1}{2c}\frac{\lambda}{2\pi}\right) \tag{42}$$

Mathematically, if $(x_1, y_1, z_1)$, $(x_2, y_2, z_2)$ and $(x, y, z)$ are the locations of the two receiving antennas and the tag, respectively, then using the distance formula, results in $$\sqrt{(x-x_1)^2+(y-y_1)^2+(z-z_1)^2} - \sqrt{(x-x_2)^2+(y-y_2)^2+(z-z_2)^2} = (d_1-d_2) \tag{43}$$

Substituting $(x_1, y_1, z_1)$, $(x_2, y_2, z_2)$ with (−c,0,0), (c,0,0) and substituting the difference of distances $d_1-d_2$ with 2a, after some algebraic manipulation an equation of a hyperboloid of two sheets representing a three dimensional surface results:

$$\frac{x^2}{a^2} - \frac{y^2}{b^2} - \frac{z^2}{c^2} = 1 \tag{44}$$

With just two dimensions, equation (44) turns into a hyperbola as in equation (33).

Extending the same type of measurements to a third receive antenna at $(x_3, y_3, z_3)$ that is spatially distinct from the other two will result in a third distance measurement $d_3$. Thus, three hyperboloid surfaces would be defined with three pairs of distance differences, i.e. $(d_1-d_2)$, $(d_1-d_3)$ and $(d_2-d_3)$. Using the distance formula as before, results in $$\sqrt{(x-x_1)^2+(y-y_1)^2+(z-z_1)^2} - \sqrt{(x-x_2)^2+(y-y_2)^2+(z-z_2)^2} = (d_1-d_2)$$

$$\sqrt{(x-x_1)^2+(y-y_1)^2+(z-z_1)^2} - \sqrt{(x-x_3)^2+(y-y_3)^2+(z-z_3)^2} = (d_1-d_3)$$

$$\sqrt{(x-x_2)^2+(y-y_2)^2+(z-z_2)^2} -$$
$$\sqrt{(x-x_3)^2+(y-y_3)^2+(z-z_3)^2} = (d_1-d_3) \quad (45)$$

Figure 16:
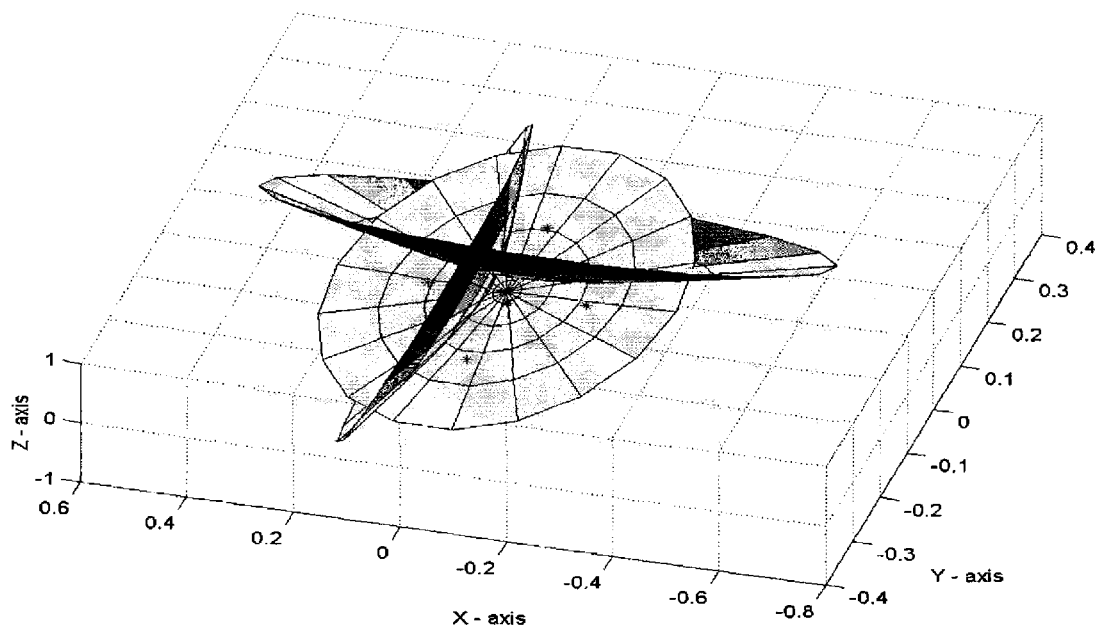
FIG. 16 shows the intersection of three hyperboloid surfaces at a point, where each hyperboloid surface corresponds to the positions where one of three tags can be located when applying the appropriate phase equations to the phases of each individual tag's responses at two receiving antennas.

The intersection of these three hyperboloid surfaces is a point as shown in FIG. 16. Numerically, the three non-linear equations (45) can be solved to determine the location of the tag.

Figure 17A:
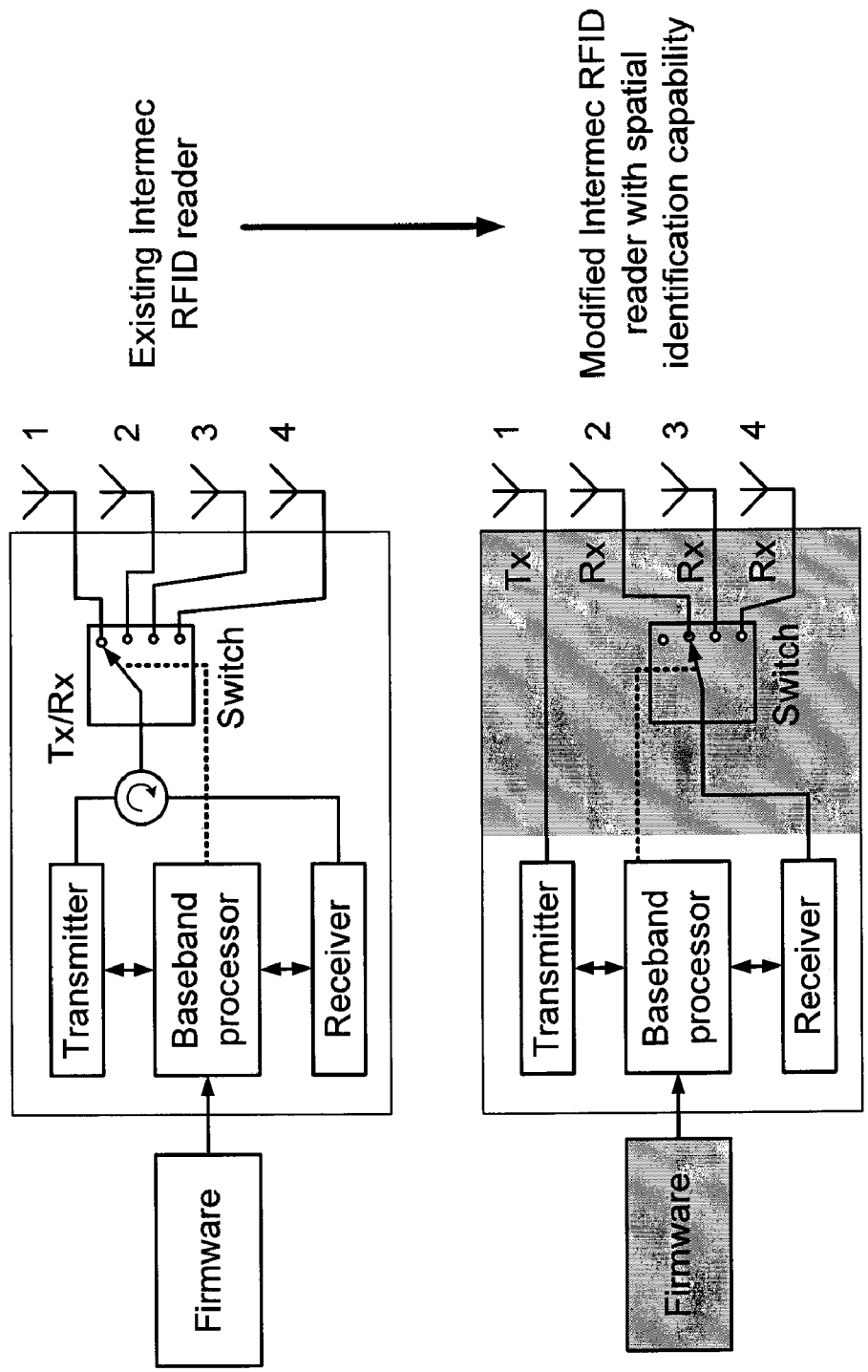
FIG. 17A shows changes (gray-shaded areas) for adding three-dimensional spatial identification capability to an existing RFID reader (e.g. Intermec IM5/IF5 reader).

Experimental Prototype for Three-dimensional Spatial Identification of RFID Tags An experimental prototype built to spatially sense an object coupled to RFID tags is described below. By making modifications to a standard RFID reader with a single channel receiver and four antenna ports, such as the IF5/IM5 series RFID reader manufactured by Intermec of Everett, Wash., three-dimensional tag position estimation can be performed using three-angle information. Modifications made to the standard reader are shown as the portions shaded gray in the block diagram in FIG. 17A. The changes include updated firmware and slight modifications to connections between the circulator, the RF switch, and the antenna ports.

Figure 17B:
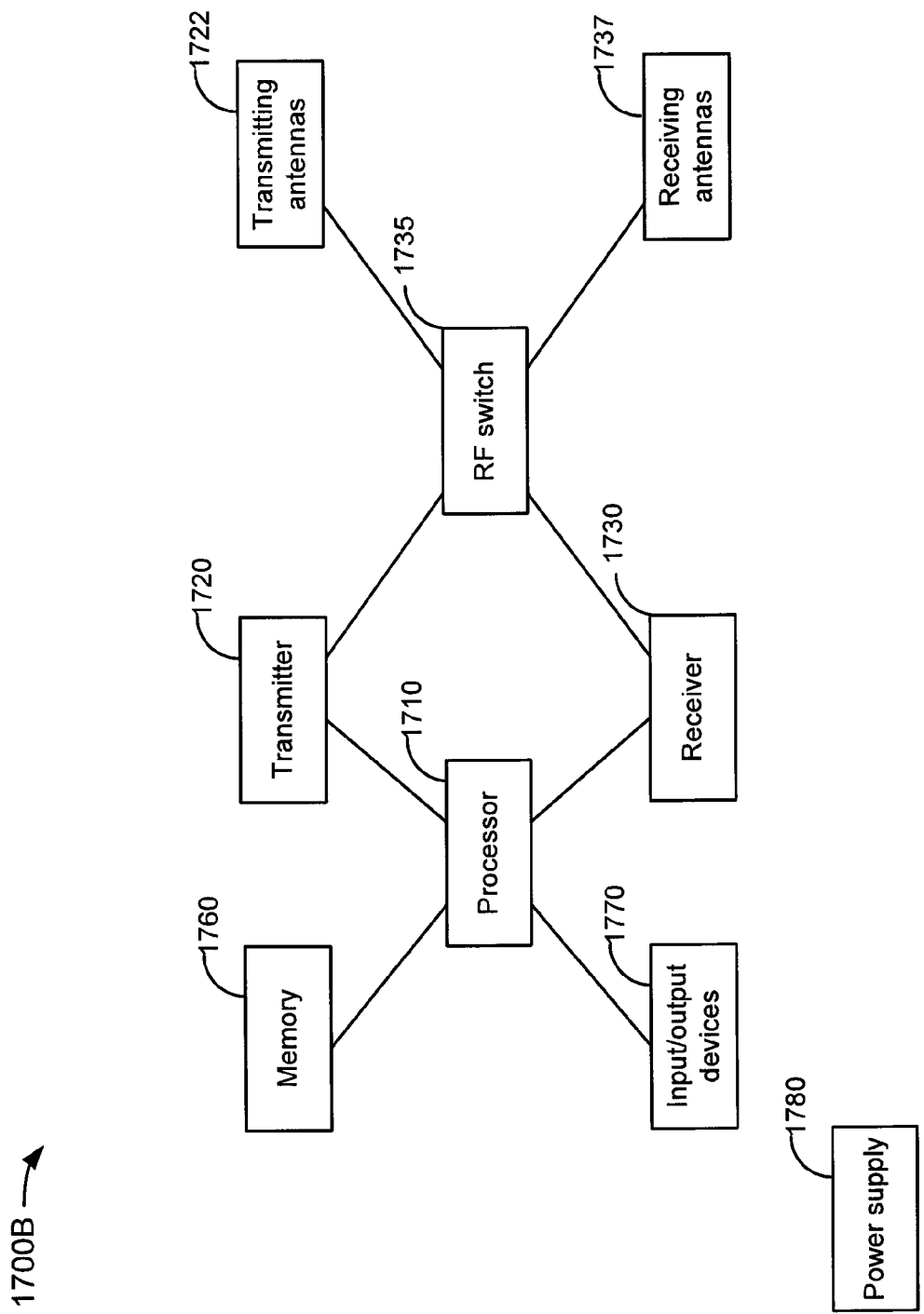
FIG. 17B shows a block diagram of an RFID reader that can determine spatial identification information about a tagged object.

FIG. 17B shows a block diagram of an RFID reader 1700B that can determine spatial identification information about a tagged object. The RFID reader 1700B can include one or more of the following elements: a processor 1710, a transmitter 1720, a transmitting antenna 1722, a receiver 1730, an RF switch 1735, a receiving antenna 1737, a memory 1760, input/output devices 1770, and a power supply 1780.

A processor 1710 runs RFID reader applications. The processor is communicatively coupled to the transmitter 1720 and the receiver 1730. The transmitter 1720 generates and encodes RF queries to be sent to RFID tags. The RF queries are then transmitted by the transmitting antenna 1722.

The receiving antennas 1737 receive RF responses from RFID tags, and the RF switch 1735 alternately couples the receiver 1730 to each of the receiving antennas 1737, depending upon which receiving antenna the processor needs information from. In one example, there can be multiple receivers 1730, and the number of receivers is less than or equal to the number of receiving antennas 1737. For the case where the number of receivers 1730 equals the number of receiving antennas, no RF switch 1735 is necessary to couple between receivers and receiving antennas. The receiver 1730 demodulates a tag response into an in-phase component and a quadrature component. The processor 1710 then uses these signals to calculate a phase for each tag response. A block diagram of a demodulator is shown below in FIG. 24.

In one example, if more than one transmitting antenna 1722 is used, a second RF switch alternately couples the transmitter 1720 to each of the transmitting antennas 1722. Similar to receivers, there can be multiple transmitters 1720, where the number of transmitters is less than or equal to the number of transmitting antennas, and no RF switch is needed if the number of transmitters 1720 equals the number of transmitting antennas 1722.

In one example, the same physical antenna can be coupled alternately to the transmitter 1720 and the receiver 1730 through the RF switch 1735. In this configuration, the same antenna can transmit RF signals to and receive RF signals from RFID tags.

Memory 1760 can include but is not limited to, RAM, ROM, and any combination of volatile and non-volatile memory. An input/output device 1770 can include, but is not limited to, triggers to start and stop the RFID reader or to initiate other RFID reader functions, visual displays, speakers, and communication devices that operate through wired or wireless communications. A power supply 1780 can include, but is not limited to, a battery.

Figure 18:
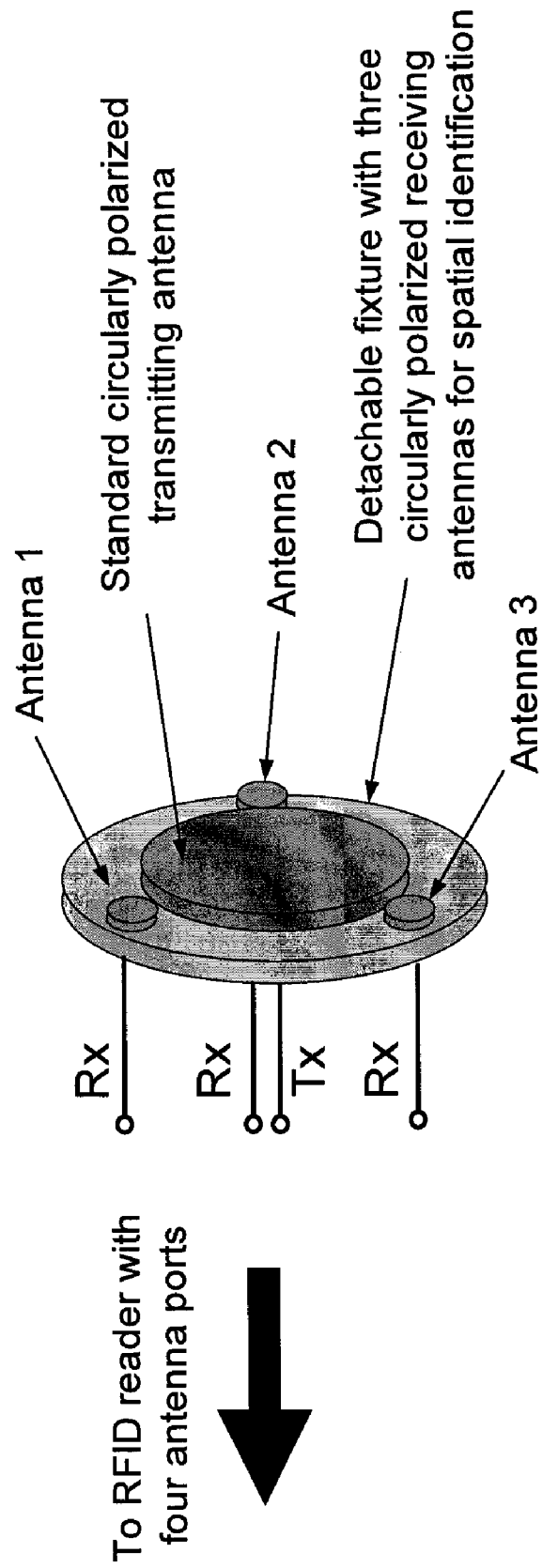
FIG. 18 shows a flat removable fixture with three receiving antennas and one transmitting antenna for adding three-dimensional spatial identification capability to an RFID reader with four antenna ports.

The three receiving antennas can be integrated into a flat removable fixture similar to the one shown in FIG. 18 which can be added to the main reader antenna when spatial identification is required. As shown, a large central transmit antenna/emitter is surrounded by three equally spaced reception antennas.

Figure 19:
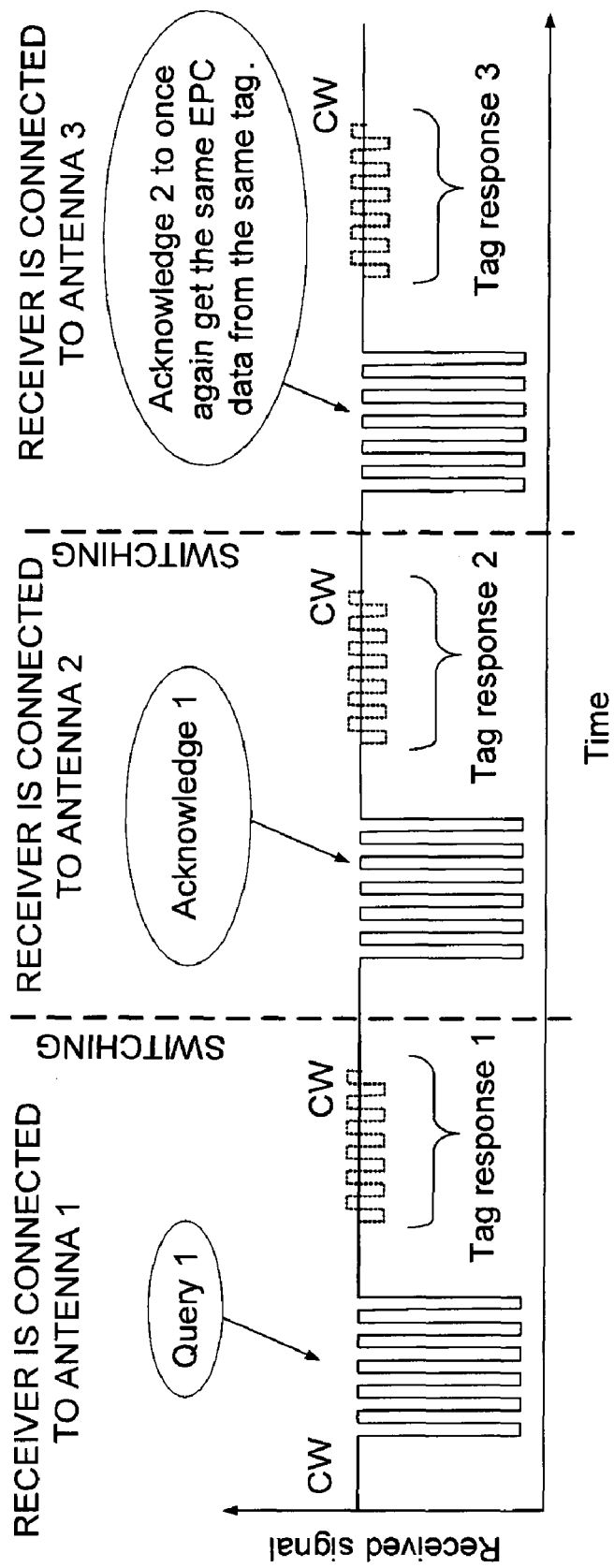
FIG. 19 shows RFID tag spatial identification with a single channel receiver using antenna switching with EPC Gen2 protocol.

RFID reader software may have an option for enabling three-dimensional spatial identification of tags. When this option is enabled, the throughput (tags/second) may slow down because several tag responses may need to be received from the tag in order to measure all angles and identify its location as shown in FIG. 19 for EPC Gen2 protocol. The switching can also be performed in the middle of a tag response if the switching time is short enough and transceiver architecture permits.

FIG. 19 illustrates that tag data identification rate does not linearly degrade in RFID readers that perform spatial identification with a single channel receiver. (At least one Query and one Acknowledge are required by Gen2 data identification, and only one extra Query is required to do spatial identification). Other time domain sequences may also be used.

Figure 20:
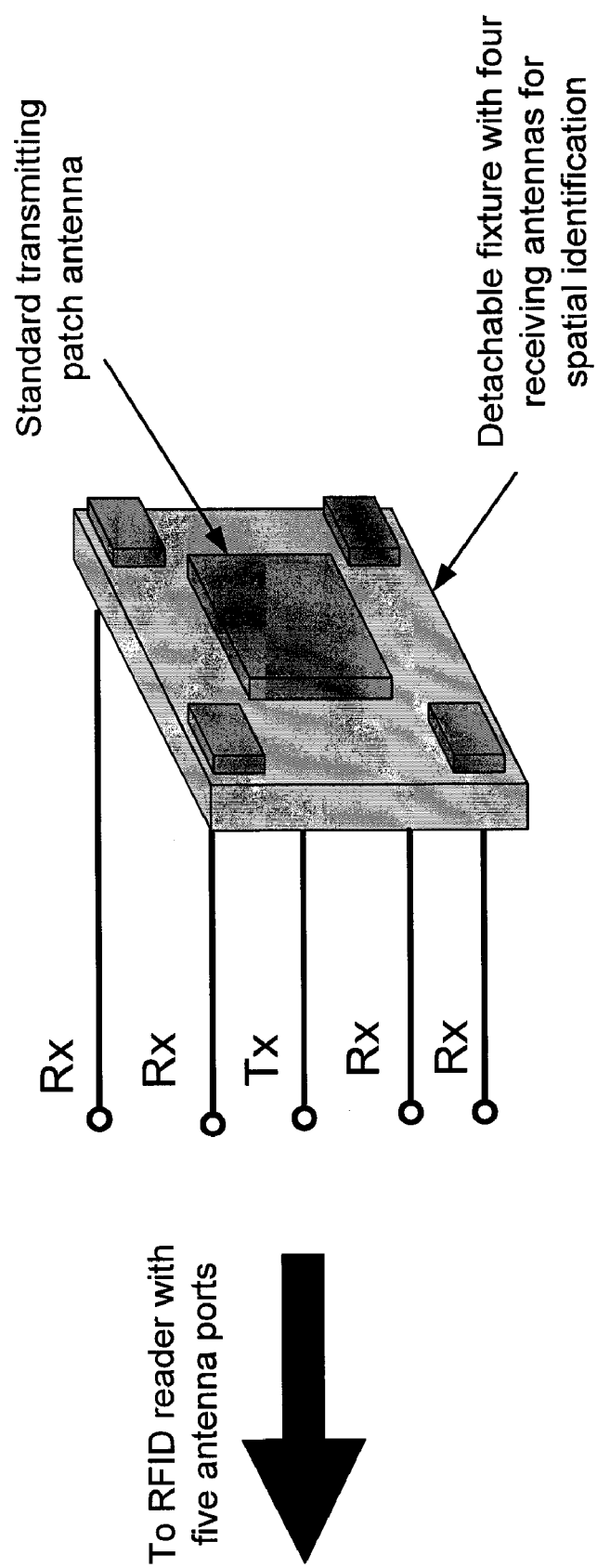
FIG. 20 shows one embodiment of a removable fixture with four receiving antennas for adding three-dimensional spatial identification capability to a RFID reader having five antenna ports.

The removable fixture with receiving antennas can have different form factors and a different number of receiving antennas. One example is shown in FIG. 20.

Additionally, or instead of multiple receiving antennas, multiple transmitting antennas can also be used for spatial identification (e.g. three antennas may transmit and one antenna may receive). Additionally, switching can be intermittent: switching between transmitting antennas can take place between queries and acknowledgements and switching between receiving antennas can take place between tag responses.

General Comments on Spatial Identification

The following sections describe information that is relevant to obtaining phase measurements of RFID tag responses for RFID spatial sensing of tagged objects.

Separation of Receiving Antennas

Ideally, the distance between receiving antennas should be less than the shortest wavelength, which is approximately 31 cm at 956 MHz, to avoid any "modulo $2\pi$" issues that arise with measuring the difference of distances. However, a larger separation between receiving antennas can sometimes assist in accurately measuring smaller angles. If the maximum angle of a tag is practically limited by the beamwidth of the transmitting antenna, the separation of receiving antennas could be larger than 30 cm to provide more accuracy in measuring small angles.

Calibration

Calibration of phase errors in the reader should occur after installation of the reader system since the reader, antennas, and connecting RF cables can all impact the phase error. However, calibration of phase errors can occur at the manufacturer if the reader and antennas are assembled together. On-site calibration can be simplified with a calibration test set constructed with a known surface, e.g. a flat piece of cardboard, with tags having known data values located at known positions on the surface. When the surface is presented at a known location before the reader system, the reader can operate through a calibration sequence to determine the phase errors. Calibration of the gain errors for the I and Q channels can occur at the time the reader is manufactured because these errors are independent of the antennas and connecting RF cables.

Impact of Spatial Identification on Data Identification Throughput

The receiving antennas can be multiplexed into one receiver or attached to individual receivers, respectively called a single channel receiver or multi-channel receiver. A single channel receiver implementation in a reader system requires two isolated responses from a tag—one for each receiving antenna—to determine one angle. Using the Gen2 protocol, two responses, RN16 and EPC from commands Query and Acknowledge, naturally occur during data identification, so Gen2 throughput will not degrade using a single channel receiver when measuring one angle. Measuring additional angles requires additional responses using a single channel receiver, so measuring two or more angles can degrade the rate of Gen2 data identification. For two or more angles, a multi-channel receiver can provide spatial identification without degradation of the Gen2 data identification rate.

Tag Motion

The use of sequential (multiple) responses to determine angle, such as with single channel receiver implementations, assumes that the tag does not move significantly between response times. Responses for Gen2 occur within 10 ms, and if the accuracy of the phase angle is limited to 10 degrees, which corresponds to less than 1 cm, movement of the tag should be limited to 1 m/sec, or 3.6 km/hr.

Propagation Environment

The presented method was described for a free-space propagation environment without the presence of reflective surfaces. The method can also be expected to work reliably in other realistic environments that can be cluttered including, but not limited to, office, warehouse, and conveyor belt environments, where multi-path effects are present, as long as the signal arriving directly from the RFID tag location is dominant compared to multiple reflected signals arriving from other directions. Typically, this requires a direct line of sight between the RFID tag and the RFID reader to be either unobstructed or obstructed only with objects whose dimensions and properties do not significantly alter the phase of propagating RF signals. Non-limiting examples of these types of objects are layers of cardboard and pieces of wood.

Direction Angle Estimation

Direction estimation of the angle from an interrogator to a tag logically requires one transmit and two receive antennas on the interrogator. In practice, these three logical antennas could be merged into two physical antennas, such as one for transmit/receive and another for receive only, but estimation of the direction angle is best understood with the three logical antennas shown in FIG. 21.

Figure 21:
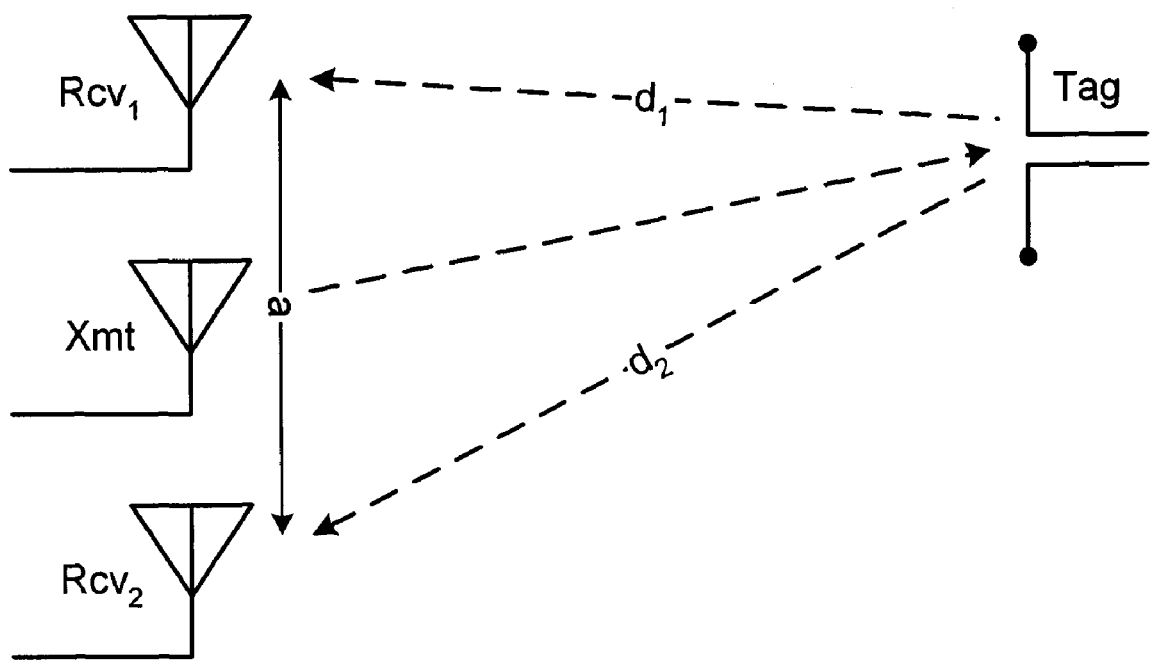
FIG. 21 shows a system diagram with one transmit and two receive antennas for measuring the tag direction.
Figure 22:
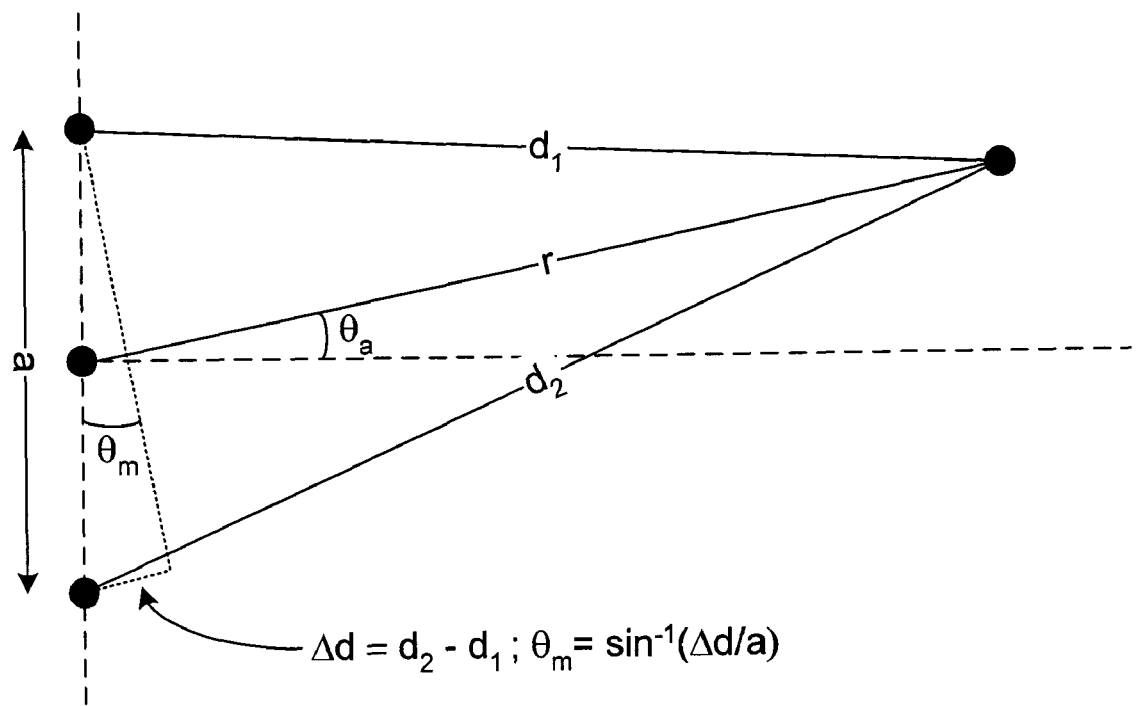
FIG. 22 shows a diagram of the relevant angles for a configuration with three logical antennas.

The interrogator illuminates a tag with constant power from the transmit antenna, Xmt, and the interrogator, either simultaneously or sequentially, receives signals from the tag in receiver antennas $Rcv_1$ and $Rcv_2$. In FIG. 21, the antennas are co-linear, the receive antennas are separated by distance a, the transmit antenna is in the middle of the receive antennas, and the antennas and tag are co-planar. The difference of the distances, $d_2$ and $d_1$, between the tag and antennas can be used to estimate the angle. FIG. 22 shows a diagram of the relevant angles for the configuration with three logical antennas.

The actual angle of the tag, $\Theta_a$, is formed from the transmit antenna to the tag in the plane of the antennas and tag. An estimate of the actual angle, called the measured angle, $\Theta_m$, is constructed using the difference of the distances. Specifically, the measured angle is computed by assuming the difference $(d_2-d_1)$ is the "opposite" side of a right triangle with the distance between the antennas (a) as the "hypotenuse":

$$\theta_m = \sin^{-1}\left(\frac{d_2 - d_1}{a}\right) \qquad (46)$$

Direction Estimation Error

The estimate of the direction using a difference of distances is similar to the first assumption behind Young's "Double Slit" experiment used in optics to explain the periodic pattern that light can create. Any estimation has limits to its accuracy, and the direction angle estimation is limited by radius "r" between the transmit antenna and the tag and by the distance between the receiving antennas, "a".

An analytical error formula for direction estimation can be written as:

$$\text{Error}(r, \theta_a) = \theta_a - \theta_m(r, \theta_a) = \theta_a - \sin^{-1}\left(\frac{d_2(r, \theta_a) - d_1(r, \theta_a)}{a}\right) \qquad (47)$$

where the distances can be expressed as functions of distance and angle as $$d_1(r;\theta_a) = \sqrt{(r\cos\theta_a)^2 + (r\sin\theta_a - a/2)^2} = \sqrt{r^2 + a^2/4 - ra\sin\theta_a}$$

$$d_2(r;\theta_a) = \sqrt{(r\cos\theta_a)^2 + (r\sin\theta_a - a/2)^2} = \sqrt{r^2 + a^2/4 - ra\sin\theta_a} \qquad (48)$$

Figure 23:
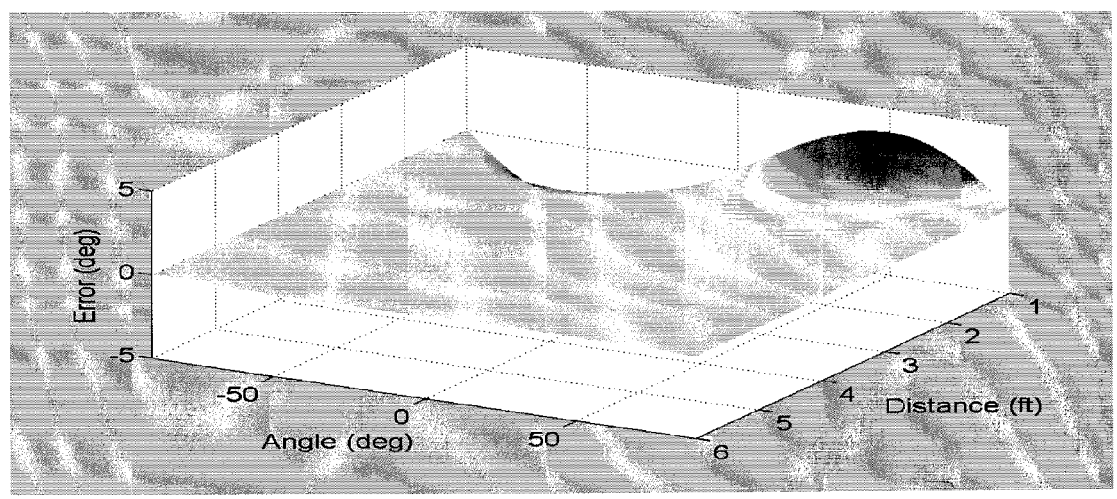
FIG. 23 shows a plot of error as a function of distance to the tag and angle.

The plot of the error as a function of distance to the tag and angle is shown in FIG. 23 for the three-antenna case, where a maximum antenna separation of one foot (a=1 ft) and tag distances more than 1 foot from the reader (r>1 ft) were used. Cross-sections of this surface result in plots of error versus angle for fixed distances.

For distances greater than 1 foot, the error does not exceed 5 degrees and becomes negligible at a few feet. Indeed, one can show analytically that the error approaches zero when r>>a:

$$\lim_{\frac{a}{r} \to 0} \text{Error}(r, \theta_a) = \qquad (49)$$

$$\theta_a - \sin^{-1}\frac{r}{a}\left(1 + \frac{1}{2}ra\sin\theta_a - \left(1 - \frac{1}{2}ra\sin\theta_a\right)\right) = \theta_a - \sin^{-1}\sin\theta_a = 0$$

As a simple rule, the error in angle estimation is less than ±4 degrees when the distance to the tag is greater than the distance between the receiving antennas.

Phase Calculation

Figure 24:
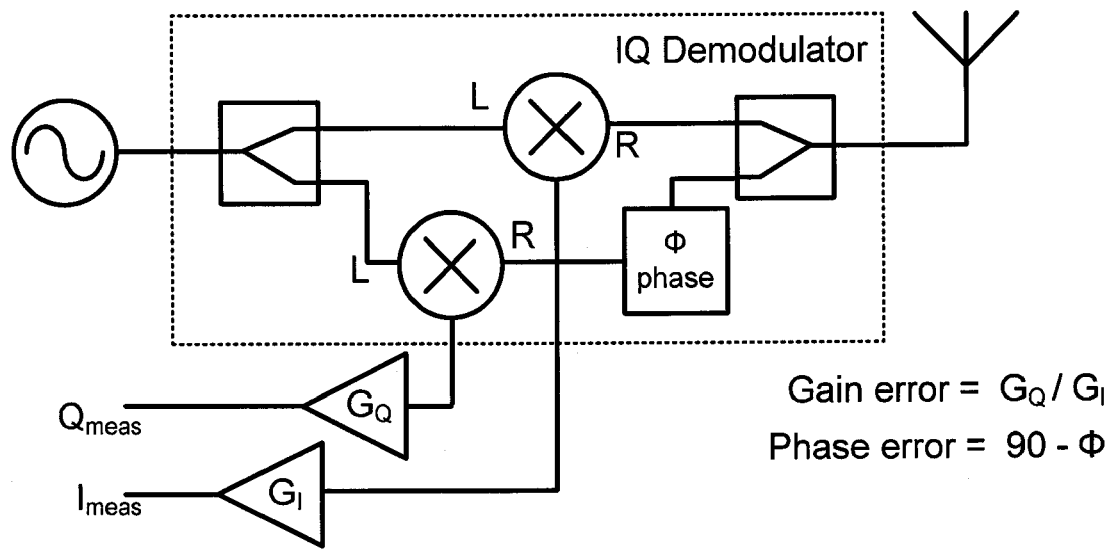
FIG. 24 shows a block diagram of a demodulator.

The phase response of the tag is calculated by measuring the signal strength of 'I' and 'Q' signals of the demodulator output as shown in the block diagram in FIG. 24.

The I and Q signals are defined mathematically as, $$I = \cos(\theta)$$

$$Q = \sin(\theta) \qquad (50)$$

Here I and Q are the RMS values of a set of samples of the tag response captured during decoding as follows, $$I = \sqrt{\frac{\sum_n i_n^2}{n}} \qquad (51)$$

$$Q = \sqrt{\frac{\sum_n q_n^2}{n}},$$

where I and q are samples of the tag response for the I and Q channels, respectively.

To get the polarity of the signals, the polarity of the FM0 violation (triple bit violation) could be used for both GEN2 and ISO6B protocols. Polarity is relevant for determining the quadrants of the phase.

The phase angle θ is calculated from equation (50) by using the relationship

Phase Angle Estimation

Estimating the direction of a tag depends on the accuracy of estimating the difference in distances from the tag to each of the receiving antennas. This distance is often referred to as the phase delay between antennas, and any error in measuring the phase delay will cause an error in estimating the direction. The voltage values of the received "I" (in-phase) and "Q" (quadrature phase) signals in each antenna permit measurement of the phase difference.

The received signal in an RFID reader from a tag is:

$$I_i(t, f, p, d_{xmt}, d_i) = \tag{52}$$

$$IAE_i(f) \cdot A(t, p) \cdot K_i(d_i) \cdot \cos\left[\frac{2\pi d_i}{\lambda} + \frac{2\pi d_{xmt}}{\lambda} + \varphi(f, p) + PE_i(f)\right]$$

$$Q_i(t, f, p, d_{xmt}, d_i) =$$

$$QAE_i(f) \cdot A(t, p) \cdot K_i(d_i) \cdot \sin\left[\frac{2\pi d_i}{\lambda} + \frac{2\pi d_{xmt}}{\lambda} + \varphi(f, p) + PE_i(f)\right]$$

where
$I_i(\cdot)$ RMS Voltage of the in-phase signal detected by the 'i'th receiver
$Q_i(\cdot)$ RMS Voltage of the quadrature phase signal detected by the 'i'th receiver
t Time
f Frequency of radiowave
p Intensity of RF power incident on tag
$d_{xmt}$ Distance between tag and transmitting antenna
$d_i$ Distance between tag and 'i'th receiving antenna
$IAE_i(f)$ In-phase amplitude error in reader for in-phase signal for i'th' receiver
$QAE_i(f)$ Quad. phase amplitude error in reader for quad. phase signal for i'th' receiver
$A(t, p)$ Amplitude of the transmitted signal by the tag
$K_i(d_i)$ Path loss from tag to 'i'th receiver antenna
$\lambda$ Wavelength of radiowave at frequency, $\lambda = c/f$
$\varphi(f, p)$ Phase transmitted by tag
$PE_i(f)$ Phase error due in the reader from the 'i'th antenna The phase angle of the tag signal from receiving antennas 1 and 2 are defined as:

$$\phi_1 = \frac{2\pi d_1}{\lambda} + \frac{2\pi d_{xmt}}{\lambda} + \varphi(f, p) + PE_1(f) \tag{54}$$

$$\phi_2 = \frac{2\pi d_2}{\lambda} + \frac{2\pi d_{xmt}}{\lambda} + \varphi(f, p) + PE_2(f)$$

After removing the receiver gain errors by calibration, the phase angle at receiving antennas 1 and 2 can be derived by the ratio of the I and Q voltages:

$$\phi_1 = \tan^{-1}\left[\frac{Q_1(\cdot)}{I_1(\cdot)}\right] \tag{55}$$

$$\phi_2 = \tan^{-1}\left[\frac{Q_2(\cdot)}{I_2(\cdot)}\right]$$

Within an ambiguity of modulo $2*\pi$, the difference of the phase angles will make the difference of distances more readily apparent:

$$\phi_1 - \phi_2 = \frac{2\pi(d_2 - d_1)}{\lambda} + [PE_2(f) - PE_1(f)] \tag{56}$$

Calibration, such as holding a tag at equal distance between the two receiving antennas, can remove the difference in phase error, and after calibration, the difference of distances simply becomes:

$$d_2 - d_1 = \frac{\lambda}{2\pi}\left\{\tan^{-1}\left[\frac{Q_2(\cdot)}{I_2(\cdot)}\right] - \tan^{-1}\left[\frac{Q_1(\cdot)}{I_1(\cdot)}\right]\right\} \tag{57}$$

This difference of distances can be used in estimating the direction angle. Additionally, this difference of distances divided by the speed of light equals the TDOA of signals into the receiving antennas.

Only tag responses for the reader commands that can be decoded are used in calculating the I and Q values. The threshold for detection is the ability to detect the preamble within the time period specified by the relevant specification (ISO-6B, GEN2 etc). On a successful decode, samples of I and Q voltages of the tag response are averaged to get the ratio of I and Q to be used in the above calculation. Depending on the polarities of the samples, the corresponding quadrant is deduced and used in the calculation of the arctan values.

Receiver Requirements

Accurate phase measurements are critical for acquiring spatial identification information about a tagged object using the TD-PDOA, FD-PDOA, and SD-PDOA techniques. Receiver requirements needed to obtain the accurate phase measurements are discussed below.

Receive Signal Saturation

Traditionally, the phase of the tag signal were not considered relevant in decoding the tag because the ultimate objective was to decode the tag response to collect the data. Consequently, high gains were used and if cost was a consideration, a lower resolution analog to digital converter (ADC) would be preferred. However, for location sensing, the phase of the tag is relevant, and the I/Q signals of the tag response coming out of the ADC cannot become saturated because the phase information is lost if the signals get saturated. Thus, a wide dynamic range at the receiver is necessary.

For a variety of reasons, the tag responses can become saturated. In such cases, an adaptive gain in the receive path or adaptive transmit power in the transmit path could mitigate the saturation effects.

Linear Receivers

The RF receive circuit should be linear. A signal to noise (S/N) ratio greater than 20 dB is preferable.

Filtering

The signals into the ADC should be raw or filtered with linear phase filters that are common to both I and Q channels. Any non-linear filters may change the phase of the response, thus impacting the location calculations.

A separate transmit and receive antenna capability is needed if SD-PDOA is used for location sensing of a tag.

Imbalances in the Demodulator

Figure 25:
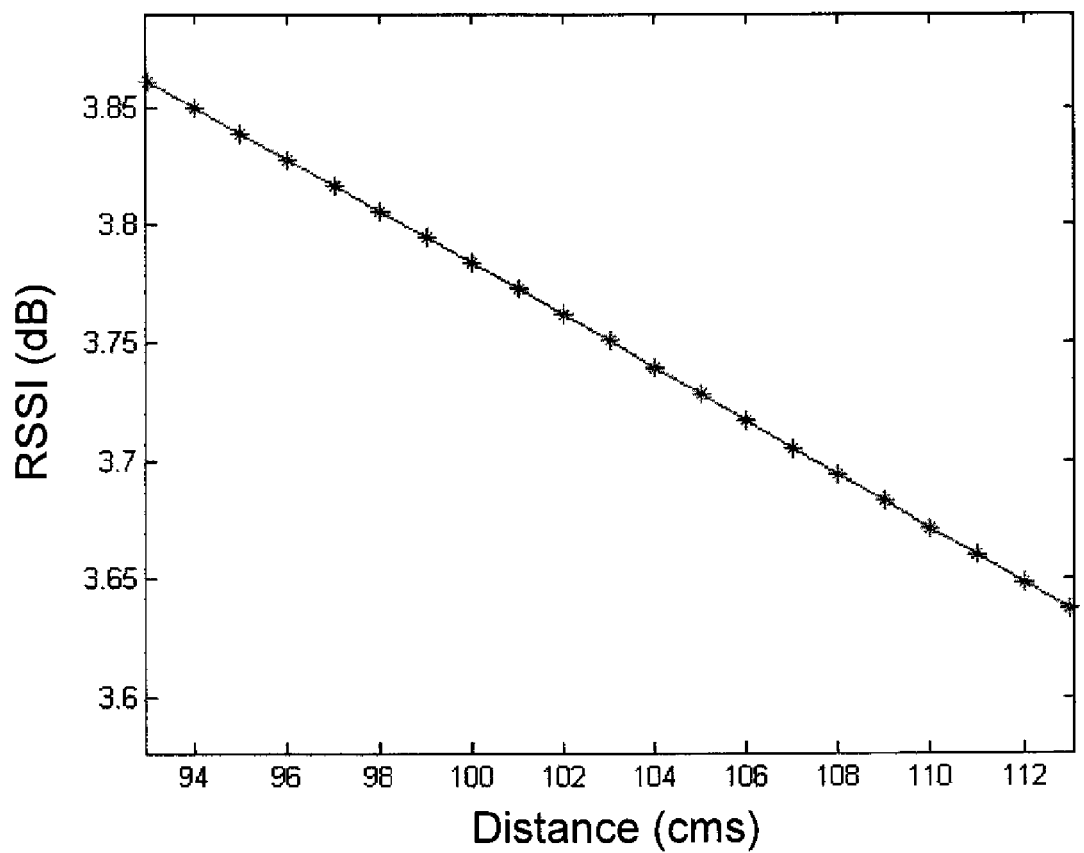
FIG. 25 shows a plot of RSSI (received signal strength indicator) as a function of distance when there are no imbalances in the demodulator.

Imbalances in the I and Q path at the downconverter should be measured and compensated in the calculation of phase. The imbalances can be a combination of gain, phase or offset. Of the three imbalances, the phase and gain imbalances need to be measured at the reader assembly/test/verification time and stored in non-volatile memory to be used later for the gain/phase compensation. Any DC offset can be compensated during measurement time by calculating and cancelling the DC offset before calculating the phase angles. FIG. 25 shows a plot of RSSI (received signal strength indicator) as a function of distance when there are no imbalances in the demodulator.

Figure 26:
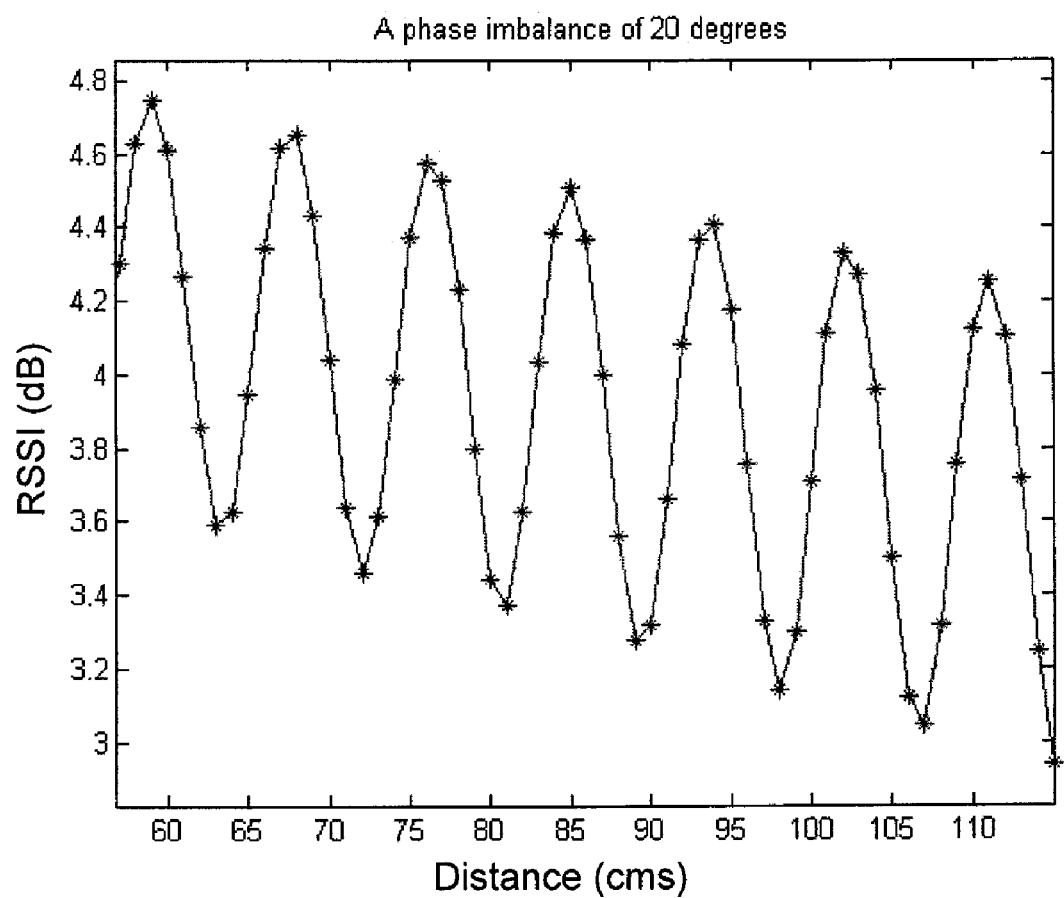
FIG. 26 is the plot of RSSI as a function of distance with a phase imbalance of 20 degrees in the I channel.

FIG. 26 is the plot of RSSI as a function of distance with a phase imbalance of 20 degrees in the I channel. The plot is no longer monotonically decreasing but shows ripples that are a quarter of a wavelength apart. A gain imbalance in one of the channels may have a similar ripple effect.

Figure 27:
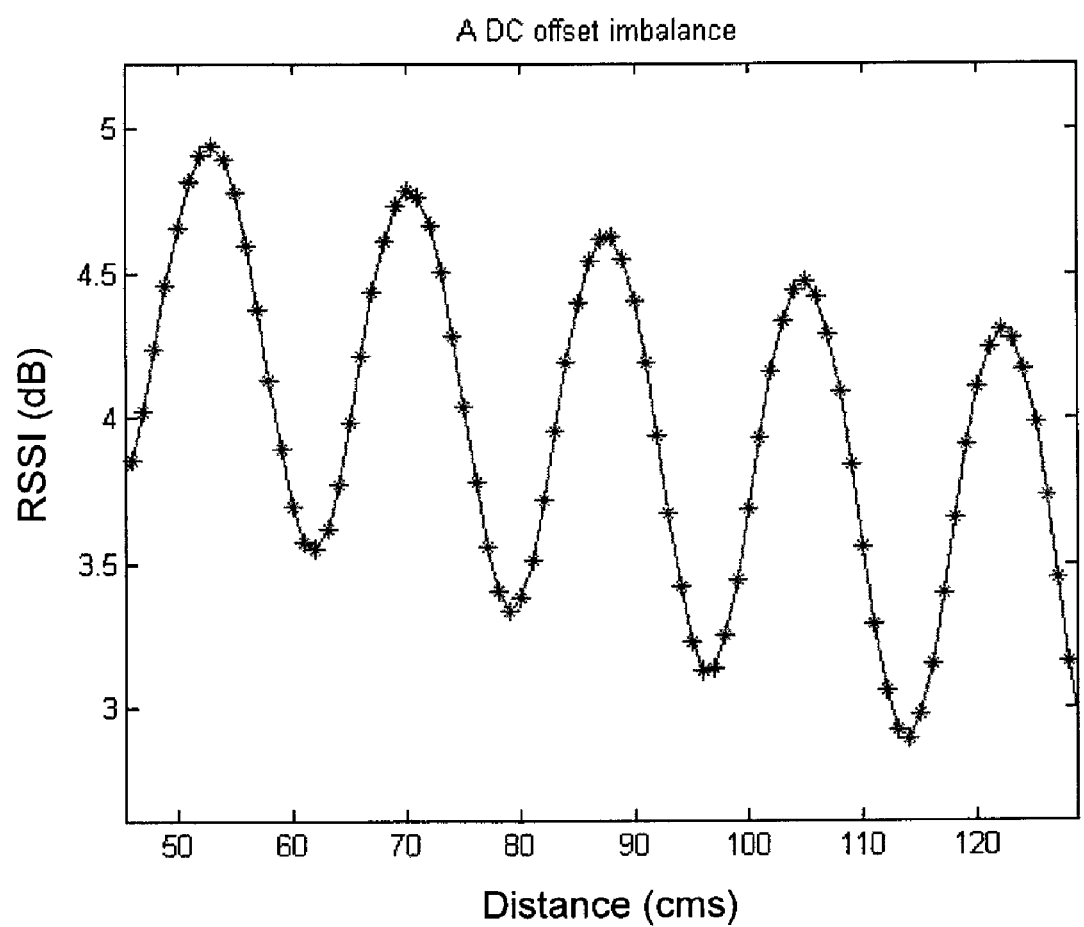
FIG. 27 shows the RSSI plot with a DC offset in the I channel.

FIG. 27 shows the RSSI plot with a DC offset in the I channel. The ripples now are half a wavelength apart.

Figure 28:
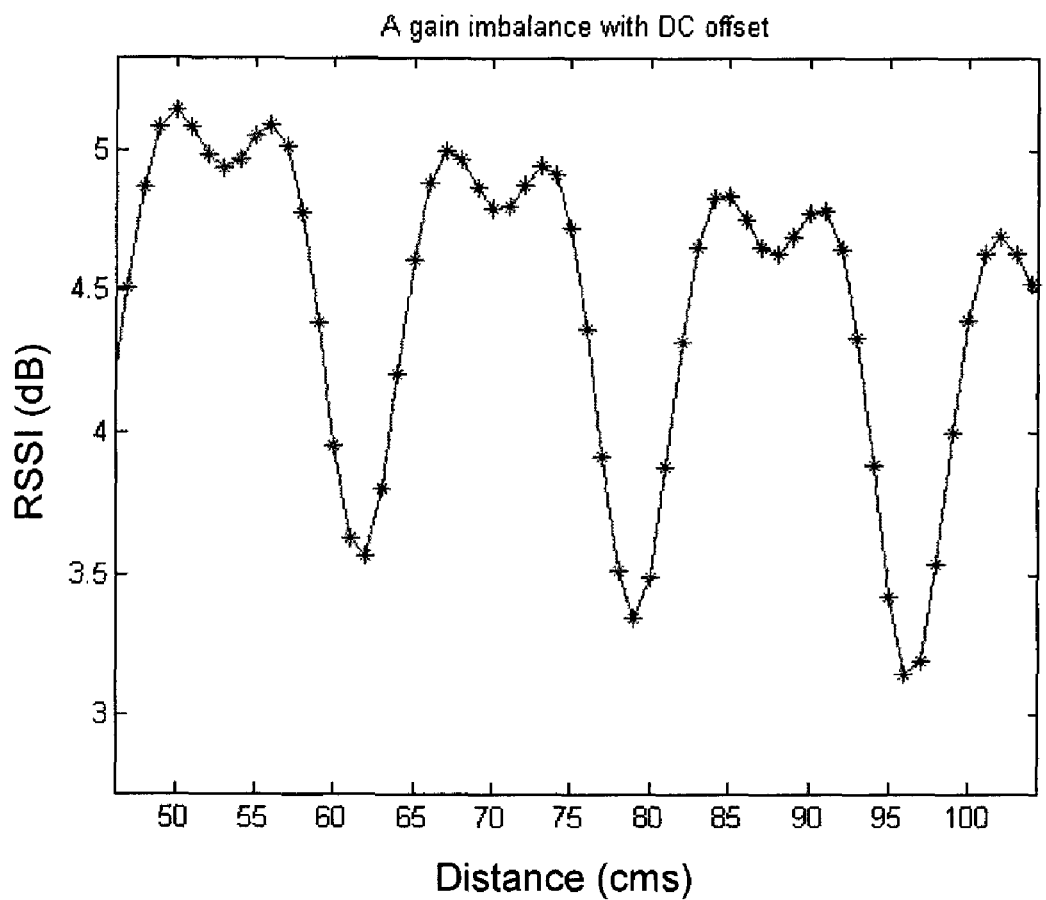
FIG. 28 shows the RSSI plot with both a DC offset and gain imbalance.

FIG. 28 shows the RSSI plot with both a DC offset and gain imbalance. The ripples are a little different but again half a wavelength apart.

As can be seen from the above figures, the phase calculations based on signals with imbalances would be erroneous.

With the imbalances, equations (50) can be defined as $$I_{IMB}=G_1\cos(\theta)+D_1$$

$$Q_{IMB}=\sin(\theta+\phi)+D_Q, \quad (58)$$

where $G_1, \phi, D_1, D_Q$ are the gain imbalance in the I channel, the phase imbalance in the Q channel, and DC offsets in the respective channels.

The DC offsets can be cancelled by taking the mean of the readings and then subtracting the mean from each of the readings. Modifying equations (59) for DC offset cancellation, results in $$I = \sqrt{\frac{\sum_n \left(i_n - \frac{\sum i_n}{n}\right)^2}{n}}$$

$$Q = \sqrt{\frac{\sum_n \left(q_n - \frac{\sum q_n}{n}\right)^2}{n}} \quad (59)$$

Ignoring the DC offsets as they can be cancelled easily during the measurements, using equation (56) and simple trigonometry, results in $$I_{IMB}=G_1 I$$

$$Q_{IMB}=I\sin(\phi)+Q\cos(\phi) \quad (60)$$

With some linear algebra, equations (61) can be written as, $$I=G_1^{-1}I_{IMB}$$

$$Q=G^{-1}I_{IMB}\tan(\phi)+Q\sec(\phi). \quad (61)$$

The gain imbalance and the phase imbalance can be measured during the hardware verification time and can be stored in the non-volatile memory. These values could then be used during the measurement time to calculate the true RMS values of the I and Q channels by using equations (62).

Multipath Effects

Multipath effects arising from reflections of RF signals from surfaces in the environment are discussed below in conjunction with the TD-PDOA, FD-PDOA, and SD-PDOA techniques. Experiments measurements using each of these techniques are also presented below.

Using the traveling wave equation (21), the multipath signal V received at the reader antenna from the tag can be formulated as $$V = \sum_{i=1}^{n} A_i \cos(\phi_i - \omega t) \quad (62)$$

The variable i represents the multiple signal paths, and $A_i$ and $\phi_1$ represent the amplitude and phase of the signal, respectively, for the multiple signal paths.

Multipath effects are relatively less known in passive RFID and the conventional wisdom has been that the effects are not as dominant as they are in a typical wireless communication system. The reasons could be the relatively shorter distances between the reader antenna and the tag and the power of the tag. With these assumptions, equation (63) becomes, $$V=A_1\cos(\phi_1-\omega t) \quad (63)$$

where $A_1$ and $\phi_1$ are the amplitude and phase of the direct path signal and $A_1 \gg A_i$, $i \geq 2$.

In a typical mobile radio channel, the ground reflection (two-ray) model has been used for studying propagation characteristics. In this model, two signal paths are considered, one is the direct path, and the other is the ground reflected path. For this model, equation (63) becomes, $$V = \sum_{i=1}^{2} A_i \cos(\phi_i - \omega t) \quad (64)$$

where i=1 and i=2 are the direct and the reflected signal paths, respectively.

Equation (65) can be expressed numerically to make it more convenient for signal processing, $$V = \sum_{n=1}^{N} A_1 * r(n) + A_2 * r(n-m) \quad (65)$$

where r(n) and r(n−m) are the direct and reflected signals. The reflected signal r(n−m) is the direct signal delayed by m samples. The delay of m samples is due to the difference in distances between the direct and reflected path, and this differential distance is given by, $$\Delta d = \frac{2h_t h_r}{d} \quad (66)$$

where $h_t$ and hr are the heights of the transmitter and the receiver, and d is the distance between the transmitter and the receiver.

Figure 29:
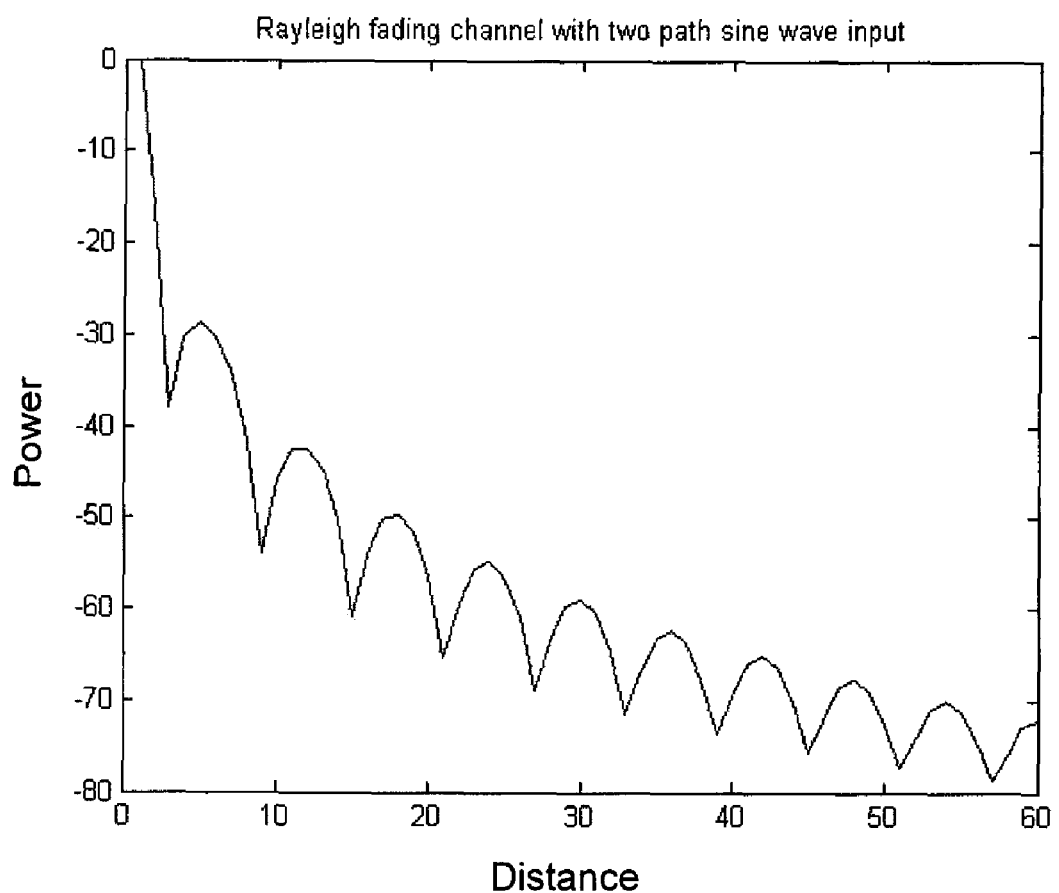
FIG. 29 shows a plot of power against distance using the two ray model modified for RFID data.

However, the above equation is applicable when the distances are very large as in a typical radio channel. To match the experimental data where a plot of RSSI against distance showed ripples that repeated at distances of half wavelengths, the delay m can be treated as, $$m = \frac{f_s/f_o}{\lambda/2} d \quad (67)$$

where $f_s$, $f_o$ and $\lambda$ are the sampling frequency, modulation frequency, and wavelength respectively. FIG. 29 shows a plot of power against distance using the two ray model modified for the RFID data.

As can be seen in the figure, the ripples in the plot repeat at distances of half of a wavelength. This is very similar to the experimental data. The amplitude varies inversely to the square of the distance in FIG. 29, as in a typical propagation model. A Rayleigh distribution characterizes amplitude variation. The fading channel plotted above takes into account only the delay associated with the reflected path, not any flat fading that uses the Rayleigh distribution. In other words, a frequency selective fading is occurring. Also, small scale fading associated with Doppler spread is not considered.

Measurements

Experimental measurements obtained using TD-PDOA, FD-PDOA, and SD-PDOA are presented in the sections below.

TD-PDOA

The experiment for this setup was conducted in a laboratory that had some reflective surfaces. The measurements were done in the 915 MHz band. A linear translator was used to move the tag through a distance range of 48 inches starting at around 12 inches from the antenna. Any imbalances were measured and compensated by using the methods described above. A linearly polarized tag tuned for 866 Mhz was used.

Figure 30:
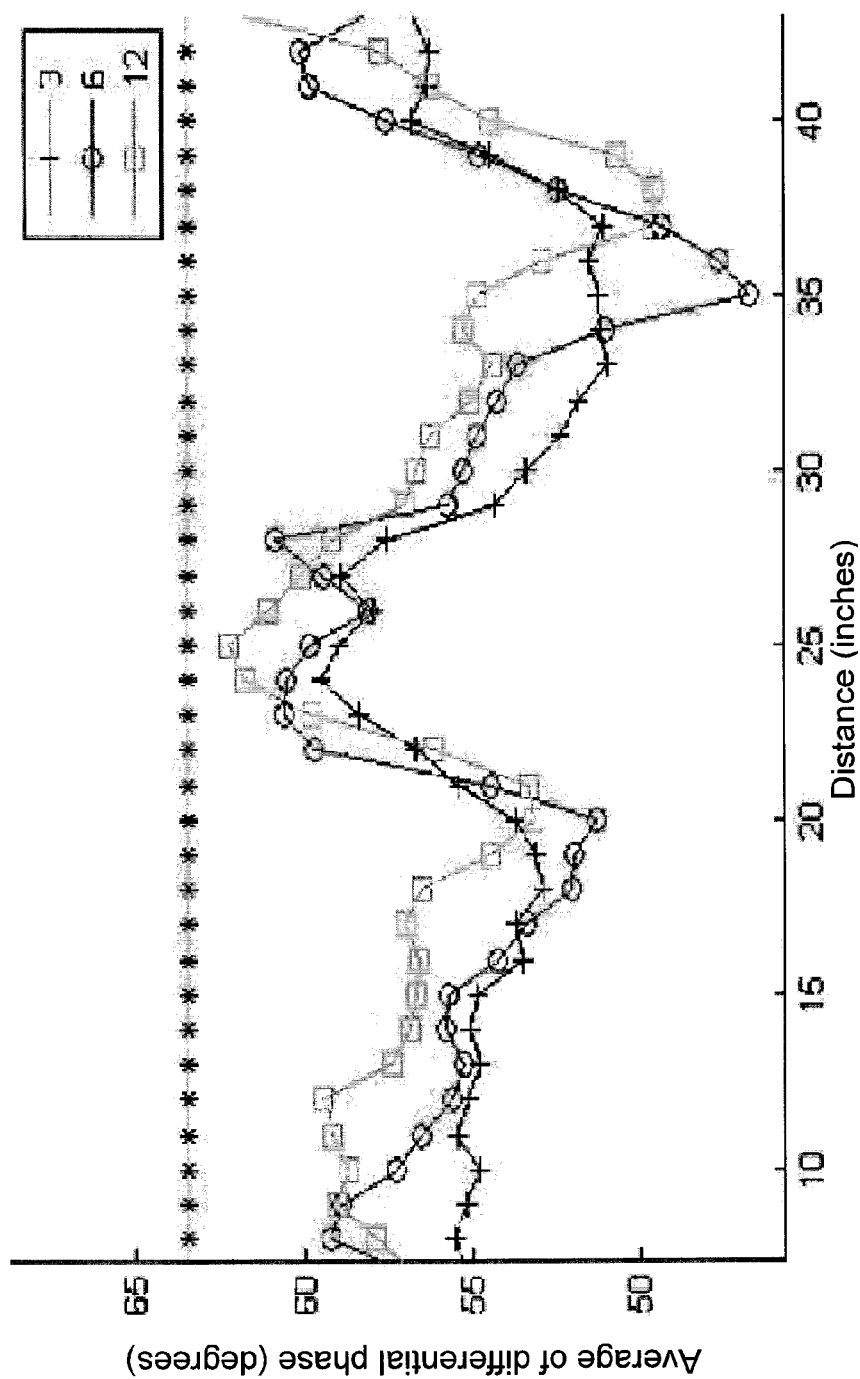
FIG. 30 shows a plot of the phase change with respect to the change in distance.

FIG. 30 shows the relation of the phase change with respect to the change in distance. The horizontal line is the theoretical value and is constant as derived in equation (64). At the chosen 915 MHz band, the constant value should be approximately 62 degrees at a distance of 1.125 inches. The other lines are the measured phase differentials at different frequencies averaged over seven points. Averaging over approximately seven points seems to be optimal because of the ripples that repeat at a distance equal to the wavelength of the 915 MHz band. The ripples are described in more detail in the next section.

Figure 31:
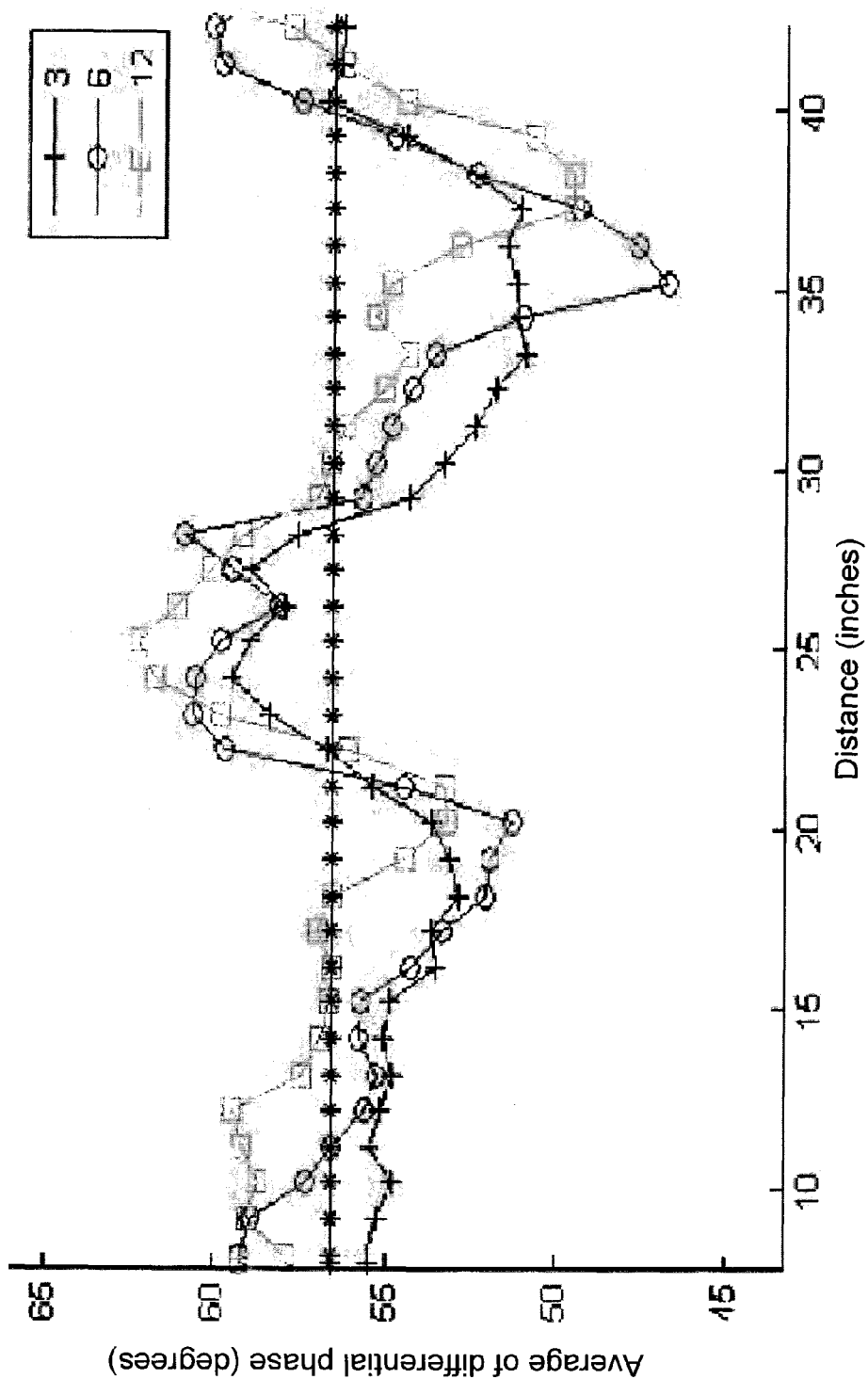
FIG. 31 shows another plot of the phase change with respect to the change in distance.

The measured curves in the above figure show that there is more deviation from the theoretical value. FIG. 31 is obtained under the same conditions, except the frequency has been reduced by 100 MHz, resulting in measured phase differentials that are much closer to the theoretical value. This discrepancy is described further in the next section where it causes problems as well.

A unit change in tag movement distance should produce a constant change in phase. Thus, measurement of a constant phase is indicative that the tag movement and velocity is being detected.

FD-PDOA

The experiment for this setup was the same as the one used for the TD-PDOA method that was described in the previous section. However, two different environments were used. The first environment was in the laboratory where reflective surfaces were present, and the second environment was an anechoic chamber. All the figures in this section were conducted in the laboratory environment unless stated specifically to indicate that the anechoic chamber was used.

Figure 32:
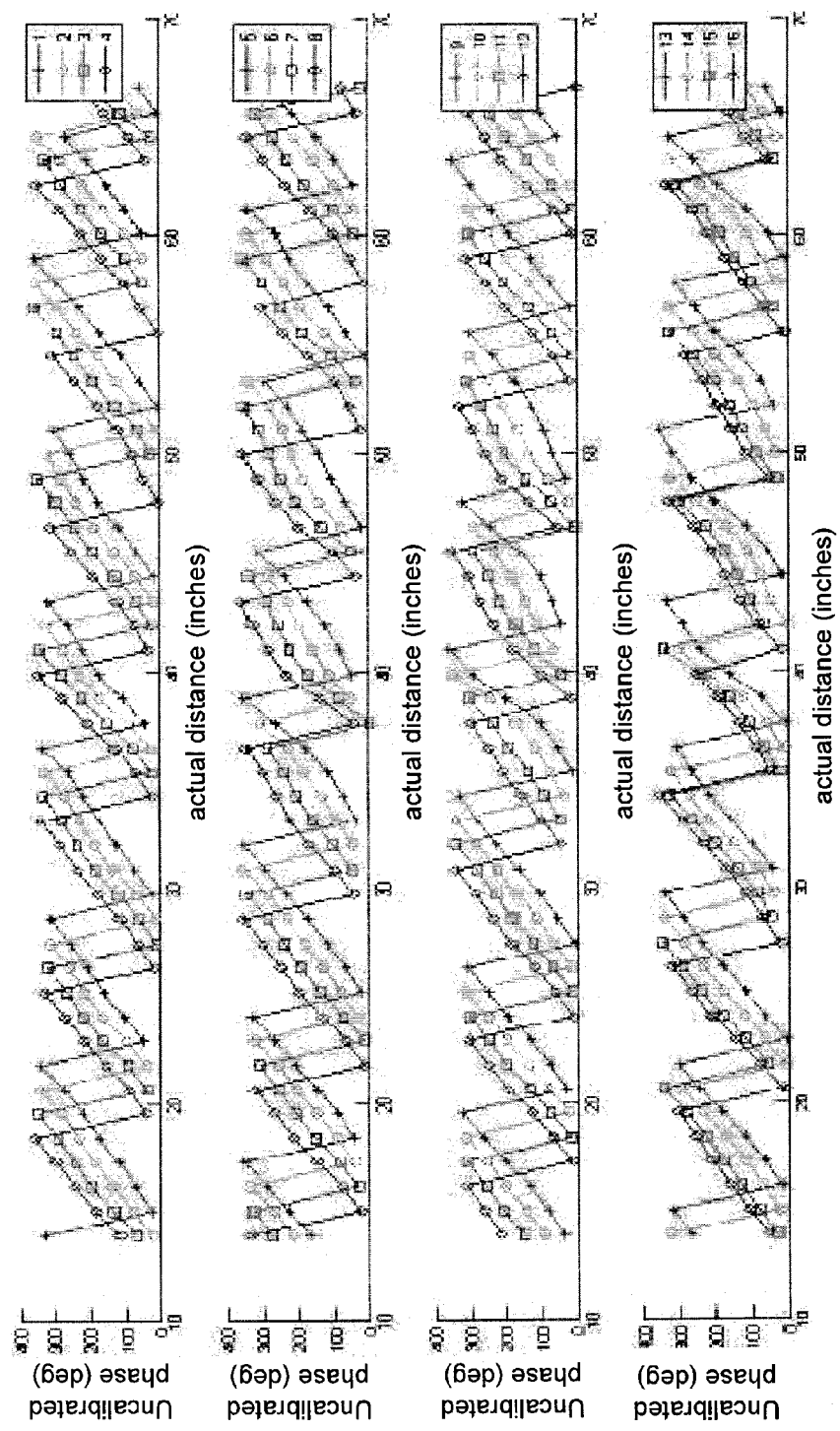
FIG. 32 shows a plot of the phase as a function of distance for different channels in the 915 MHz band.

Shown in FIG. 32 is a plot of the phase as a function of distance for different channels in the 915 MHz band. The upper plot in FIG. 33 shows the phase of two channels against distance, while the lower plot in the figure shows the phases of these channels unwrapped.

Figure 33:
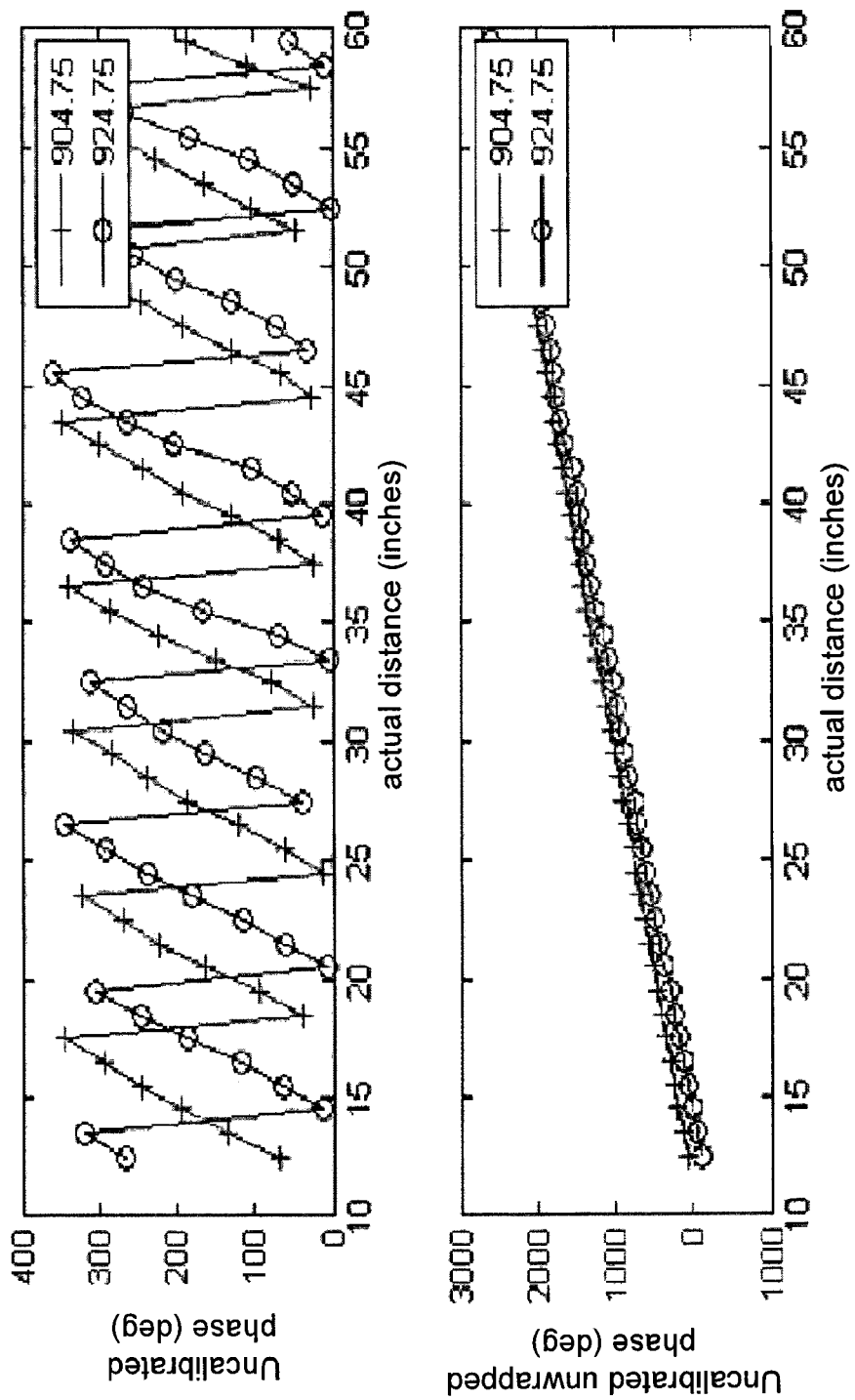
FIG. 33 shows plots of calibrated phase of two channels against distance and the phases of these channels unwrapped.

One of the reasons for the differences between FIG. 33 and FIG. 30 is the presence of an additional term in equation (24) resulting from an unknown contribution to the phase by the antenna cables and the wiring circuitry in the reader. So taking this into account, the equation (24) becomes:

$$\phi = 4\pi \frac{f}{c} d + PE \qquad (68)$$

where PE is the phase error due to the cables. The phase error is dependent on the frequency of operation but is assumed to not be dependent on the distance. Consequently, the phase error is constant for the spanned distance at the frequency of operation. Mathematically, it can be represented as, $$PE = 4\pi \frac{f}{c} \Delta d_c \qquad (69)$$

where $\Delta d_c$ is the additional distance due to cable lengths. Combining the two equations, results in $$\phi = 4\pi \frac{f}{c}(d + \Delta d_c) \qquad (70)$$

Phase error can be calculated by taking the measurements of phase at a known distance and then calculating the phase error PE. In other words, $$\phi_{mf1} = \phi_{af1} + PE_{f1} \qquad (71)$$

where $\phi_{mf1}$ is the measured phase at frequency $f_1$, and $\phi_{af1}$ is the theoretical phase at the same frequency. $PE_{f1}$ can be calculated as $$PE_{f1} = \phi_{mf1} - \phi_{af1} \qquad (72)$$

By calculating $PE_{f2}$ at frequency $f_2$ in a similar manner, the phase error differential $\Delta PE_f$ due to the two frequencies in operation is given by $$\Delta PE_f = PE_{f1} - PE_{f2} \qquad (73)$$

By including the phase error differential term, the distance 'd' can be calculated by using the equation (56) as, $$d = \frac{(\Delta \phi - \Delta PE_f)}{\Delta f} \left(\frac{c}{4\pi}\right) \qquad (74)$$

Figure 34:
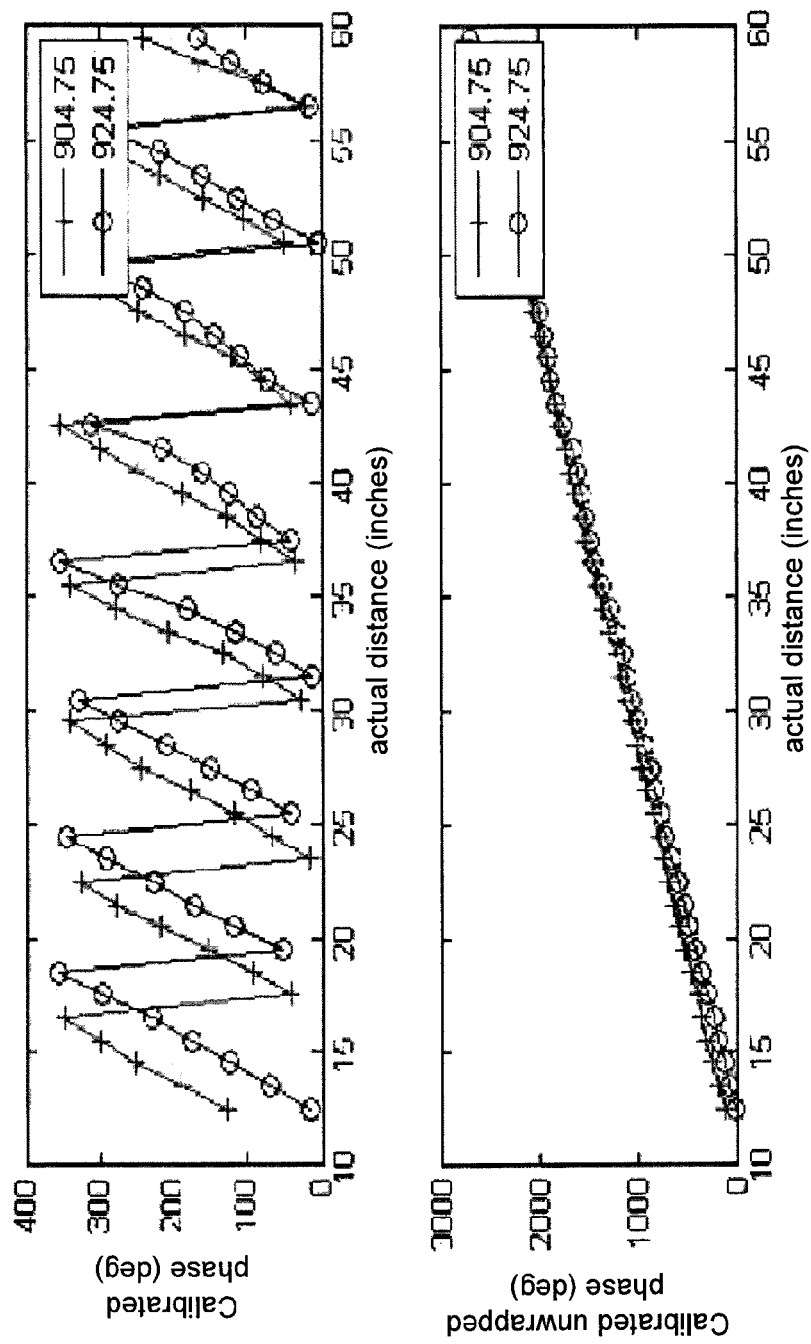
FIG. 34 shows plots of uncalibrated phase of two channels against distance and the phases of these channels unwrapped.

Using the phase errors as in equation (74) for the two frequencies in FIG. 33, FIG. 34 is plotted for phase as a function of distance.

Figure 35:
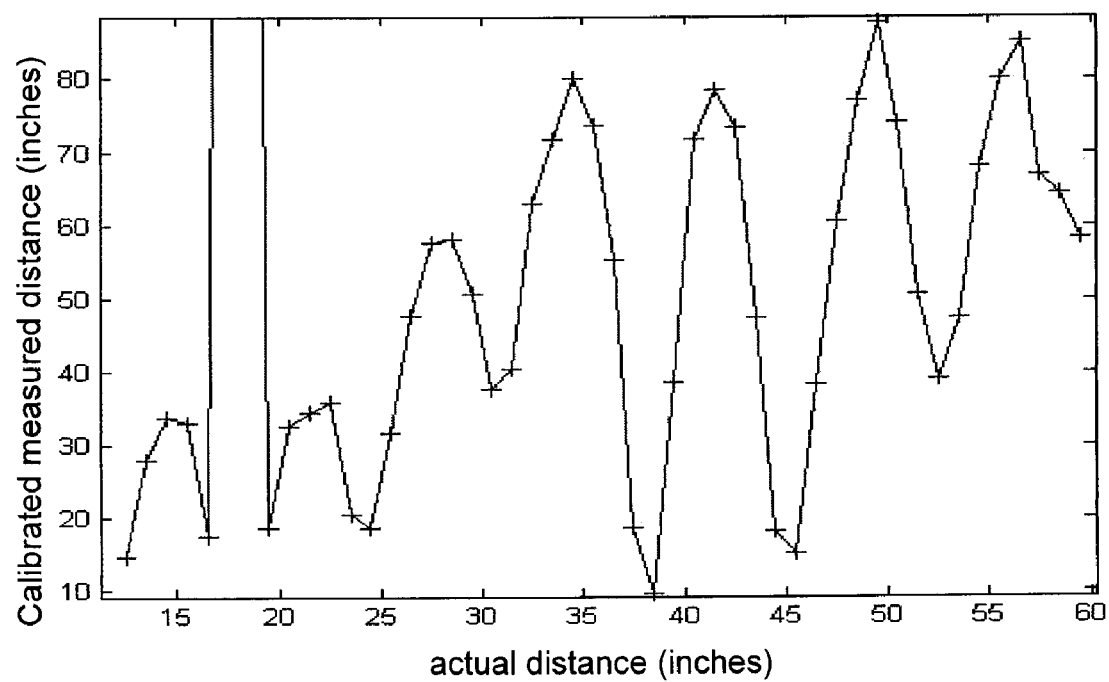
FIG. 35 shows the calibrated measured distance as a function of actual distance.

The distance or range for the phase measurements from FIG. 34 can be used to calculate the distance, and the plots are shown in FIG. 35 below.

Figure 36:
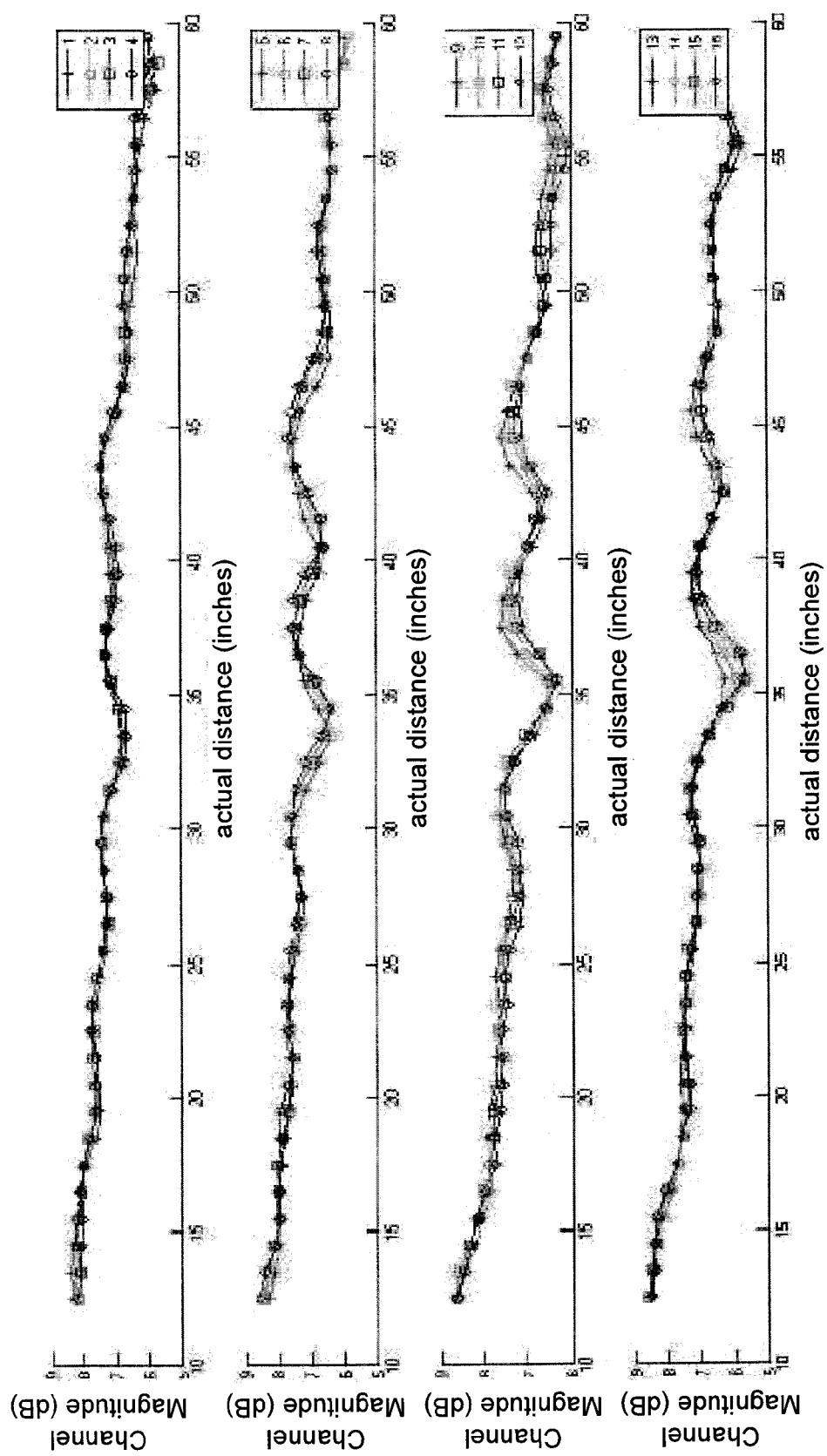
FIG. 36 shows the RSSI plots for different channels in the 915 MHz band.

Clearly, the distance does not match the theoretical plots shown in FIG. 32; the plot shows ripples that repeat at half wavelengths which mirror the RSSI plots shown in FIG. 33 when the demodulator has imbalances with DC offsets or the two ray plots for multipath effects shown in FIG. 30. FIG. 36 shows the RSSI plots for different channels in the 915 MHz band, and the ripples can be seen repeating here at half wavelength distances. Also, in FIG. 36, the RSSI power only goes down by about 2 dB over a distance of 54 inches. Using the Friis free space transmission equation where the power is inversely proportional to the fourth power of the distance, or arguably the third power of the distance, the signal should have gone down by about 67 dB or 50 dB, respectively. This means that the reflected power of the tag is almost constant if not non-linear.

Figure 37:
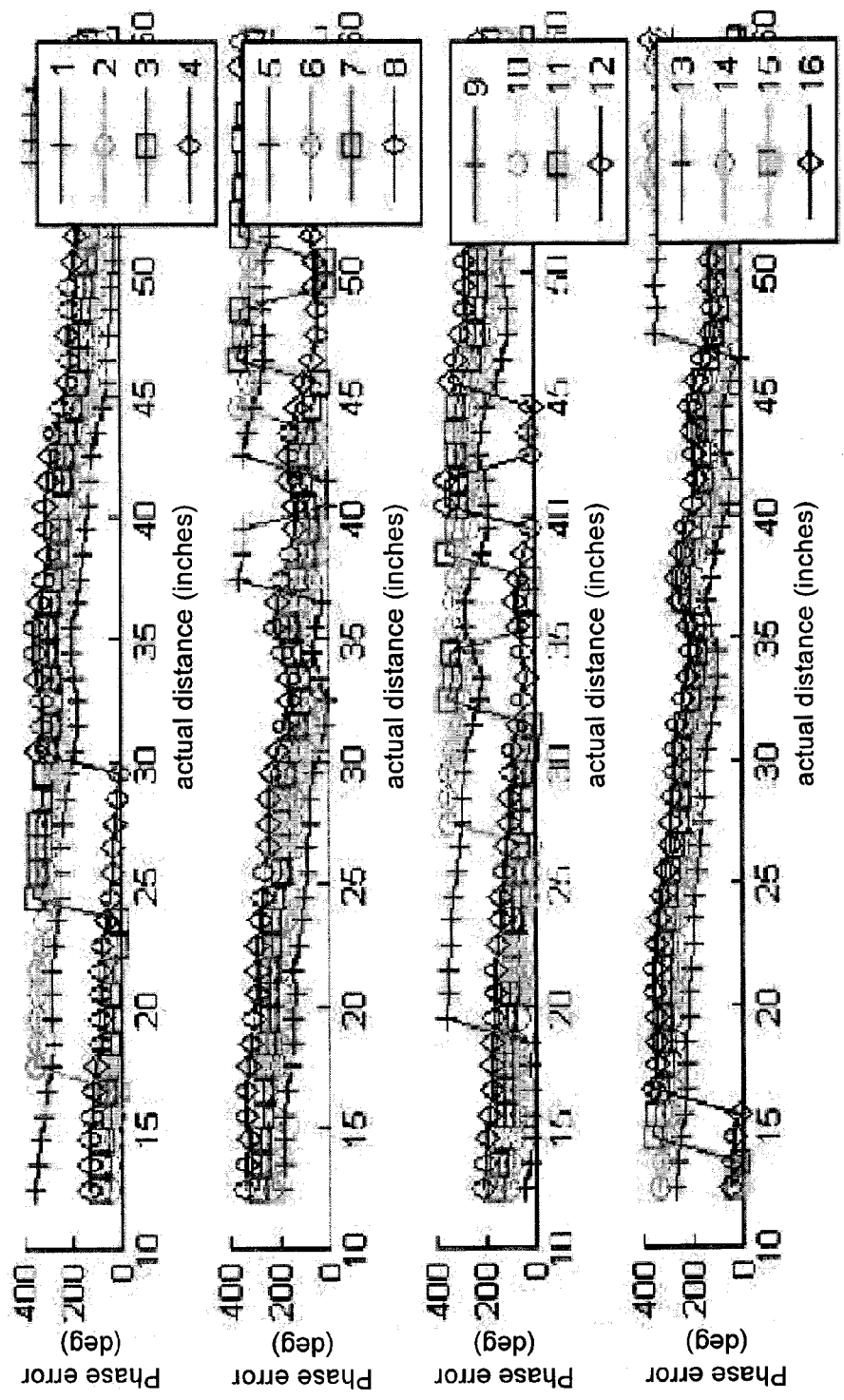
FIG. 37 shows phase error between theoretical values of the phase and measured phase values.

Also plotted below in FIG. 37 is the phase error between the theoretical values of the phase calculated over distance with the measured phase values over the same distance at different frequencies.

Figure 38:
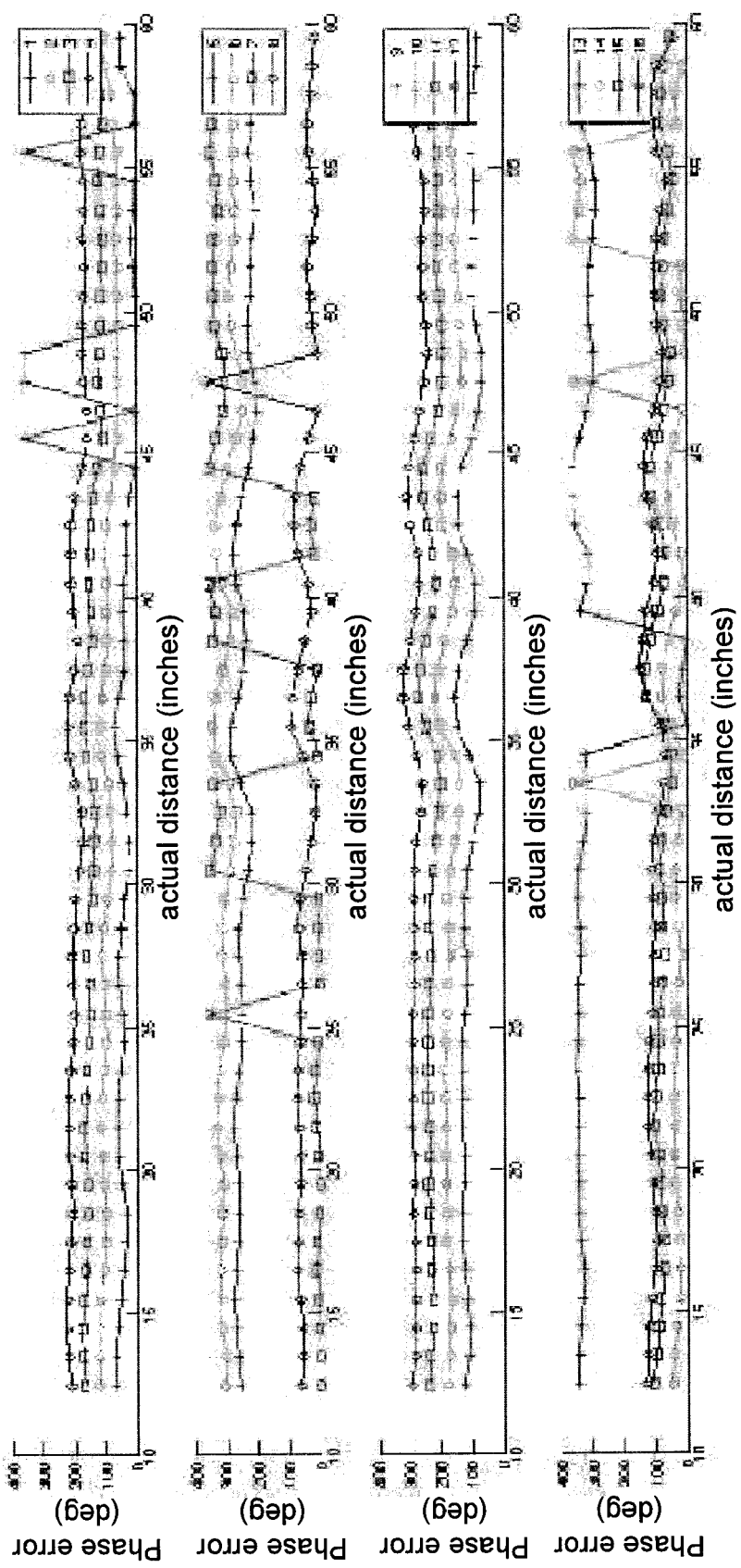
FIG. 38 shows phase error plotted with respect to distance.

The jumps in the plots arise because the phase goes from 0 to 360 degrees and could be made transparent if unwrapped. The phase error is monotonically decreasing even though it should have been a constant at a frequency based on equation (74). This seems to indicate the change in phase error is due to a change in frequency. The slope of the plot indicates the change is occurring at about 6 degrees per inch of distance change. FIG. 38 shows the phase error plotted with respect to distance, but the theoretical phase is calculated at a frequency that is about 100 MHz lower than the carrier frequency, and this is based on the 5 degree slope. The measured phase errors are more constant over the distance at the changed frequency.

The incident power at a tag is inversely proportional to the tag's distance to the reader. The frequency change to compensate for the phase error change with respect to distance can be an indication that the tag phase might be dependent on the distance or the incident power from the reader.

Considering the frequency compensation for the phase error, equation (71) can be written as $$\phi = \frac{4\pi}{c}(f + \Delta f_c)(d + \Delta d_c) \tag{75}$$

where $\Delta f_c$ is the frequency compensation for the phase error change due to a change in the tag's incident power. The frequency compensation can be rewritten as:

$$\phi = \frac{4\pi}{c}(fd + f\Delta d_c + \Delta f_c d + \Delta f_c \Delta d_c) \tag{76}$$

Taking the differential phase at two frequencies $f_1$ and $f_2$, results in $$\phi_1 - \phi_2 = \Delta\phi = \frac{4\pi}{c}(f_1 d + f_1 \Delta d_c + \Delta f_c d + \tag{77}$$
$$\Delta f_c \Delta d_c - f_2 d + f_2 \Delta d_c + \Delta f_c d + \Delta f_c \Delta d_c)$$

Simplifying further, results in $$\Delta\phi = \frac{4\pi}{c}(f_1 - f_2)d + (f_1 - f_2)\Delta d_c \tag{78}$$

So for the FD-PDOA method, the additional term $\Delta f_c$ in equation (61) will get cancelled, and the second term in the above equation is the phase error term $\Delta PE_f$.

This gives FD-PDOA a great advantage because the effects of tag incident power change on the tag's phase is avoided, whereas the TD-PDOA will experience this effect. Again taking the differential phase at two distances $d_1$ and $d_2$, results in $$\phi_1 - \phi_2 = \Delta\phi = \frac{4\pi}{c}(fd_1 + f\Delta d_c + \Delta f_c d_1 + \tag{79}$$
$$\Delta f_c \Delta d_c - fd_2 - f\Delta d_c - \Delta f_c d_c - \Delta f_c \Delta d_c)$$

Simplifying again, results in $$\Delta\phi = \frac{4\pi}{c}(f + \Delta f_c)(d_1 - d_2) \tag{80}$$

The above equation is like adding $\Delta f_c$ to equation (70), $$\frac{\partial\phi}{\partial d} = 4\pi\frac{(f + \Delta f_c)}{c} \tag{81}$$

The effects of adding the additional frequency is seen in FIG. 31, where the measured differential phase matches the theoretical differential phase. Since the phase change in TD-PDOA must be kept within 360 degrees to avoid the modulo effect, the additional frequency term can be added in terms of additional phase change as, $$\phi_{fc} = \phi\frac{\Delta f_c}{f} \tag{82}$$

where $\phi$ is the measured phase, f is the frequency, and $\phi_{fc}$ is the addition phase at each measurement point.

Figure 39:
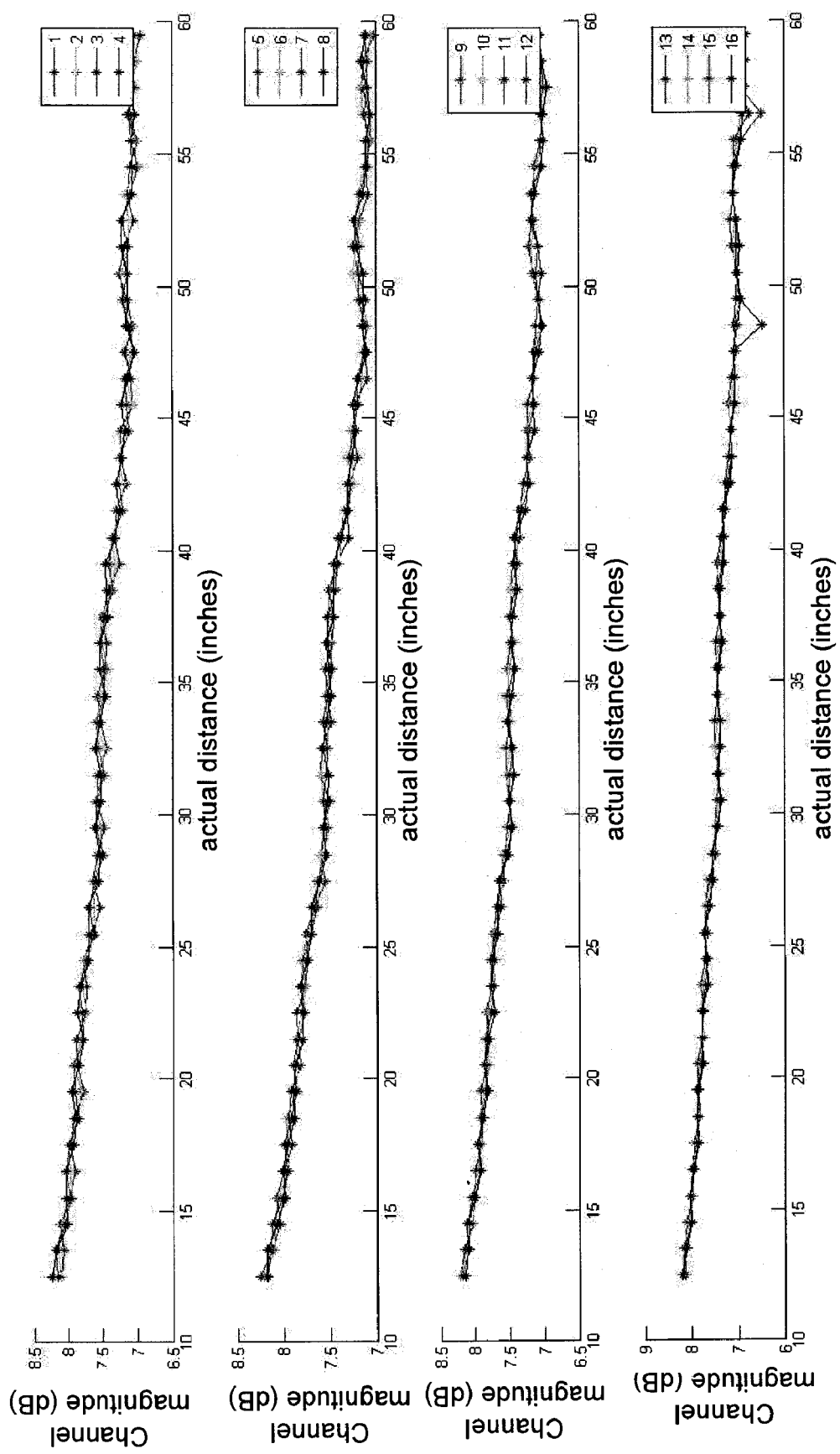
FIG. 39 is a plot of the RSSI with distance.

FIG. 39 is a plot of the RSSI with distance using the same setup as above but in an anechoic chamber. The ripples are barely visible which indicates that the ripples that were seen outside the chamber might be more due to multipath rather than any imbalances.

Figure 40:
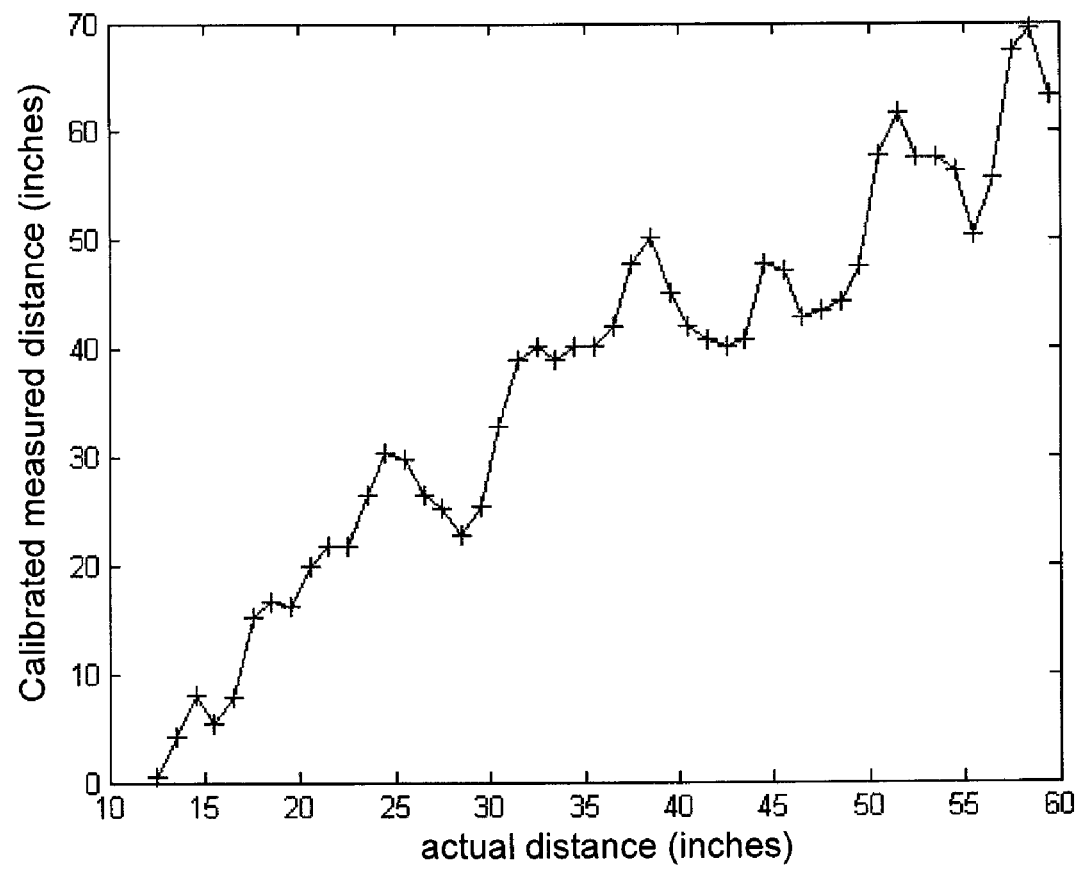
FIG. 40 shows a plot of calculated range as a function of distance.

The plot of the calculated range with respect to the distance is shown in FIG. 40. The errors are within about 5 inches from the actual range.

SD-PDOA

The experiment for this setup was conducted in an anechoic chamber, albeit an imperfect one. A linear translator was used to move the tag in parallel to the front of the receiving antennas through a range of 48 inches as shown below in 41. Imbalances were measured and compensated by using the methods described above. The 865 MHz band was used for testing.

Figure 41:
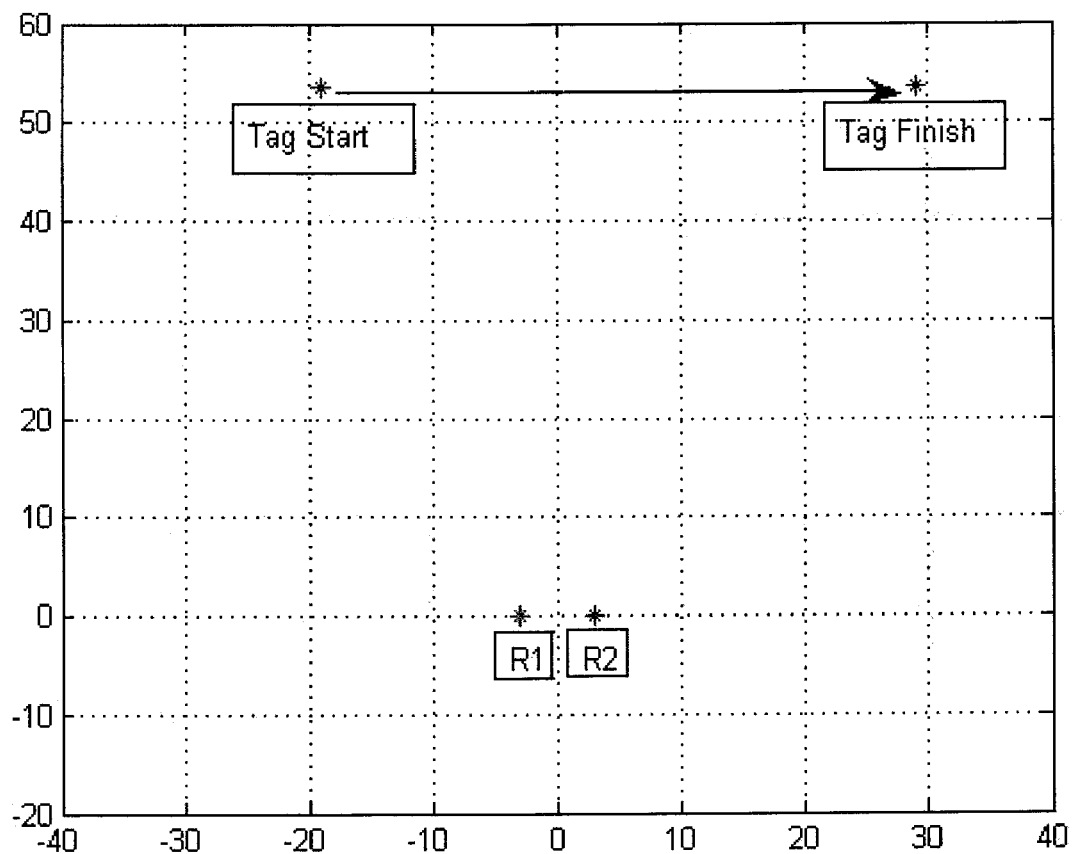
FIG. 41 depicts physical locations of the antennas and tags for an SD-PDOA experiment.
Figure 42:
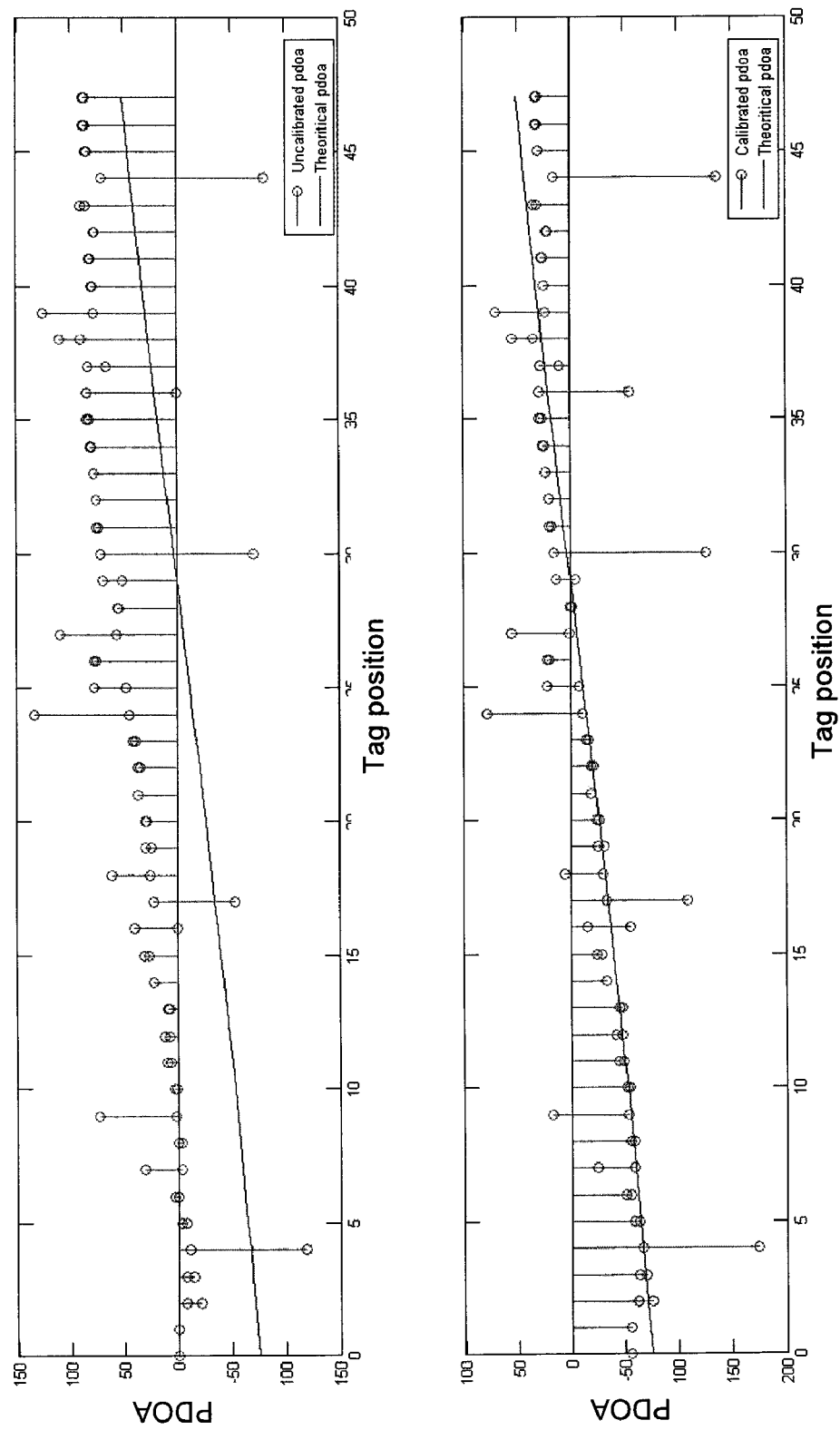
FIG. 42 shows a plot of the phase difference with respect to distance.

As can be seen in FIG. 41, the tag moves from right to left and in increments of ⅜ths of an inch. For each position of the tag, two measurements of phase are performed, one for each antenna, and the phase difference is calculated. FIG. 42 shows a plot of the phase difference with respect to the distance.

The diagonal line in FIG. 42 is the theoretical PDOA with respect to distance, whereas the red points are the measured and calculated PDOA. The lower part of the figure shows the measured values by taking into account phase errors introduced by the cable lengths. The phase errors can be compensated by using a known PDOA at any particular point. Typically the point chosen is the origin of the two dimensional plane as the PDOA will theoretically be zero. The phase error can be calibrated and used for the measurement and calculation of PDOA later. The phase error compensation can be determined as, $$PE = PDOA_k - PDOA_m \tag{83}$$

$PDOA_k$ and $PDOA_m$ are the known PDOA and measured PDOA at a certain point. If the origin is chosen, the known PDOA would be zero, and the phase error would be the measured PDOA at that point. With a known phase error, the PDOA at different points can be determined as, $$PDOA_C = PDOA_m + PE \tag{84}$$

where $PDOA_C$ is the compensated PDOA

Figure 43:
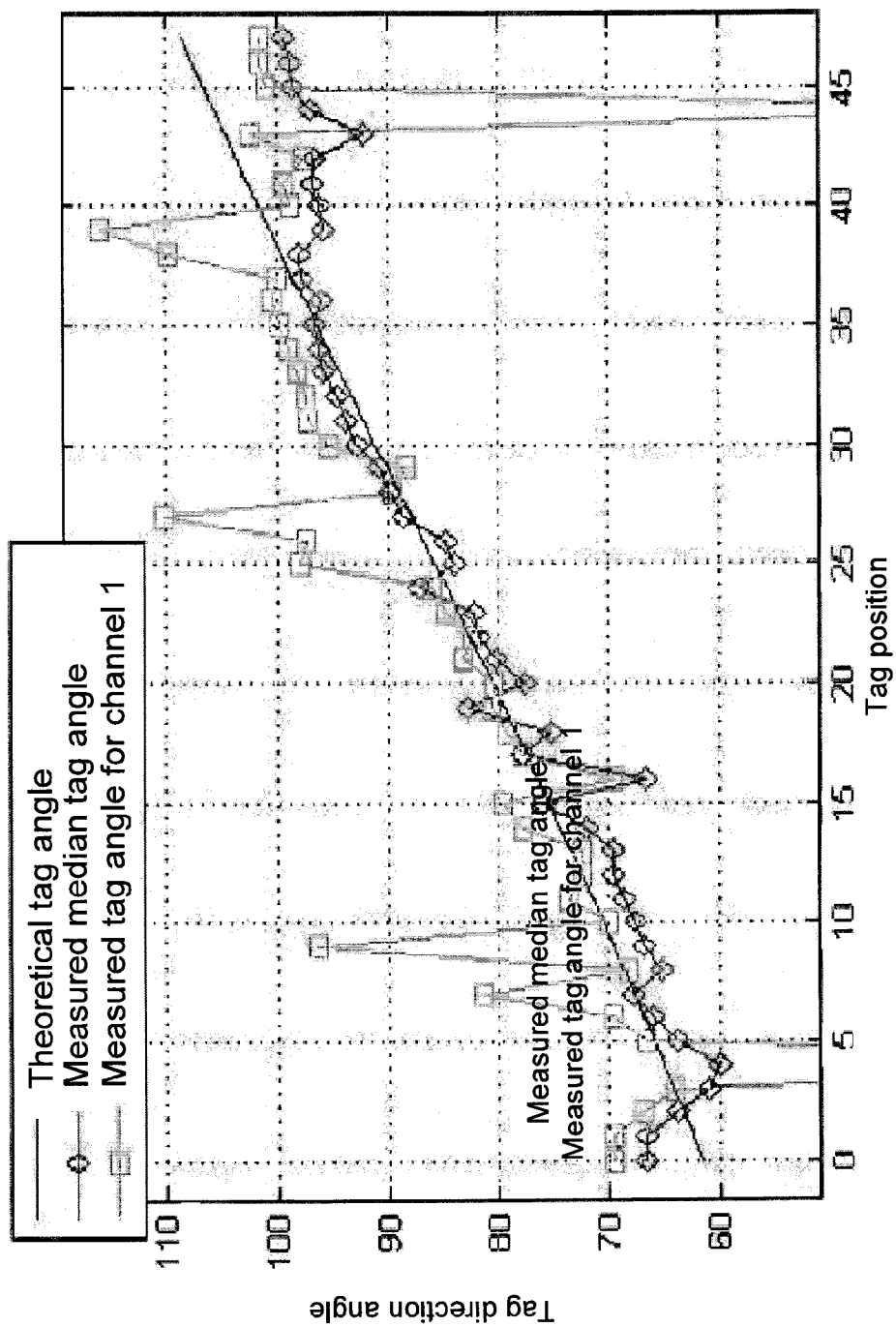
FIG. 43 shows a plot of the directional angle as a function of distance as the tag moves from right to left in parallel to the receive antennas.

The angle or the direction of a tag can be calculated from PDOA using equations (78) and (79). FIG. 43 shows a plot of the directional angle as a function of distance as the tag moves from right to left in parallel to the receive antennas. The diagonal line is the theoretically calculated angle, whereas the red and green lines correspond to the measured and calculated angle. The green line is the measured angle for one channel, whereas the red line is the median of the distance calculation for five channels in the 900 MHz range at each of the distance points, and a median filter was used. The median filter is very useful in processing backscatter propagation with multipath effects because it is very simple and fast, and thus efficient.

As can be seen in FIG. 43, the measured and calculated values follow the theoretical values fairly well.

Tag movement and angle of direction can be done using two measurements and calculated quite easily. Identifying the location of the tag requires three readings and more calculations.

SUMMARY

Another aspect of any of the methods described herein is including a Quality of Service (QOS) indicator. This provides good feedback to the user regarding the validity of the data. QOS would need redundant measurements which would affect the performance. With some degradation of performance, the measurement quality would be greatly enhanced. The redundancy could be multiple measurements at a point in terms of one channel or multiple channels, maybe averaging of data over a set of points and so on.

Table 2 below summarizes the current status of spatial identification.

TABLE 2

| Type | Capabilities | Hardware | Comments |
| --- | --- | --- | --- |
| TD-PDOA | Tag Movement Tag Velocity | Existing Setup. | Can be done with the existing knowledge. Any tag phase change due to changes in incident power can be resolved. |
| FD-PDOA | Tag Distance/Range Tag Location | Existing Setup. | Ranging can be done. Location is an extension of the ranging and will follow with ranging. |
| SD-PDOA | Tag angle/Direction Tag Location | Separate Transmit and Receive. | Angle/Direction as described in the sections above can be resolved. Location solving follows the Angle determination. |

It should be noted that there are other techniques using different hardware, such as a phased antenna array, that can be used to transmit and receive RF signals in particular directions. However, the current invention uses a passive backscatter modulation technique to transmit RF signals from an RFID reader using one or more antennas to illuminate RFID tags, and the tags modulate the RF energy received at the tag to re-radiate a modulated RF signal back to the reader.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while a bar code scanner for reading bar codes are mentioned, any reading apparatus for reading machine-readable symbols may be used under the principles disclosed herein. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention under the claims.

We claim:

1. A method of determining spatial information about an object coupled to one or more RFID tags using one or more receiving antennas at an RFID reader, comprising:

transmitting one or more RF inquiries to the one or more RFID tags at a first time;

measuring a phase for each RFID tag's response at each of the one or more receiving antennas;

calculating a phase difference between the measured phases of each response for two or more tag-and-antenna pairs;

determining a first set of equations based at least on a distance formula applied between each tag-and-antenna pair distance and a corresponding phase difference;

determining a second set of equations based at least on the distance formula applied between each antenna-pair distance and known antenna spacings or between each tag-pair distance and known tag spacings; and solving the first set of equations and the second set of equations to generate location coordinates for the one or more RFID tags, wherein the first set of equations is given by $\|R_{rm}-T_{tm}\|-\|R_{rn}-T_{tn}\|=K\Delta\phi$, wherein $$R_{rm} = \begin{bmatrix} x_{rm} \\ y_{rm} \\ z_{rm} \end{bmatrix}$$

is an antenna location of each antenna rm;

$$T_{tn} = \begin{bmatrix} x_{tn} \\ y_{tn} \\ z_{tn} \end{bmatrix}$$

is a tag location of each tag tn; M is a first total number of antennas; N is a second total number of tags; K equals $\lambda/4\pi$; $\lambda$ is a wavelength of transmission of an RF inquiry; $\Delta\phi$ is a phase difference of phases measured at the antennas; $1 \leq rm, rn \leq M$; $1 \leq tm, tn \leq N$; and further wherein if tm equals tn, rm does not equal rn, and if rm equals rn, tm does not equal tn.

2. The method of claim 1, further comprising:
determining a third set of equations based at least on orthogonality between antenna positional vectors if the antenna positional vectors are orthogonal or orthogonality between tag positional vectors if the tag positional vectors are orthogonal; and
solving the third set of equations with the first and second set of equations to generate location coordinates for the one or more RFD tags.

3. The method of claim 2, further comprising:
if a total number of equations in the first, second, and third sets of equations is less than three times a total number of tags, adding more equations based at least in part on measuring phase differences at one or more antennas between phases of responses from a tag to a first RF inquiry at a first frequency and a second RF inquiry at a second frequency and solving the first, second, and third sets of equations and additional equations for tag coordinates.

4. The method of claim 1 wherein the second set of equations is given by $\|R_{rm}-R_{rn}\|=d_{rmn}$ and $\|T_{tm}-T_{tn}\|=d_{tmn}$, wherein $d_{rmn}$ are the spacings between the antennas and $d_{tmn}$ are the spacings between the tags, M is a first total number of antennas, N is a second total number of tags, $$R_{rm} = \begin{bmatrix} x_{rm} \\ y_{rm} \\ z_{rm} \end{bmatrix}$$

is an antenna location of each antenna rm;

$$T_{tn} = \begin{bmatrix} x_{tn} \\ y_{tn} \\ z_{tn} \end{bmatrix}$$

is a tag location of each tag tn; $1 \leq rm, rn \leq M$, $1 \leq tm, tn \leq N$; and further wherein either rm does not equal rn or tm does not equal tn.

5. The method of claim 2 wherein the third set of equations is given by $R_{rm} \cdot R_{rn}=0$ and $T_{tm} \cdot T_{tn}=0$, wherein $$R_{rm} = \begin{bmatrix} x_{rm} \\ y_{rm} \\ z_{rm} \end{bmatrix}$$

is an antenna location of each antenna rm;

$$T_{tn} = \begin{bmatrix} x_{tn} \\ y_{tn} \\ z_{tn} \end{bmatrix}$$

is a tag location of each tag tn; M is a first total number of antenna; N is a second total number of tags; $1 \leq rm, rn \leq M$; $1 \leq tm, tn \leq N$; and further wherein either rm does not equal rn or tm does not equal tn.

6. The method of claim 1, further comprising calculating a size of the object from the tag coordinates if there are four tags located on corners of the object, and three of the tags are neighbors of a central tag.

7. The method of claim 1, further comprising calculating a linear velocity vector of the object based at least in part on transmitting one or more RF inquiries to the RFID tags at a second time, solving for tag coordinates at the second time, and dividing a difference between tag coordinates at the first time and at the second time by an elapsed time between the first time and the second time.

8. The method of claim 1, further comprising calculating a rotational velocity vector of the object based at least in part on:
calculating orientation angles of the object with respect to known antenna coordinates using the calculated tag coordinates;
transmitting one or more RF inquiries to the RFID tags at a second time;
solving for tag coordinates at the second time;
solving for orientation angles of the object with respect to known antenna coordinates at the second time; and
dividing a difference between orientation angles at the first time and at the second time by an elapsed time between the first time and the second time.

9. The method of claim 1, further comprising:
repeating and averaging the measurement of the phase at each of the one or more receiving antennas one or more times, wherein calculating the phase difference comprises calculating a difference of the averaged phase measurements; and
providing a quality of service indication based at least in part on a number of repeated phase measurements performed.

10. A tangible non-transitory computer-readable medium storing processing instructions for implementing an operation performed by a computer for determining spatial information about an object coupled to one or more RFID tags using one or more receiving antennas at an RFID reader, the operation comprising:
transmitting one or more RF inquiries to the one or more RFID tags at a first time;

measuring a phase for each RFID tag's response at each of the one or more receiving antennas;

calculating a phase difference between the measured phases of each response for two or more tag-and-antenna pairs;

determining a first set of equations based at least on a distance formula applied between each tag-and-antenna pair distance and a corresponding phase difference;

determining a second set of equations based at least on the distance formula applied between each antenna-pair distance and known antenna spacings or between each tag-pair distance and known tag spacings; and solving the first set of equations and the second set of equations to generate location coordinates for the one or more RFID tags, wherein the first set of equations is given by $\|R_{rm}-T_{tm}\|-\|R_{rn}-T_{tn}\|=K\Delta\phi$, wherein $$R_{rm} = \begin{bmatrix} x_{rm} \\ y_{rm} \\ z_{rm} \end{bmatrix}$$

is an antenna location of each antenna rm;

$$T_{tn} = \begin{bmatrix} x_{tn} \\ y_{tn} \\ z_{tn} \end{bmatrix}$$

is a tag location of each tag tn; M is a first total number of antennas; N is a second total number of tags; K equals $\lambda/4\pi$; $\lambda$ is a wavelength of transmission of an RF inquiry; $\Delta\phi$ is a phase difference of phases measured at the antennas; $1 \leq rm, rn \leq M$; $1 \leq tm, tn \leq N$; and further wherein if tm equals tn, rm does not equal rn, and if rm equals rn, tm does not equal tn.

11. The tangible non-transitory computer-readable medium of claim 10, wherein the operation further comprises:

determining a third set of equations based at least on orthogonally between antenna positional vectors if the antenna positional vectors are orthogonal or orthogonally between tag positional vectors if the tag positional vectors are orthogonal; and solving the third set of equations with the first and second set of equations to generate location coordinates for the one or more RFID tags.

12. The tangible non-transitory computer-readable medium of claim 11, wherein the operation further comprises:

if a total number of equations in the first, second, and third sets of equations is less than three times a total number of tags, adding more equations based at least in part on measuring phase differences at one or more antennas between phases of responses from a tag to a first RF inquiry at a first frequency and a second RF inquiry at a second frequency and solving the first, second, and third sets of equations and additional equations for tag coordinates.

13. The tangible non-transitory computer-readable medium of claim 10 wherein the second set of equations is given by $\|R_{rm}-R_{rn}\|=d_{rmn}$ and $\|T_{tm}-T_{tn}\|=d_{tmn}$, wherein $d_{rmn}$ are the spacings between the antennas and $d_{tmn}$ are the spacings between the tags, M is a first total number of antennas, N is a second total number of tags, $$R_{rm} = \begin{bmatrix} x_{rm} \\ y_{rm} \\ z_{rm} \end{bmatrix}$$

is an antenna location of each antenna rm;

$$T_{tn} = \begin{bmatrix} x_{tn} \\ y_{tn} \\ z_{tn} \end{bmatrix}$$

is a tag location of each tag tn; $1 \leq rm, rn \leq M$; $1 \leq tm, tn \leq N$; and further wherein either rm does not equal rn or tm does not equal tn.

14. The tangible non-transitory computer-readable medium of claim 11 wherein the third set of equations is given by $R_{rm} \cdot R_{rn}=0$ and $T_{tm} \cdot T_{tn}=0$, wherein $$R_{rm} = \begin{bmatrix} x_{rm} \\ y_{rm} \\ z_{rm} \end{bmatrix}$$

is an antenna location of each antenna rm;

$$T_{tn} = \begin{bmatrix} x_{tn} \\ y_{tn} \\ z_{tn} \end{bmatrix}$$

is a tag location of each tag tn; M is a first total number of antenna; N is a second total number of tags; $1 \leq rm, rn \leq M$; $1 \leq tm, tn \leq N$; and further wherein either rm does not equal rn or tm does not equal tn.

15. The tangible non-transitory computer-readable medium of claim 10, further comprising calculating a size of the object from the tag coordinates if there are four tags located on corners of the object, and three of the tags are neighbors of a central tag.

16. The tangible non-transitory computer-readable medium of claim 10, further comprising calculating a linear velocity vector of the object based at least in part on transmitting one or more RF inquiries to the RFID tags at a second time, solving for tag coordinates at the second time, and dividing a difference between tag coordinates at the first time and at the second time by an elapsed time between the first time and the second time.

17. The tangible non-transitory computer-readable medium of claim 10, wherein the operation further comprises calculating a rotational velocity vector of the object based at least in part on:

calculating orientation angles of the object with respect to known antenna coordinates using the calculated tag coordinates;

transmitting one or more RF inquiries to the RFID tags at a second time;

solving for tag coordinates at the second time;

solving for orientation angles of the object with respect to known antenna coordinates at the second time; and dividing a difference between orientation angles at the first time and at the second time by an elapsed time between the first time and the second time.

18. The tangible non-transitory computer-readable medium of claim 10, wherein the operation further comprises:

repeating and averaging the measurement of the phase at each of the one or more receiving antennas one or more times, wherein calculating the phase difference comprises calculating a difference of the averaged phase measurements; and providing a quality of service indication based at least in part on a number of repeated phase measurements performed.

* * * * *

UNITED STATES PATENT AND TRADEMARK OFFICE
CERTIFICATE OF CORRECTION

PATENT NO. : 8,248,210 B2  Page 1 of 1
APPLICATION NO. : 12/495732
DATED : August 21, 2012
INVENTOR(S) : Pavel Nikitin et al.

It is certified that error appears in the above-identified patent and that said Letters Patent is hereby corrected as shown below:

In the Specifications:

In column 34, line 66, Delete "PDOA" and insert -- PDOA. --, therefor.

In the Claims:

In column 37, line 37, in claim 2, Delete "RFD" and insert -- RFID --, therefor.

Signed and Sealed this
Twenty-seventh Day of August, 2013

Teresa Stanek Rea
*Acting Director of the United States Patent and Trademark Office*